United States Patent
Sugiyama

(10) Patent No.: US 11,412,125 B2
(45) Date of Patent: Aug. 9, 2022

(54) IMAGING APPARATUS, ACCESSORY APPARATUS, AND COMMUNICATION CONTROL METHOD

(71) Applicant: CANON KABUSHIKI KAISHA, Tokyo (JP)

(72) Inventor: Kazumichi Sugiyama, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/456,672

(22) Filed: Jun. 28, 2019

(65) Prior Publication Data
US 2020/0007744 A1 Jan. 2, 2020

(30) Foreign Application Priority Data

Jun. 29, 2018 (JP) .............................. JP2018-124017
Jul. 31, 2018 (JP) .............................. JP2018-143940
(Continued)

(51) Int. Cl.
H04N 5/232 (2006.01)

(52) U.S. Cl.
CPC ..... *H04N 5/23209* (2013.01); *H04N 5/23227* (2018.08); *H04N 5/23245* (2013.01); *H04N 5/232411* (2018.08)

(58) Field of Classification Search
CPC ......... H04N 5/23241; H04N 5/232411; H04N 5/232; H04N 5/23203; H04N 5/23206; H04N 5/23209; H04N 5/2254
See application file for complete search history.

(56) References Cited

U.S. PATENT DOCUMENTS

| | | | |
|---|---|---|---|
| 9,323,024 B2* | 4/2016 | Imafuji | ................. G02B 7/14 |
| 2007/0189745 A1* | 8/2007 | Masuda | ............ H04N 5/23258 396/55 |

(Continued)

FOREIGN PATENT DOCUMENTS

| | | |
|---|---|---|
| CN | 101984586 A | 3/2011 |
| CN | 107786809 A | 3/2018 |

(Continued)

OTHER PUBLICATIONS

Mar. 15, 2021 Chinese Office Action, which is enclosed with an English Translation, that issued in Chinese Patent Application No. 201910561404.0.

(Continued)

*Primary Examiner* — Kelly L Jerabek
(74) *Attorney, Agent, or Firm* — Cowan, Liebowitz & Latman, P.C.

(57) ABSTRACT

An imaging apparatus to which a plurality of accessory apparatuses are attachable includes a camera communicator configured to provide a communication path with each of the plurality of accessory apparatuses, and a camera controller configured to communicate with the plurality of accessory apparatuses via the camera communicator. The camera controller transmits a first request to the plurality of accessory apparatuses, receives first information corresponding to whether or not to stop a communication with the imaging apparatus from each of the plurality of accessory apparatuses that have received the first request, and controls a communication with each of the plurality of accessory apparatuses according to the first information.

32 Claims, 35 Drawing Sheets

(30) Foreign Application Priority Data

Jun. 14, 2019 (JP) .............................. JP2019-111049
Jun. 14, 2019 (JP) .............................. JP2019-111474

(56) References Cited

U.S. PATENT DOCUMENTS

| | | | | | |
|---|---|---|---|---|---|
| 2012/0294598 | A1* | 11/2012 | Oikawa | ................. | G03B 13/34 |
| | | | | | 396/125 |
| 2013/0002942 | A1* | 1/2013 | Motoki | ................. | G03B 17/02 |
| | | | | | 348/372 |
| 2013/0265657 | A1* | 10/2013 | Hasegawa | ............ | H04N 5/2254 |
| | | | | | 359/755 |
| 2014/0009671 | A1* | 1/2014 | Ozone | ............. | H04N 5/232411 |
| | | | | | 348/371 |
| 2015/0194131 | A1 | 7/2015 | Kim et al. | | |
| 2017/0237902 | A1* | 8/2017 | Watanabe | ............. | G03B 17/56 |
| | | | | | 348/372 |
| 2018/0224720 | A1* | 8/2018 | Pan | ........................ | G03B 17/14 |
| 2018/0275494 | A1* | 9/2018 | Watanabe | ............. | G03B 17/14 |
| 2019/0129282 | A1* | 5/2019 | Hasegawa | ............. | G03B 17/18 |
| 2019/0306392 | A1* | 10/2019 | Imamura | ............. | H04N 5/2254 |
| 2019/0306412 | A1* | 10/2019 | Imamura | ............ | H04N 5/23209 |

FOREIGN PATENT DOCUMENTS

| | | |
|---|---|---|
| CN | 108139654 A | 6/2018 |
| JP | 5208169 B2 | 6/2013 |
| JP | 2020024378 A | 2/2020 |

OTHER PUBLICATIONS

Sep. 7, 2021 Japanese Office Action, which is enclosed without an English Translation, that issued in Japanese Patent Application No. 2020-120318.

* cited by examiner

FIG. 19A

| AUTHENTICATION INFORMATION REQUEST | CAMERA→LENS (FIRST COMMUNICATION) |
|---|---|
| | IDENTIFICATION INFORMATION REQUEST |
| | OPERATION STATE INFORMATION REQUEST |

FIG. 19B

| AUTHENTICATION INFORMATION | LENS→CAMERA (FIRST COMMUNICATION) |
|---|---|
| | IDENTIFICATION INFORMATION |
| | OPERATION STATE INFORMATION |

FIG. 19C

| AUTHENTICATION INFORMATION REQUEST | CAMERA→ACCESSORY (SECOND COMMUNICATION) |
|---|---|
| | IDENTIFICATION INFORMATION REQUEST |
| | OPERATION STATE INFORMATION REQUEST |
| | CORRECTION PROCESSING NECESSITY INFORMATION REQUEST |
| | TERMINAL INFORMATION REQUEST |

FIG. 19D

| AUTHENTICATION INFORMATION | ACCESSORY (INTERMEDIATE ACCESSORY)→CAMERA (SECOND COMMUNICATION) |
|---|---|
| | IDENTIFICATION INFORMATION |
| | OPERATION STATE INFORMATION |
| | CORRECTION PROCESSING NECESSITY INFORMATION |
| | TERMINAL INFORMATION |

FIG. 19E

| AUTHENTICATION INFORMATION | ACCESSORY (INTERCHANGEABLE LENS)→CAMERA (SECOND COMMUNICATION) |
|---|---|
| | SECOND IDENTIFICATION INFORMATION |
| | OPERATION STATE INFORMATION |
| | CORRECTION PROCESSING NECESSITY INFORMATION (UNNECESSARY) |
| | TERMINAL INFORMATION (TERMINAL) |

IMAGING APPARATUS, ACCESSORY APPARATUS, AND COMMUNICATION CONTROL METHOD

BACKGROUND OF THE INVENTION

Field of the Invention

The present invention relates to an imaging system that includes an imaging apparatus (referred to as a camera hereinafter) and an accessory apparatus (referred to as an accessory hereinafter), such as an interchangeable lens and an intermediate adapter, which can communicate with each other.

Description of the Related Art

The above imaging system includes a plurality of operation members, such as a rotational operation ring (operationally operated ring) and a slide switch, used for an optical adjustment of a focal length, a focus state, a diaphragm (aperture stop), etc., and used to set the ISO speed and to turn on and off a function, such as the autofocus (AF) and image stabilization. In addition, the imaging system has an auto power-off function that automatically shifts the power supply of the entire imaging system to a power saving state (sleep state) when no operation is made for a predetermined time. When detecting any operations in the sleep state, the imaging system returns to (or restarts) a normal operation state from the sleep state.

Japanese Patent No. 5208169 discloses an imaging system that transmits identification (ID) information of an interchangeable lens to an intermediate adapter, and limits an operation of the intermediate adapter when the interchangeable lens is identified as a specific interchangeable lens by the ID information.

The conventional auto power off function puts an entire imaging system including an interchangeable lens, an intermediate adapter, and a camera body into a sleep state. However, in order to reduce the power consumption after the normal communication in the imaging system, only accessories that do not require a communication need to transfer to the sleep state.

The imaging system disclosed in Japanese Patent No. 5208169 transfers the intermediate adapter to the power saving state when the interchangeable lens is identified as the specific interchangeable lens, but when the intermediate adapter has an operation member, the operation of the operation member needs to be communicated to the camera body.

SUMMARY OF THE INVENTION

The present invention provides an imaging system that can identify an accessory that does not require a communication.

An imaging apparatus according to one aspect of the present invention to which a plurality of accessory apparatuses are attachable includes a camera communicator configured to provide a communication path with each of the plurality of accessory apparatuses, and a camera controller configured to communicate with the plurality of accessory apparatuses via the camera communicator. The camera controller transmits a first request to the plurality of accessory apparatuses receives first information corresponding to whether or not to stop a communication with the imaging apparatus from each of the plurality of accessory apparatuses that have received the first request, and controls a communication with each of the plurality of accessory apparatuses according to the first information.

An accessory apparatus according to another aspect of the present invention attachable to an imaging apparatus to which a plurality of accessory apparatuses are attachable includes an accessory communicator configured to provide a communication path with the imaging apparatus, and an accessory controller configured to communicate with the imaging apparatus via the accessory communicator. The accessory controller transmits to the imaging apparatus first information corresponding to whether to stop a communication with the imaging apparatus, in response to a first request received from the imaging apparatus.

A communication control method for each of the above imaging apparatus and the accessory apparatus, and a non-transitory computer readable storage medium storing a program that causes a computer to execute the above communication control method also constitute another aspect of the present invention.

Further features of the present invention will become apparent from the following description of exemplary embodiments with reference to the attached drawings.

BRIEF DESCRIPTION OF THE DRAWINGS

FIGS. 19A to 19E illustrate illustrative information communicated in the initial communication.

DESCRIPTION OF THE EMBODIMENTS

Referring now to the accompanying drawings, a description will be given of embodiments according to the present invention.

First Embodiment

Figure 1:
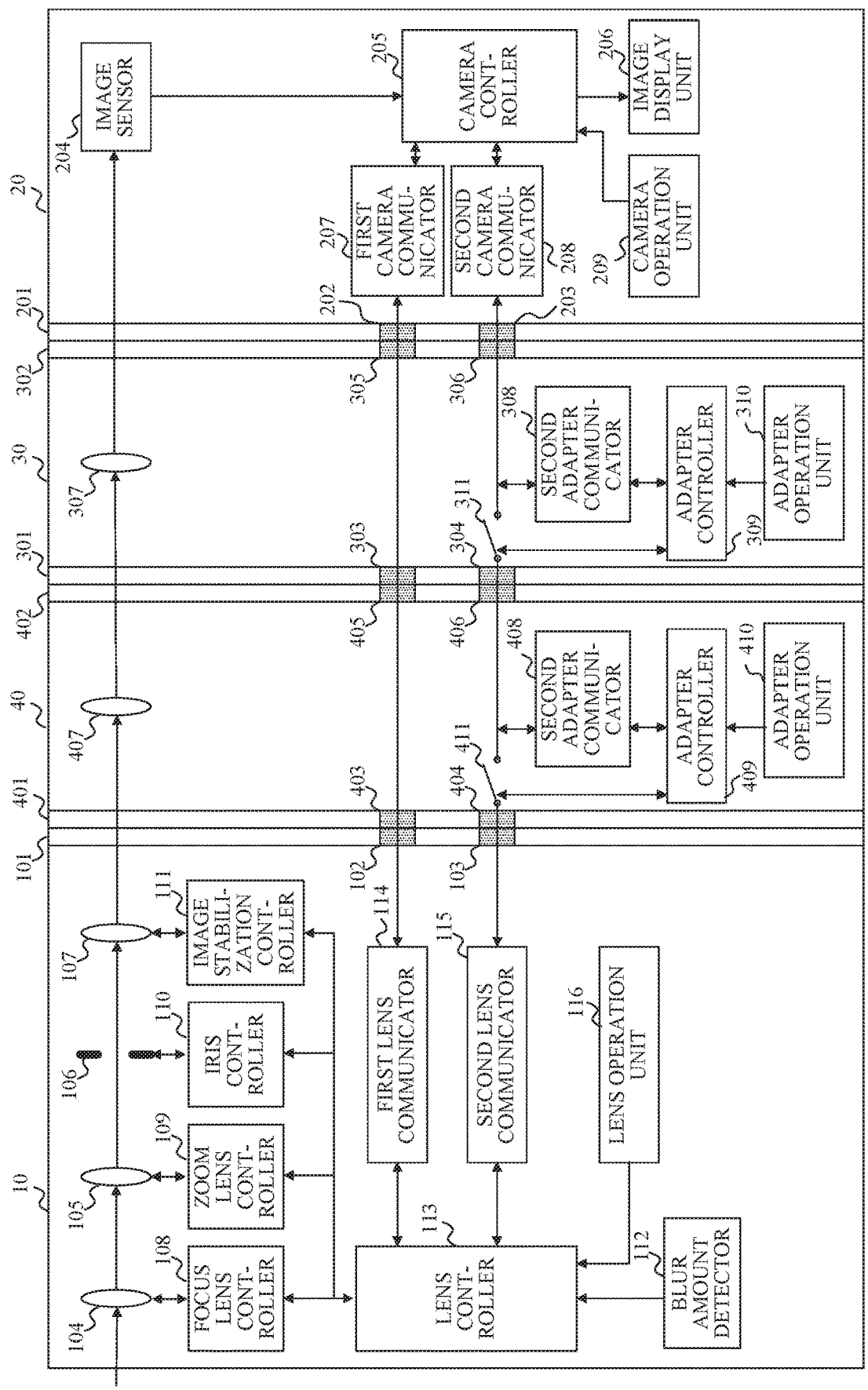
FIG. 1 is a block diagram showing a configuration of a camera system according to a first embodiment of the present invention.

FIG. 1 illustrates a configuration of an imaging system (referred to as a camera system hereinafter) according to a first embodiment of the present invention. This camera system is used while a plurality of accessory apparatuses (collectively referred to as accessories hereinafter) including the interchangeable lens 10 and the plurality of intermediate adapters 30 and 40 are detachably and communicably attached to a camera body 20 as an imaging apparatus. The intermediate adapters 30 and 40 include a teleconverter or wide converter configured to change a focal length, a mount converter configured to change a flange back length, and an ND filter having a light attenuation function. The interchangeable lens 10 may be attached directly to the camera body 20 (without intervening the intermediate adapters 30 and 40), or only one intermediate adapter may be provided between the camera body 20 and the interchangeable lens 10.

A mount 202 of the camera body 20 and a mount 302 of the intermediate adapter 30 are mechanically and electrically coupled to each other, and a mount 301 of the intermediate adapter 30 and a mount 402 of the intermediate adapter 40 are mechanically and electrically coupled to each other. The mount 301 of the intermediate adapter 40 and the mount 101 of the interchangeable lens 10 are mechanically and electrically coupled to each other. The camera body 20 includes a first camera communicator 207, a second camera communicator 208, and a camera controller 205 as a computer. The first camera communicator 207 and the second camera communicator 208 constitute a camera communicator.

The interchangeable lens 10 includes a first lens communicator 114, a second lens communicator 115, and a lens controller (accessory controller) 113 as a computer. The first lens communicator 114 and the second lens communicator 115 constitute an accessory communicator. The intermediate adapters 30 and 40 respectively include second adapter communicators 308 and 408 as accessory communicators, and adapter controllers (accessory controllers) 309 and 409 as computers.

A first communication path is provided using first communication contacts 202, 305, 303, 405, 403, and 102 on the mounts 201, 302, 301, 402, 401, and 101 between the first camera communicator 207 and the first lens communicator 114. The camera controller 205 and the lens controller 113 perform the "one-to-one" communication (also referred to as a first communication hereinafter) via the first communication path. Between the second camera communicator 208, the second adapter communicators 308 and 408, and the second lens communicator 115, a second communication path is provided using second communication contact portions 203, 306, 304, 406, 404, and 103 provided on the mounts 201, 302, 301, 402, 401, and 101. The camera controller 205 performs the "one-to-many" communication (also referred to as a second communication hereinafter) with the lens controller 113 and the adapter controllers 309 and 409 via the second communication path.

The first communication and the second communication performed with different communication paths can transmit an instruction and a request from the camera body 20 to the interchangeable lens 10 at more appropriate timings, for example, in the first communication than the first communication and the second communication performed with the same communication path. Thereby, the camera body 20 can control the interchangeable lens 10 at a higher speed and with a higher accuracy.

The intermediate adapters 30 and 40 have second communication connection switches 311 and 411, respectively. The second communication connection switches 311 and 411 are provided on the second communication path, closer to the interchangeable lens than the second adapter communicators 308 and 408, and switch between a connection to and a disconnection from the second communication path. The switching operations of the second communication connection switches 311 and 411 are controlled by the adapter controllers 309 and 409, respectively. Since the second communication connection switches 311 and 411 are provided to the intermediate adapters 30 and 40, the intermediate adapters 30 and 40 can change the (connection and disconnection) states of the second communication.

The interchangeable lens 10 includes an imaging optical system. The imaging optical system includes, in order from an unillustrated object side, a focus lens 104 for focusing, a zoom lens (magnification-varying lens) 105 for magnification variations, a diaphragm (iris) unit 106 for adjusting a light amount, and an image stabilization lens 107 for reducing an image blur. Each of the focus lens 104 and the zoom lens 105 is driven by a focus driver 108 and a zoom driver 109 in the optical axis direction as the direction in which the optical axis of the imaging optical system extends. Each of the focus driver 108 and zoom driver 109 includes an actuator, such as a stepping motor and its drive circuit.

The diaphragm unit 106 includes a plurality of unillustrated aperture blades, and adjusts the light amount by driving them in an opening and closing direction through the iris driver 110. The iris driver 110 includes an actuator, such as a stepping motor, and its drive circuit.

The image stabilization lens 107 is shifted in a direction orthogonal to the optical axis of the imaging optical system by an image stabilization driver 111 according to a camera shake, such as a manual vibration. The image stabilization driver 111 includes an actuator, such as a voice coil motor, and its drive circuit. The interchangeable lens 10 includes a shake (or vibration) detector 112, such as a gyro sensor, for detecting the camera shake.

The interchangeable lens 10 has a lens operation unit 116. The lens operation unit 116 includes a plurality of operation members, such as a lens operation ring, a switch, a button, a dial, and a touch panel, which can be rotated by the user around the optical axis. The operation of the lens operation unit 116 is detected by the lens controller 113.

The lens controller 113 controls the operation of each component in the interchangeable lens 10. More specifically, the camera controller 205 receives a control command and a transmission request command transmitted from the camera body 20 through the first communication, and performs a lens control corresponding to the control command. The lens controller 113 transmits, to the camera body 20, optical information of the imaging optical system corresponding to the transmission request command transmitted from the camera body 20 through the first and second communications and operation information of the lens operation unit 116. The lens controller 113 controls the shift drive (or the image stabilization operation) of the image stabilization lens 107 via the image stabilization driver 111 based on the shake signal from the shake detector 112.

The intermediate adapters 30 and 40 include adapter operation units 310 and 410. The adapter operation units 310 and 410 include a plurality of operation members, such as an adapter operation ring, a switch, a button, a dial, and a touch panel, that can be rotated by the user around the optical axis. The operations in the adapter operation units 310 and 410 are detected by the adapter controllers 309 and 409.

The adapter controllers 309 and 409 control the operations of the components in the intermediate adapters 30 and 40, respectively. The adapter controllers 309 and 409 receive the control command and the transmission request command transmitted from the camera body 20 through the first communication, respectively. The adapter controllers 309 and 409 perform an adapter control corresponding to the control command. The adapter controllers 309 and 409 transmit, to the camera body 20, optical information of the intermediate adapters 30 and 40 corresponding to the transmission request command transmitted from the camera body 20 through the first and second communications and operation information of the adapter operation units 310 and 410.

The camera body 20 includes an image sensor 204, such as a CCD sensor and a CMOS sensor, a camera controller 205, and an image display unit 206. The image sensor 204 is a photoelectric conversion element, such as a CMOS sensor, and captures (photoelectrically converts) an object image formed by the imaging optical system. The image display unit 206 displays an image signal generated by imaging as a live-view image used for a confirmation of a composition, a focus state, and the like, and reproduces and displays an image recorded by imaging.

The camera controller 205 controls the operation of each component in the camera body 20 according to the operation of the camera operation unit 209 such as an unillustrated imaging instruction switch and various setting switches. For example, the exposure time of the image sensor 204 is controlled for an exposure control. In addition, the camera controller 205 transmits a control command to the interchangeable lens 10 and the intermediate adapters 30 and 40 through the first communication. For example, the camera controller 205 transmits a control command regarding a zoom control to the interchangeable lens 10 in response to the operation of the zoom switch included in the camera operation unit 209. The camera controller 205 transmits, to the interchangeable lens 10, a control command relating to a light amount adjustment control according to the luminance information of the image signal, and a control command relating to a focus control according to the focus information obtained from the image sensor 204.

The camera controller 205 transmits a transmission request command for acquiring optical information and operation information to the interchangeable lens 10 and the intermediate adapters 30 and 40, and receives the lens optical information from the interchangeable lens 10 and adapter optical information from the intermediate adapter 30 and 40. The camera controller 205 receives operation information of the lens and the adapter operation units 116, 310, and 410 from the interchangeable lens 10 and the intermediate adapters 30 and 40, and transmits the corresponding control command to the interchangeable lens 10 and the intermediate adapter 30 and 40.

Figure 2A:
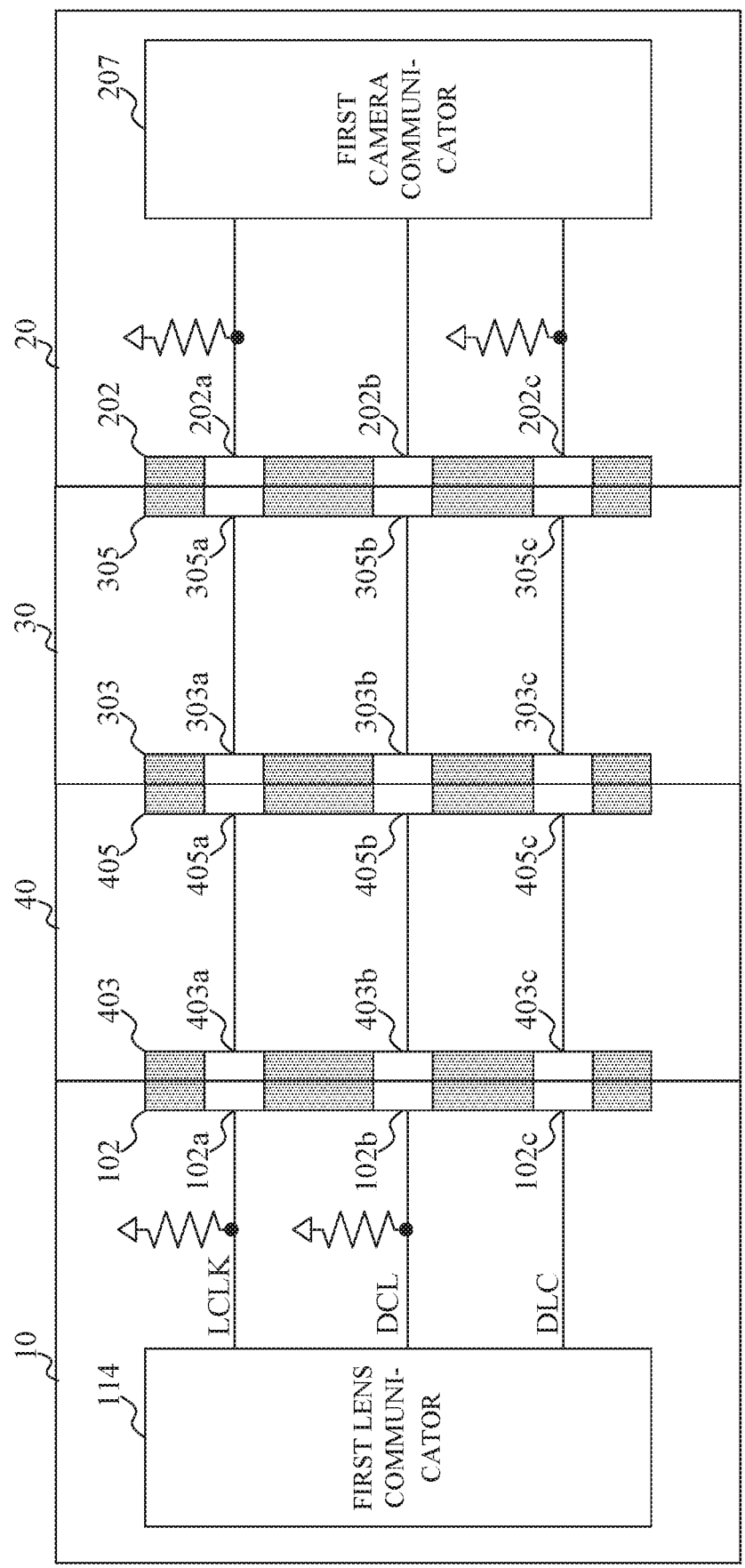
FIGS. 2A and 2B illustrate a first communication according to the first embodiment.
Figure 2B:
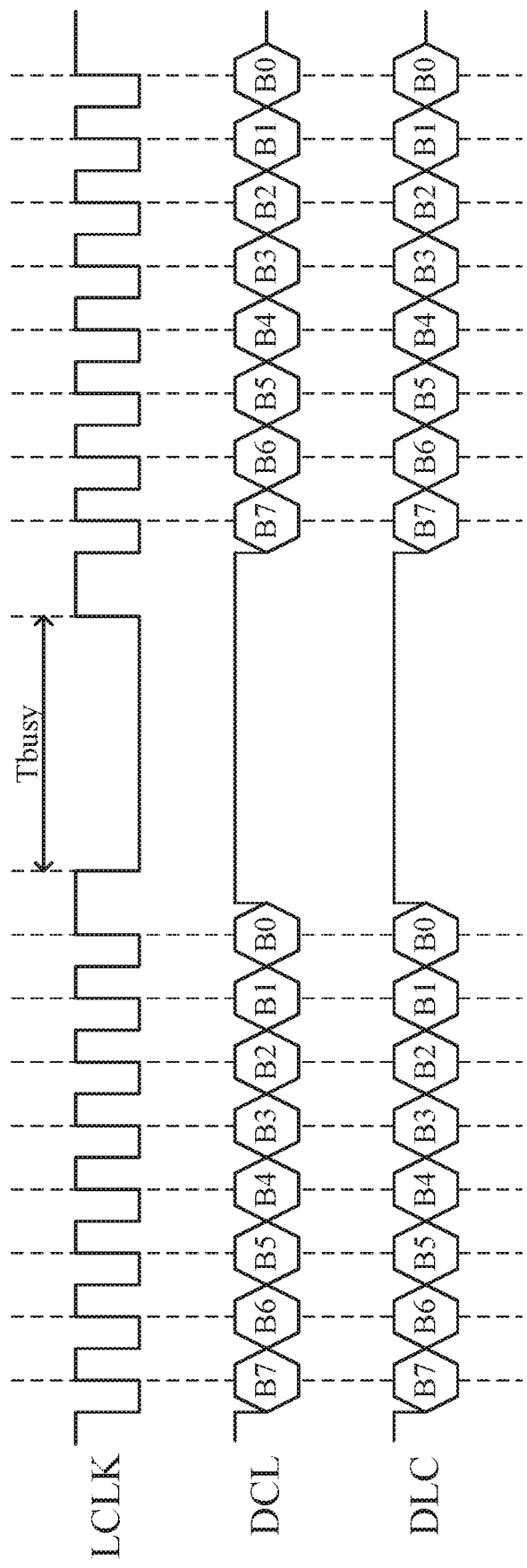

Referring now to FIGS. 2A and 2B, a description will be given of the first communication. FIG. 2A illustrates a configuration of first communication circuit for providing the first communication as a three-line clock synchronous communication. The first communication contacts 102, 403, 405, 303, 305, and 202 include first LCLK terminals 102a, 403a, 405a, 303a, 305a, and 202a as a terminal of a clock line LCLK that is a signal line for a clock signal output from the first camera communicator 207 to perform the clock synchronous communication. The first communication contacts 102, 403, 405, 303, 305, and 202 include first DCL terminals 102b, 403b, 405b, 303b, 305b, and 202b as terminals of a data line DCL that is a signal line through which a data signal of the clock synchronous communication is output from the first camera communicator 207. The first communication contacts 102, 403, 405, 303, 305, and 202 include the first DLC terminals 102c, 403c, 405c, 303c, 305c, and 202c as terminals of the data line DLC that is a signal line through which a data signal of the clock synchronous communication is output from the first lens communicator 114.

As illustrated in FIG. 2A, the clock line LCLK and the data line DCL are pulled up in the interchangeable lens 10. The clock line LCLK and the data line DLC are pulled up in the camera body 20.

The clock line LCLK, the data line DCL, and the data line DLC in the intermediate adapters 30 and 40 are short-circuited between the first communication contacts 303 and 305 and between the first communication contacts 403 and 405, respectively.

FIG. 2B illustrates signal waveforms of the clock line LCLK, the data line DCL, and the data line DLC in the first communication. The first camera communicator 207 outputs a clock signal to the clock line LCLK, and outputs 8-bit data from B7 to B0 to the data line DCL in synchronization with the leading edge of the clock signal. The first lens communicator 114 outputs 8-bit data from B7 to B0 to the data line DLC in synchronization with the leading edge of the clock signal. The first camera communicator 207 receives 8-bit data from B7 to B0 from the data line DLC in synchronization with the leading edge of the clock signal. The first lens communicator 114 receives 8-bit data from B7 to B0 from the data line DCL in synchronization with the leading edge of the clock signal. Thus, the first camera communicator 207 and the first lens communicator 114 can transmit and receive data to and from each other.

When receiving the 8-bit data from B7 to B0 from the data line DCL, the first lens communicator 114 maintains low the clock signal LCLK for the time Tbusy, and releases a low level state of the clock signal after the time Thusy. The time Tbusy is a time period necessary for the interchangeable lens 10 to process the received data, and the first camera communicator 207 does not perform the next data transmission until the clock line LCLK changes from the low level to the high level after the data transmission. The first camera communicator 207 and the first lens communicator 114 perform data transmission and reception through the first communication by repeating the above processing.

Figure 3:
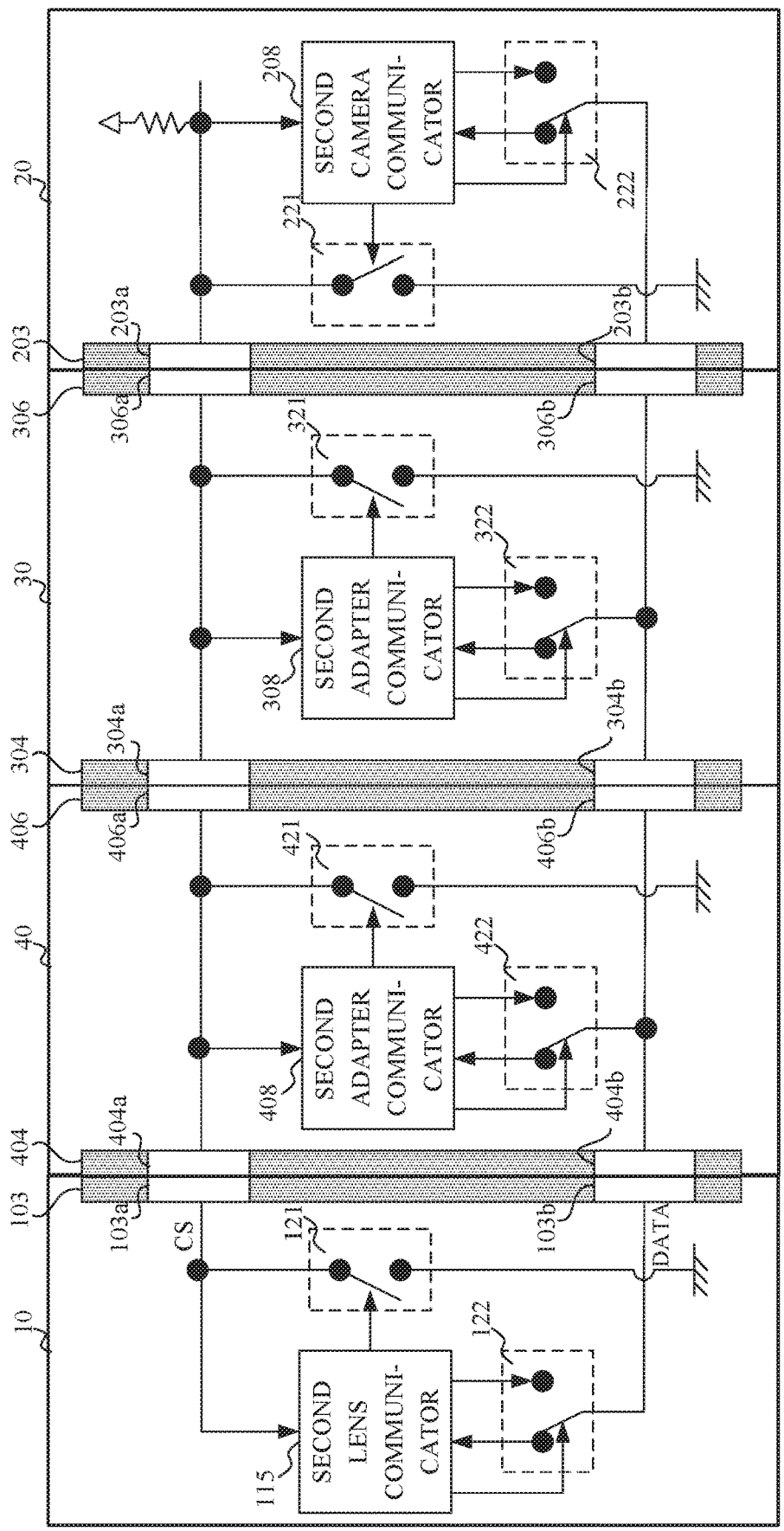
FIG. 3 explains a second communication according to the first embodiment.

Referring now to FIG. 3, a description will be given of the second communication, FIG. 3 illustrates a configuration of a second communication circuit for performing the second communication. The second camera communicator 208, the second lens communicator 115, and the second adapter communicators 308 and 408 are communicably connected with one another via the second communication contact portions 203, 306, 304, 406, 404, and 103. A CS signal line (first signal line) is provided via the CS contacts 203*a*, 306*a*, 304*a*, 406*a*, 404*a*, and 103*a* among the second communication contact portions 203, 306, 304, 406, 404, and 103. A DATA signal line (second signal line) is provided through the DATA contacts 203*b*, 306*b*, 304*b*, 406*b*, 404*b*, and 103*b* among the second communication contact portions 203, 306, 304, 406, 404, and 103. The CS signal line is a signal line for propagating a signal (command) for controlling a communication, and the DATA signal line is a signal line for propagating data to be transmitted and received.

The camera body 20 includes a ground switch 221 and an input/output switch 222. The interchangeable lens 10 includes a ground switch 121 and an input/output switch 122. The intermediate adapters 30 and 40 include a ground switch 321 and an input/output switch 322.

The camera controller 205, the lens controller 113, and the adapter controllers 309 and 409 can detect the (high and low) states of the CS signal line through the second camera communicator 208, the second lens communicator 115, and the second adapter communicators 308 and 408. The CS signal line is pull-up connected to an unillustrated power supply in the camera body 20, and is open drain connected to GND via ground switches 221, 121, 321 and 421. With this configuration, the second camera communicator 208, the second lens communicator 115, and the second adapter communicators 308 and 408 turn on (connect) the ground switches 221, 121, 321 and 421, respectively, thereby making low the CS signal line. The CS signal line can be made high by turning off (cut off) all the ground switches 221, 121, 321 and 421. The CS signal line is used to distinguish the broadcast communication and the P2P communication from each other, to switch the communication direction in the P2P communication, and the like.

The DATA signal line is a single-line bidirectional data transmission line that can be used while switching the data propagation direction. The DATA signal line is connected to the second lens communicator 115 via the input/output switch 122 of the interchangeable lens 10, and connected to the second camera communicator 208 via the input/output switch 222 of the camera body 20. The DATA signal line is connected to the second adapter communicators 308 and 408 via the input/output switch 322 of the intermediate adapters 30 and 40, respectively.

The second camera communicator 208, the second lens communicator 115, and the second adapter communicators 308 and 408 respectively have a data output unit (CMOS method) for transmitting data and a data input unit (CMOS method) for receiving data. The second camera communicator 208, the second lens communicator 115, and the second adapter communicators 308 and 408 operate the input/output switches 222, 122, 322 and 422, respectively, to connect the DATA signal line to one of the data output unit and the data input unit.

In other words, when the second camera communicator 208, the second lens communicator 115, and the second adapter communicators 308 and 408 themselves transmit data, they operate the input/output switches 222, 122, 322, and 422 so as to connect the DATA signal line to the data output unit through the second camera communicator 208, the second lens communicator 115, and the second adapter communicator 308 and 408. On the other hand, when receiving data, they operates the input/output switches 222, 122, 322 and 422 so that the DATA signal line is connected to the data input unit through the second camera communicator 208, second lens communicator 115, and second adapter communicators 308 and 408.

A description will be given of the broadcast communication and the P2P communication performed by the CS signal line and the DATA signal line. The CS signal line becomes low when any one of the ground switches 221, 121, 321 and 421 is turned on. The CS signal line that is low is used as a trigger for the broadcast communication. The broadcast communication is started when the camera controller 205 as the communication master makes low the CS signal line through the second camera communicator 208. The lens controller 113 and the adapter controllers 309 and 409 determine that the data received via the DATA line when the CS signal line is low is data through the broadcast communication. The lens controller 113 and the adapter controllers 309 and 409 can request the camera controller 205 for the broadcast communication by making low the CS signal line.

The camera controller 205, the lens controller 113, and the adapter controllers 309 and 409, which have detected a low level of the CS signal line, turn on their own ground switches while the broadcast communication is being processed. This configuration can notify another controller that processing of the broadcast communication is continuing.

When it is defined that the second communication starts with the broadcast communication and ends with the broadcast communication, the DATA signal line of the accessory may basically maintain the reception state. When the camera controller 205 performs the P2P communication with an accessory (lens controller 113 and adapter controllers 309 and 409), the camera controller 205 initially designates the communication target accessory through the broadcast communication. The camera controller 205 that has completed the transmission through the broadcast communication performs the P2P communication with the designated accessory.

In the P2P communication, the camera controller 205 initially transmits data to the accessory, and the accessory that has received the data transmits the data to the camera controller 205. Thereafter, these are alternately performed. The P2P communication is distinguished from the broadcast communication by maintaining high the CS signal line during the communication. The CS signal line in the P2P communication is used as a busy signal. In other words, the camera controller 205 and the accessory make low the CS signal line so as to notify the communication target of the end of the data transmission from itself, and makes high the CS signal so as to notify that the data reception is ready.

When the P2P communication ends, the camera controller 205 notifies each accessory of the end of the P2P communication through the broadcast communication. Thus, the camera controller 205 can perform the data communication via a plurality of accessories and two communication lines.

The communication circuit illustrated in FIG. 3 is merely illustrative, and another communication circuit may be used. For example, the CS signal line is pulled-down connected to GND in the camera body 20, and may be connected to the unillustrated power supply via the ground switch 121 of the interchangeable lens 10, the ground switch 221 of the camera body 20, and the ground switches 321 and 421 of the middle accessories 30 and 40. The DATA signal line may be always connected to the data input unit of the second camera communicator 208, the second lens communicator 115, and the second adapter communicators 308 and 408. In this case, the connection and disconnection between the DATA signal line and the data output units of the second camera communicator 208, the second lens communicator 115, and the second adapter communicators 308 and 408 may be switched by a switch.

In this embodiment, the above first communication circuit performs the communication requiring the urgency between the camera body 20 and the interchangeable lens 10, and the second communication circuit performs the nonurgent communication, such as the communication of the operation amount of the operation member provided to the interchangeable lens 10 and the intermediate adapters 30 and 40. Thereby, the urgency of the control of the interchangeable lens 10 can be ensured. Since the first communication is the one-to-one communication between the camera body 20 and the interchangeable lens 10, the data collision as in the one-to-many communication is unlikely and the urgent communication is available by omitting the communication for avoiding it.

In addition, using only the second communication circuit for the communication between the camera body 20 and the accessory (the interchangeable lens 10 and the intermediate adapters 30 and 40), the accessory does not need to be compatible with a high-speed and high-level communication protocol of the first communication. Thus, the cost reduction of accessories is available.

On the other hand, the second communication has a risk of the data collision because it is the one-to-many communication. In order to avoid this problem, the communication occupying procedure is performed as described above. When the camera body 20 communicates with a communication target accessory, the identification (ID) information indicating the communication target accessory is notified through the broadcast communication. Then, only the communication target accessory responds to the communication from the camera body 20 until the camera body 20 notifies of the release of the second communication circuit through the broadcast communication.

As described above, when the communication contents exchanged in the second communication mainly include transmitting the operation amount of the operation member provided in the accessory, the communication is often started with a communication request from the accessory. If the communication request can be simply made as in this embodiment to change the level of the signal line common to all the accessories, the camera body 20 having received the communication request needs to sequentially check whether each accessory has made the request.

In order to reduce the communication amount, it is thus significant that the camera body 20 grasps whether or not each of the plurality of attached accessories is an accessory that makes the communication request. For example, when the communication request is generated from any of a plurality of accessories and only one accessory makes the communication request, it is sufficient to inquire only that accessory about the generating factor of the communication request.

In this embodiment, the interchangeable lens 10 uses both the first communication and the second communication to communicate with the camera body 20. At this rime, the first communication is required for the urgent communication so that the interchangeable lens 10 transmits status information indicating its state to the camera body 20 or the communication that transmits control parameter from the camera body 20 to the interchangeable lens 10. On the other hand, the second communication is used for the nonurgent communication, such as communicating the operation amount of the operation member provided on the interchangeable lens 10 to the camera body 20.

Figure 4:
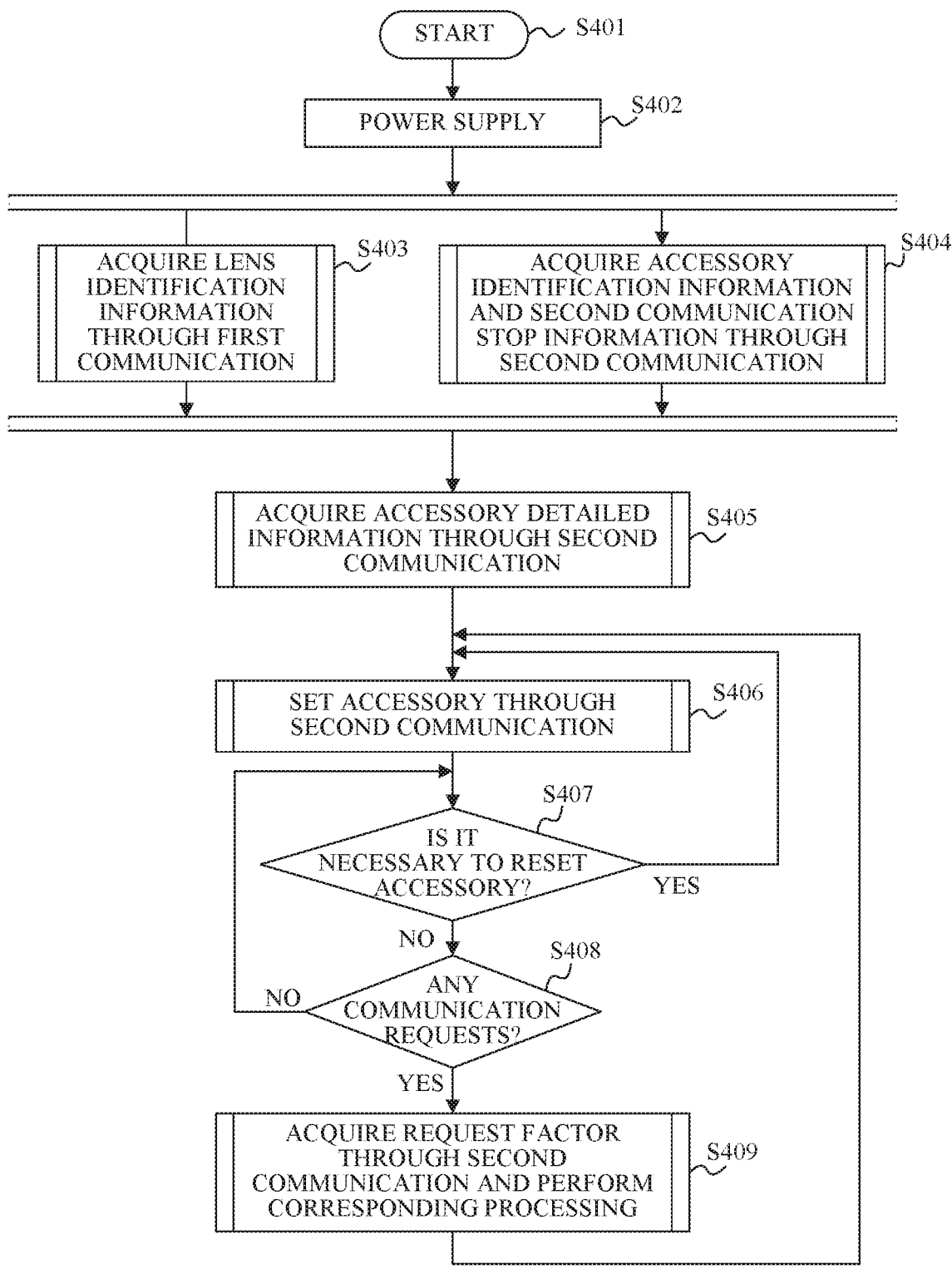
FIG. 4 is a flowchart showing processing from an acquisition of second communication stop information of an accessory (interchangeable lens and intermediate adapter) to a transition to a normal operation state according to the first embodiment.

Referring now to a flowchart in FIG. 4, a description will be given of processing (communication control method) from when the camera body 20 receives the second communication stop information as the first information from the accessory to when the second communication stop information is used for the normal operation state of the camera system. The normal operation state is a state that ends the setting of each accessory by the camera body 20 after the initial communication described later ends in the entire camera system. The camera controller 205, the adapter controllers 309 and 409, and the lens controller 113 execute the following processing according to the computer program.

The camera controller 205 activated when the power turns on in S401 proceeds to S402, and supplies the power (referred to as an accessory power supply hereinafter) to the interchangeable lens 10 and the intermediate accessories 30 and 40 via the unillustrated power supply mount contact.

Next, in S403, the camera controller 205 performs the initial communication with the lens controller 113 through the first communication. In the initial communication, the identification information of the interchangeable lens 10 (referred to as lens identification information hereinafter) is received. The lens identification information may be model number information used to identify the type (model) of the interchangeable lens 10 or optical data information indicating optical data unique to the interchangeable lens 10. It may be information indicating the function possessed by the interchangeable lens 10 or a product number (serial number) capable of identifying the individual in the same model.

In S404, the camera controller 205 performs the initial communication with the accessory (lens controller 113 and adapter controllers 309 and 409) through the second communication, and receives the accessory authentication information. A series of communications in S404 will be referred to as an accessory authentication communication in the following description. Herein, the accessory authentication information contains accessory identification information (lens identification information and adapter identification information) and second communication stop information. In other words, the information exchanged in the accessory authentication communication is the basic information necessary for the communication that designates a specific accessory as the communication target through the second communication.

The lens identification information transmitted from the lens controller 113 to the camera controller 205 through the second communication may be the same information as the lens identification information transmitted through the first communication, or may be a specific value indicating an interchangeable lens. On the other hand, the adapter identification information is used to designate the communication target of the P2P communication through the second communication and thus needs to be different between the intermediate adapters 30 and 40. The adapter identification information may be the model number information used to identify the type (model) of the intermediate adapters 30 and 40, or optical data information indicating optical data unique to the intermediate adapters 30 and 40. It may be information indicating the function possessed by the intermediate adapters 30 and 40, or a production number (serial number) capable of identifying the individual in the same model.

The second communication stop information indicates the operation status of the second communication after the accessory authentication communication, and is logical type binary information having "true" or "false" values. In other words, the second communication stop information is information corresponding to whether to stop the second communication. The accessory whose second communication stop information is "true" stops the operation of the second communicator (115, 308, or 408) after the second communication stop information is transmitted. The second communicator stopping state is stopped continues until the accessory power supply is shut off. When the accessory power supply is turned off and then again supplied or input, the accessory is activated in a state in which the second communication is available (the state in which the second communicator is operating).

Since the accessory for which the second communication stop information is "true" is the intermediate adapter (30 or 40) does not have the first communication controller, not only the second adapter communicator (308 or 408) but also the adapter controller (309 or 409) and the adapter operation unit (310 and 410) may also be stopped. In this case, the accessory transfers to the sleep state and does not restart until the accessory power is again supplied after it is shut off.

The camera controller 205 does not perform the communication with the accessory whose second communication stop information is "true" through the second communication until the accessory power is again supplied to the accessory after the accessory authentication communication. Hence, the camera controller 205 saves (stores) the second communication stop information until the power supply to the accessory is stopped. Then, when the power supply to the accessory is stopped, the second communication stop information stored until then is initialized. If the accessory identification information acquired in the accessory authentication communication is unnecessary, the camera controller 205 discards it.

Accessories that do not perform the communication through the second communication after the accessory authentication communication include the interchangeable lens that communicates with the camera controller 205 only through the first communication, the intermediate adapter that does not have the operation member, etc. The intermediate adapter having no operation member does not need to perform the communication in the normal operation state after the accessory authentication communication, and it is thus unnecessary to save the adapter identification information so as to designate the communication target in the P2P communication. However, in order for the camera controller 205 to grasp the number of accessories connected to the camera body 20, the instant intermediate adapter needs to perform the accessory authentication communication.

The timing when the accessory stops the second communication may be the timing when the accessory authentication communication with all the accessories end, or the timing when each accessory ends its own accessory authentication communication.

The camera controller 205 grasps the number of attached accessories while sequentially performing the accessory authentication communication through the second communication for a plurality of accessories attached to the camera body 20. For power saving and high communication quality, when a predetermined number or more of accessories are attached, a warning operation may be made to the user, or the function of any accessory may be limited.

The details of the processing of the camera controller 205 to acquire the second communication stop information from the accessory through the second communication will be described later. Since S403 and S404 are performed with different communication paths, the camera controller 205 may perform these steps in parallel or sequentially in any order. The camera controller 205 having acquired the lens identification information, the accessory authentication information, and the second communication stop information in S403 and S404, proceeds to S405.

Thereafter, the first communication is used for the communication in which the camera controller 205 acquires the status information of the interchangeable lens 10 and for the communication that transmits the control parameter to the interchangeable lens 10, and other communications are performed through the second communication.

In S405, the camera controller 205 designates the communication target accessory by notifying the interchangeable lens 10 and the intermediate adapters 30 and 40 of the accessory identification information of the communication target accessory through the broadcast communication. Then, the accessory detailed information is acquired through the P2P communication from the communication target accessory whose second communication stop information is "false". The accessory detailed information includes information indicating the function of each accessory, operation function information, information on the user interface, etc., such as including the operation member, e.g., an operation ring and a slide switch, and the optical characteristic is variable by operating the operation member. The accessory detailed information includes accessory name information when recorded in a captured image file. The accessory detailed information also includes a communication request factor (which will be described later) that may occur in the accessory. Thus, the accessory detailed information includes various information on the corresponding accessory, and has a data amount larger than that of the accessory authentication information.

Since the setting and state of the accessory may change according to the camera information such as the model and the firmware version of the camera body 20, the camera controller 205 transmits the camera information to the communication target accessory in this step.

The accessory detailed information has a data size larger than that of the information exchanged in the accessory authentication communication. Since it is unnecessary to exchange the accessory detailed information with an accessory whose second communication stop information is "true", the communication amount can be reduced by using the second communication stop information.

In S406, the camera controller 205 sets an accessory whose second communication stop information is "false" in order to transfer the state to the normal operation state. Herein, the operation member of the accessory is set through the second communication, and the processing will be described later. Herein, the accessory whose second communication stop information is "true" is not set.

The flow from the next S407 to S408 and back to S407 indicates the normal operating state of the camera system. In the normal operation state, the camera controller 205 resets the accessory through the second communication, and acquires change information from the accessory. The change information contains, for example, information on the operation amount when the operation member of the accessory is operated, information indicating the change in the optical information when the optical member such as the ND filter is inserted, and information indicating that any reset processing of the accessory has been performed. Similar to S406, the accessory is reset when the camera controller 205 designates the communication target accessory by notifying the accessory identification information of the communication target accessory through the broadcast communication, and then performs the P2P communication with the communication target accessory.

The camera controller 205 may periodically inquire the target accessory about change information. However, when the change information is the information of the operation amount of the operation member, "operation amount=0" is returned in most cases due to the limited time during which the operation member is operated. Therefore, in order to prevent the unnecessary communication, when the operation member is operated instead of polling, the accessory may request the camera controller 205 for the communication and the camera controller 205 may receive the communication request and obtain the change information.

In S407, the camera controller 205 determines whether the setting of the accessory needs to be changed, for example, by changing the setting of the camera body 20 by the user. If it is necessary to change the setting of the accessory, the camera controller 205 proceeds to S406 to reset the accessory, and proceeds to S407 to return to the normal operation state.

On the other hand, when it is unnecessary to change the setting of the accessory in S407, the camera controller 205 proceeds to S408. In S408, the camera controller 205 determines whether there is a communication request from the accessory. The communication request from the accessory is made when the accessory makes low the CS signal line. The camera controller 205 may detect that the CS signal line has become low by generating an interrupt in detecting a trailing edge or by detecting the level of the CS signal line through polling.

The camera controller 205 when detecting the communication request from the accessory proceeds to S409 and performs the communication request processing for the accessory whose second communication stop information is "false". Initially, the camera controller 205 inquires the accessory about the factor (or cause) of the communication request (referred to as a communication request factor (or cause) hereinafter). The accessory whose second communication stop information is "true" has stopped the second communication and thus does not make a communication request, so there is no need to inquire it about the communication request factor. Then, when the camera controller 205 receives the communication request factor as the second information corresponding to the communication request factor from the accessory, the camera controller 205 performs processing corresponding to the communication request factor and returns to S406.

Use the second communication stop information can thus avoid extra (unnecessary) communications for the setting or communication request for the accessory which needs no communications. This configuration can reduce the time required to start the camera system and the time required to acquire the change information from the accessory. The power consumption of the accessory that does not use the second communication can be reduced.

In order to realize this method, it is important that the accessory that has transmitted the second communication stop information keeps stopping the second communication until the power is turned on again. This is because the camera controller 205 cannot detect that the accessory that has transmitted the second communication stop information validates the second communication due to a trigger other than the power reconnection. Therefore, that accessory cannot be a communication target for acquiring the setting and the communication request factor.

Figure 5A:
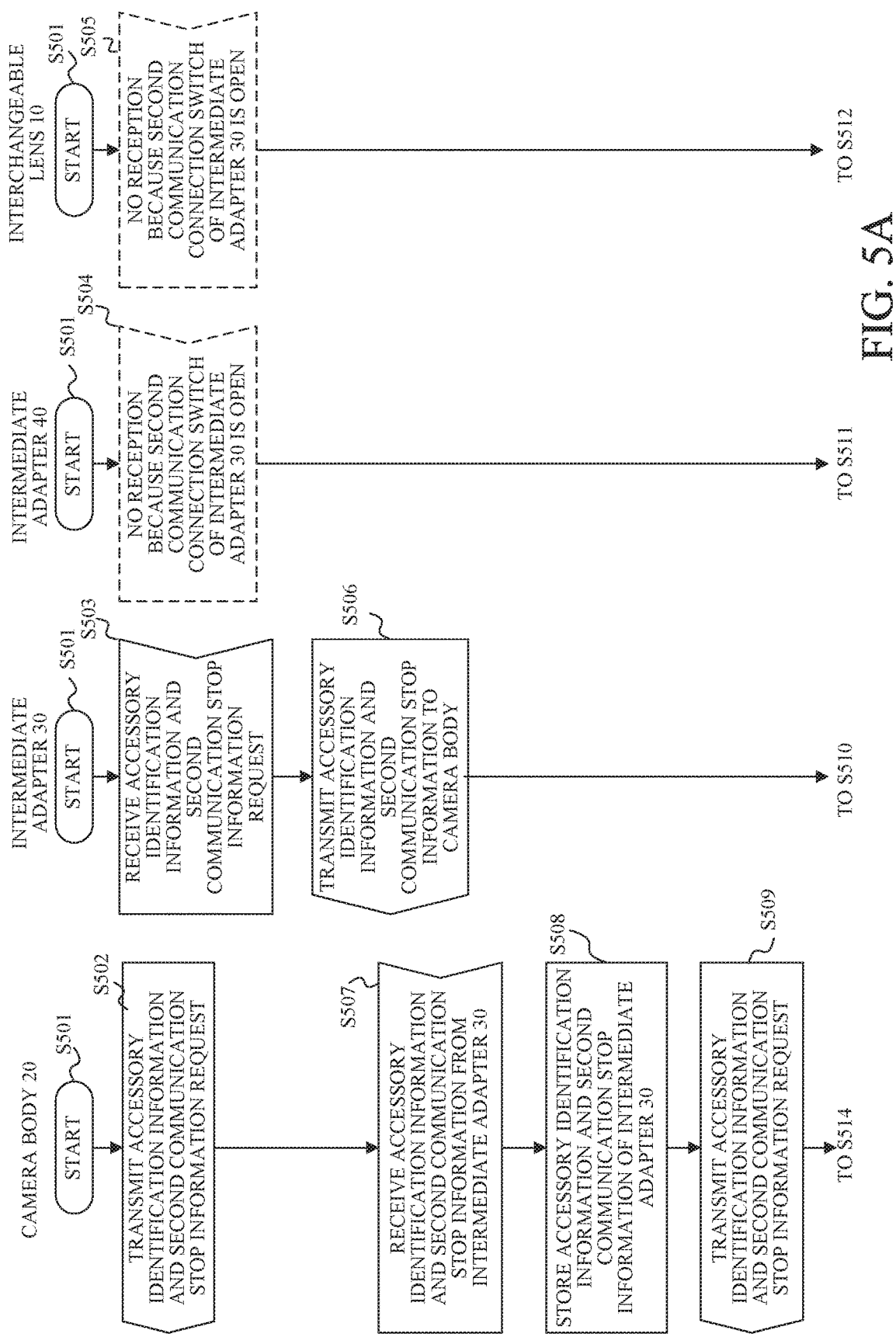
FIGS. 5A to 5C illustrate a flowchart of processing of the camera body to acquire accessory identification information and the second communication stop information according to the first embodiment.
Figure 5B:
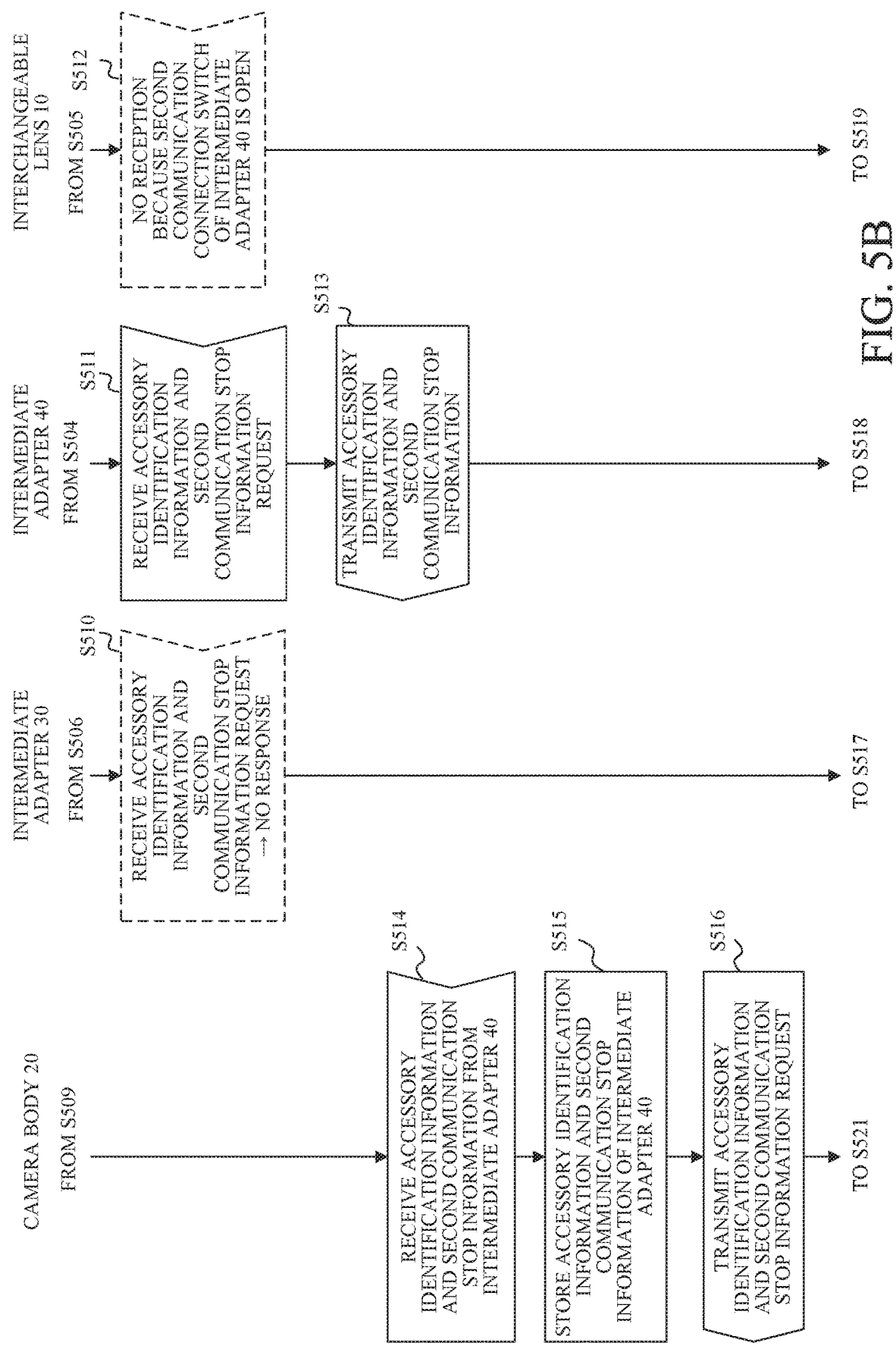
Figure 5C:
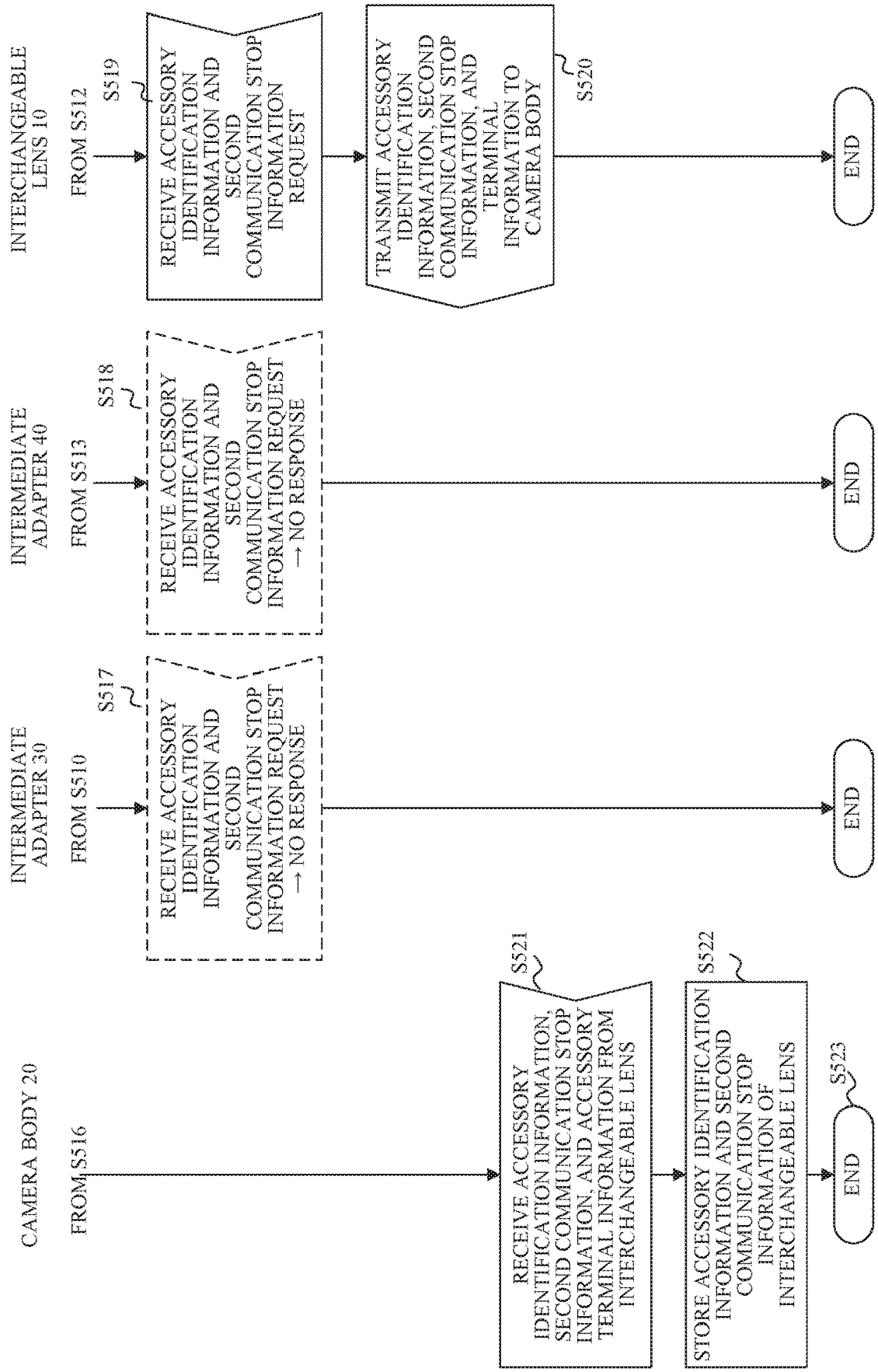

Referring now to a flowchart in FIGS. 5A to 5C, a description will be given of authentication communication processing as an initial communication performed by the camera body 20 (camera controller 205) and the accessory (adapter controllers 309 and 409 and lens controller 113) in S404 of FIG. 4. In the authentication communication, the camera controller 205 acquires accessory authentication information from the accessory. As described above, the accessory authentication information includes the accessory identification information and the second communication stop information.

In S502, the camera controller 205 that has started this processing in S501 transmits an authentication information request as a first request to the adapter controller 309 in the intermediate adapter 30 through the second communication.

The adapter controller 309 that has received the authentication information request in S503 proceeds to S506, and transmits the accessory authentication information of the intermediate adapter 30 to the camera controller 205 through the second communication. The accessory authentication information includes accessory identification information and second communication stop information.

The second communication stop information indicates "true" if the intermediate adapter 30 stops the second communication after the authentication communication ends, and "false" if the second communication is not stopped. Termination information indicates that it is the terminal of the second communication viewed from the camera body 20. When the intermediate adapter 30 is the terminal of the second communication viewed from the camera body 20, the terminal information is transmitted in addition to the accessory authentication information to indicate the "terminal".

In the one-to-many communication like the second communication, the transmission destination can be designated by adding the accessory identification information to the top of the communication data or the like. Since the camera controller 205 does not have any accessory information at the stage of S502, the transmission destination cannot be designated by the communication data. Accordingly, an illustrative means by which the camera body 20 sequentially communicates with a plurality of accessories can use a method using the second communication connection switches 311 and 411 provided in the intermediate adapters 30 and 40 as follows. In the normal operation state, assume that the second communication connection switches 311 and 411 are in the connection state.

The camera controller 205 notifies each accessory of start information of this processing through the broadcast communication in the second communication in S501. Since the second communication connection switches 311 and 411 are in the connected state, each accessory receives the start information of this processing.

The adapter controllers 309 and 409 having received the start information of this processing switch the second communication connection switches 311 and 411 to the disconnection state. Thereby, only the adapter controller 309 is connected to the camera controller 205, and data transmitted by the camera controller 205 can be received. The adapter controller 309 that has completed processing the received data switches the second communication connection switch 311 to the connection state, whereby the adapter controller 409 of the intermediate adapter 40 can receive the data transmitted by the camera controller 205. On the other hand, the adapter controller 309, which has switched the second communication connection switch 311 to the connection state, does not respond to the notice transmitted from the camera controller 205 until the processing completion information transmitted by the camera controller 205 is received in S522 in which this flow ends.

Thereafter, the adapter controller 409 that has finished processing the received data switches the second communication connection switch 411 to the connection state as described later, and the lens controller 113 can receive the data transmitted by the camera controller 205. Thus, the camera controller 205 can sequentially communicate with a plurality of accessories.

In S504 and S505, since the second communication connection switch 311 is in the disconnected state, the adapter controller 409 and the lens controller 113 do not receive the authentication information request transmitted from the camera controller 205.

In S506, the adapter controller 309 transmits the accessory authentication information of the intermediate adapter 30 to the camera controller 205 through the second communication. Then, the adapter controller 309 switches the second communication connection switch 311 to the connection state. Thereby, as described above, the adapter controller 409 can receive data transmitted by the camera controller 205.

The camera controller 205 that has received the accessory authentication information from the intermediate adapter 30 in S507 proceeds to S508, and stores the received accessory authentication information. Thereafter, the camera controller 205 proceeds to S509. In S509, S511, and S513 to S515, the camera controller 205 acquires accessory authentication information from the intermediate adapter 40, similar to S502, S503, and S506 to S508.

In S510, the adapter controller 309 receives the authentication information request transmitted by the camera controller 205, but does not respond because it has not received the terminal information of this processing. In S512, since the second communication connection switch 411 is in the disconnected state, the lens controller 113 does not receive the authentication information request transmitted from the camera controller 205 in S511.

This embodiment is an example in which totally three accessories of one interchangeable lens 10 and two intermediate adapters 30 and 40 are connected to the camera body 20. However, only one intermediate adapter may be connected, or three or more intermediate adapters may be connected. Since any number of intermediate adapters can be mounted, the processing of acquiring the accessory authentication information may be terminated by acquiring the termination information from the last accessory (interchangeable lens).

The termination information from the last accessory may be obtained by another method. For example, similar to S502 and S509, when the camera controller 205 transmits an authentication information request to the accessory on the assumption that the intermediate adapter is attached, the termination information returned from the second lens communicator 115 may be used to notify that the responding accessory is the interchangeable lens. The intermediate adapter 40 may detect that itself is the terminal based on the connection state of the unillustrated terminal and notify the camera body 20 of the terminal information in S513. This embodiment will discuss that the lens controller 113 notifies the terminal information by returning the accessory authentication information including the terminal information in response to the authentication information request from the camera controller 205.

In S516, similar to S502 and S509, the camera controller 205 transmits an authentication information request to the accessory through the second communication. In S517 and S518, similar to S510, the adapter controllers 309 and 409 do not respond because they have not received the terminal information of the processing.

In S519, the lens controller 113 that has received the authentication information request proceeds to S520, and transmits the accessory authentication information to the camera controller 205 through the second communication. Since the interchangeable lens 10 is the terminal of the second communication viewed from the camera body 20, the accessory authentication information from the lens controller 113 contains the terminal information.

The camera controller 205 that has received the accessory authentication information from the lens controller 113 in S521 proceeds to S522, and stores the received accessory authentication information. Then, the camera controller 205 proceeds to S523 according to the termination information included in the stored accessory authentication information, terminates this processing (authentication communication), and notifies each accessory of the terminal information of this processing through the broadcast communication by the second communication.

The accessory whose second communication stop information is "true" stops the second communication according to the terminal information and does not respond to the second communication until the power is turned on again. When the accessory whose second communication stop information is "true" is the intermediate adapter (30 or 40), the operation of the adapter controller (309 or 409) may be stopped in order to reduce the power consumption. If the accessory whose second communication stop information is "true" is the interchangeable lens 10, the second communication is stopped, but the first communication is available, so the lens controller 113 performs its operation.

As described above, the camera body 20 sequentially communicates with the plurality of accessories 30, 40, and 10 through the second communication connection switches 311 and 411. However, other methods may be used as long as they can communicate with multiple accessories. For example, what number the accessory is mounted from the camera body can be recognized by detecting the voltage level of the unillustrated terminal connected to the accessory itself. In this case, the number of authentication information requests transmitted from the camera body may be counted, and the accessory authentication information may be transmitted to the camera body only when it matches its mounting order.

Figure 6A:
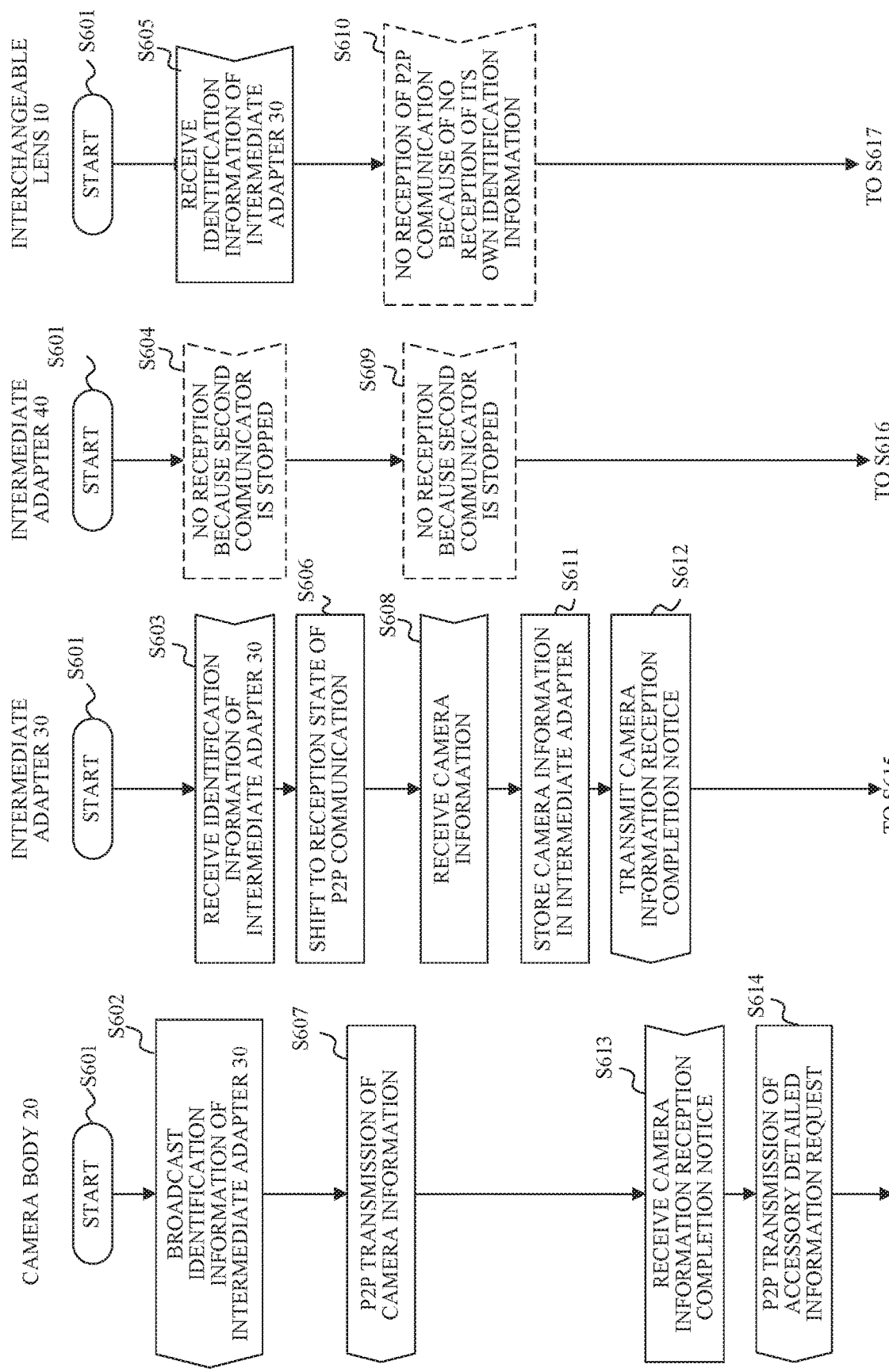
FIGS. 6A and 6B illustrate a flowchart of processing of the camera body to acquire accessory detailed information according to the first embodiment.
Figure 6B:
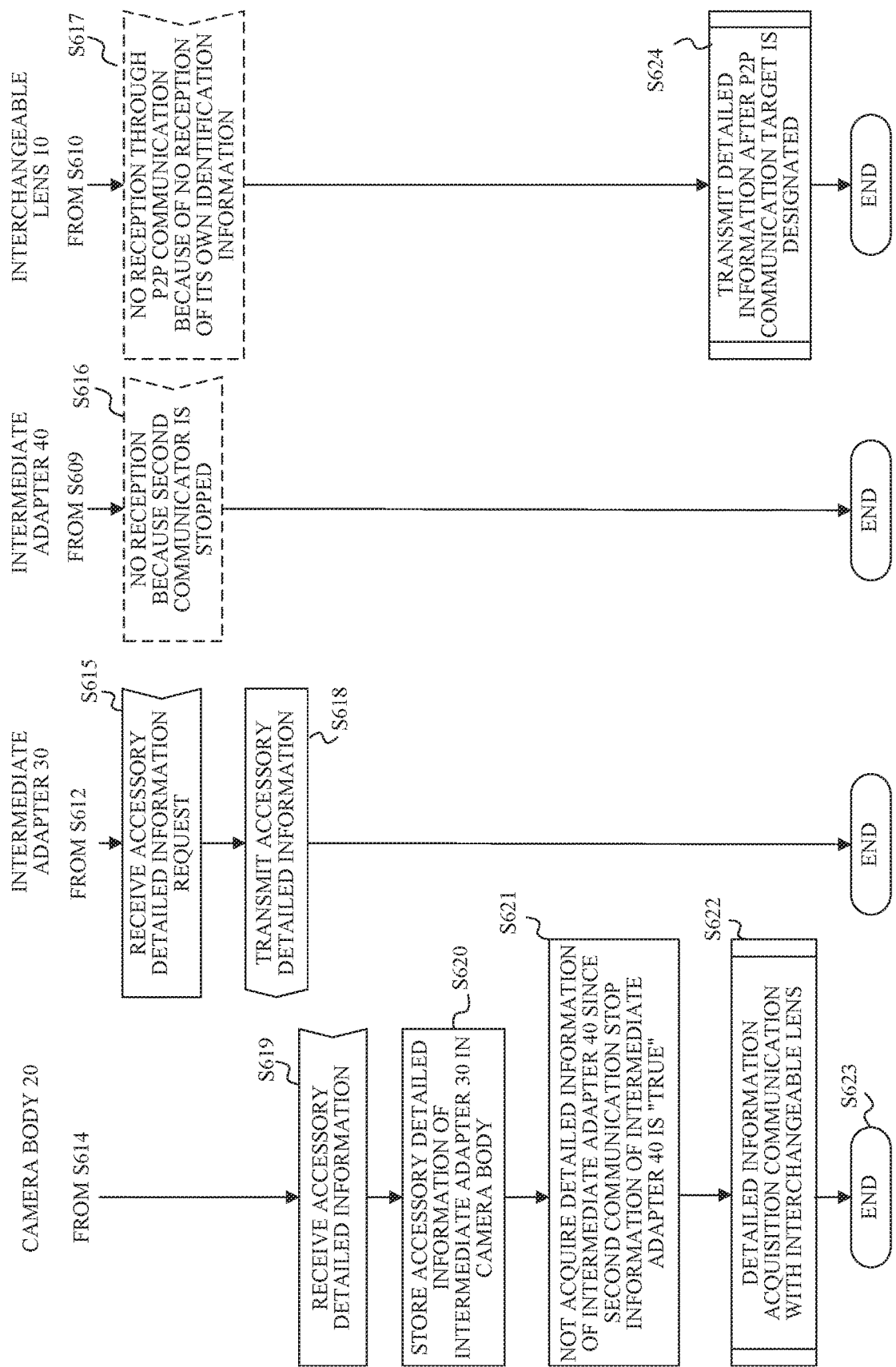

Referring now to a flowchart in FIGS. 6A and 6B, a description will be given of processing of the camera controller 205 to acquire the accessory detailed information through the second communication from the accessory that has not stopped the second communication after the authentication communication ends in S405 in FIG. 4. Now assume that the second communication stop information of the intermediate adapter 30 and the interchangeable lens 10 is "false" and the second communication stop information of the intermediate adapter 40 is "true".

The camera controller 205 that starts this processing in S601 proceeds to S602, and sends the accessory identification information of the intermediate adapter 30 acquired in the authentication communication to each accessory through the broadcast communication by the second communication in order to perform the P2P communication with the intermediate adapter 30. The accessory identification information of the intermediate adapter 30 is received by the intermediate adapter 30 and the interchangeable lens 10 in S603 and S605. In S604, since the intermediate adapter 40 has stopped the second communication, it does not receive the information transmitted by the broadcast communication.

The intermediate adapter 30 (adapter controller 309) that has received its own accessory identification information in S603 proceeds to S606, and transfers to the P2P communication. The interchangeable lens 10 (lens controller 113) also acquires the accessory identification information of the intermediate accessory 30 in S605, but does not perform the post-reception processing because it is different from its own accessory identification information. The adapter controller 309 performs the transfer processing to the P2P communication in S606 before making high the CS signal line.

When the broadcast communication of the accessory identification information ends, the camera controller 205 proceeds to S607, and transmits the above camera information to the adapter controller 309 through the P2P communication. In S608, the adapter controller 309 receives the camera information, and the proceeds to S611. In S609, the adapter controller 409 does not receive camera information because it stops the second communication. In S610, the lens controller 113 does not receive the camera information because it has not received the accessory identification information of the interchangeable lens 10.

In S611, the adapter controller 309 stores the received camera information. The adapter controller 309 changes the setting of the intermediate adapter 30 based on the camera information, and changes the accessory detailed information to be transmitted to the camera controller 205 in S615 if necessary. The adapter controller 309 having stored the camera information proceeds to S612, and transmits a camera information reception completion notice to the camera controller 205.

The camera controller 205 that has received the camera information reception completion notice in S613 proceeds to S614, and transmits an accessory detailed information request to the adapter controller 309 through the P2P communication. The accessory detailed information request is received by the adapter controller 309 in S615. In S616, the adapter controller 409 does not receive the accessory detailed information request. In S617, the lens controller 113 does not receive the accessory detailed information request because the accessory identification information received in S605 is different from its own identification information.

The adapter controller 309 that has received the accessory detailed information request proceeds to S618, and transmits the accessory detailed information to the camera controller 205 through the P2P communication. The camera controller 205 that has received the accessory detailed information in S619 proceeds to S620, and stores the received accessory detailed information of the intermediate adapter 30. The camera controller 205 performs processing for the setting and communication request for the intermediate adapter 30 based on this accessory detailed information. The flow up to this step is processing relating to the accessory detailed information for the intermediate adapter 30.

The camera controller 205, which has acquired the accessory detailed information of the intermediate adapter 30 as the first accessory from the camera body 20 in S620, proceeds to S621 so as to perform similar processing for the intermediate adapter 40 as the second accessory. Since the second communication stop information of the intermediate adapter 40 is "true", the camera controller 205 does not acquire the accessory detailed information from the intermediate adapter 40, and proceeds to S622 so as to acquire the accessory detailed information from the interchangeable lens 10 as the third accessory.

Since the second communication stop information of the interchangeable lens 10 is "false", the camera controller 205 acquires the accessory detailed information transmitted from the interchangeable lens 10 in S624 similar to S602 to S620 in S622. When the acquisition of the accessory detailed information is completed, the camera controller 205 proceeds to S623 and ends this flow because it has acquired the accessory detailed information of all the accessories Whose second communication stop information is recognized as "false" in the authentication communication.

Figure 7A:
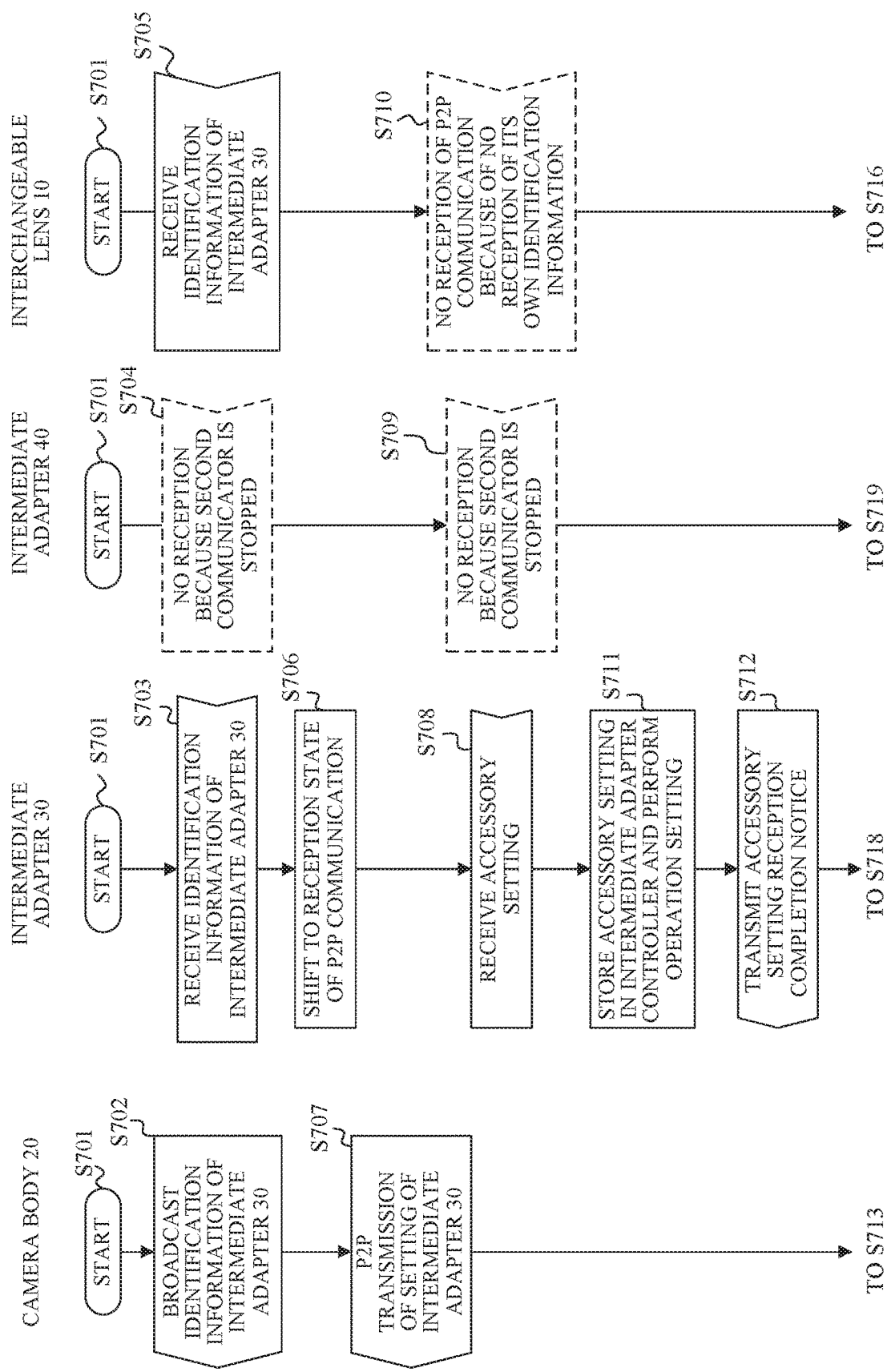
FIGS. 7A and 7B illustrate a flowchart of accessory operation setting processing according to the first embodiment.
Figure 7B:
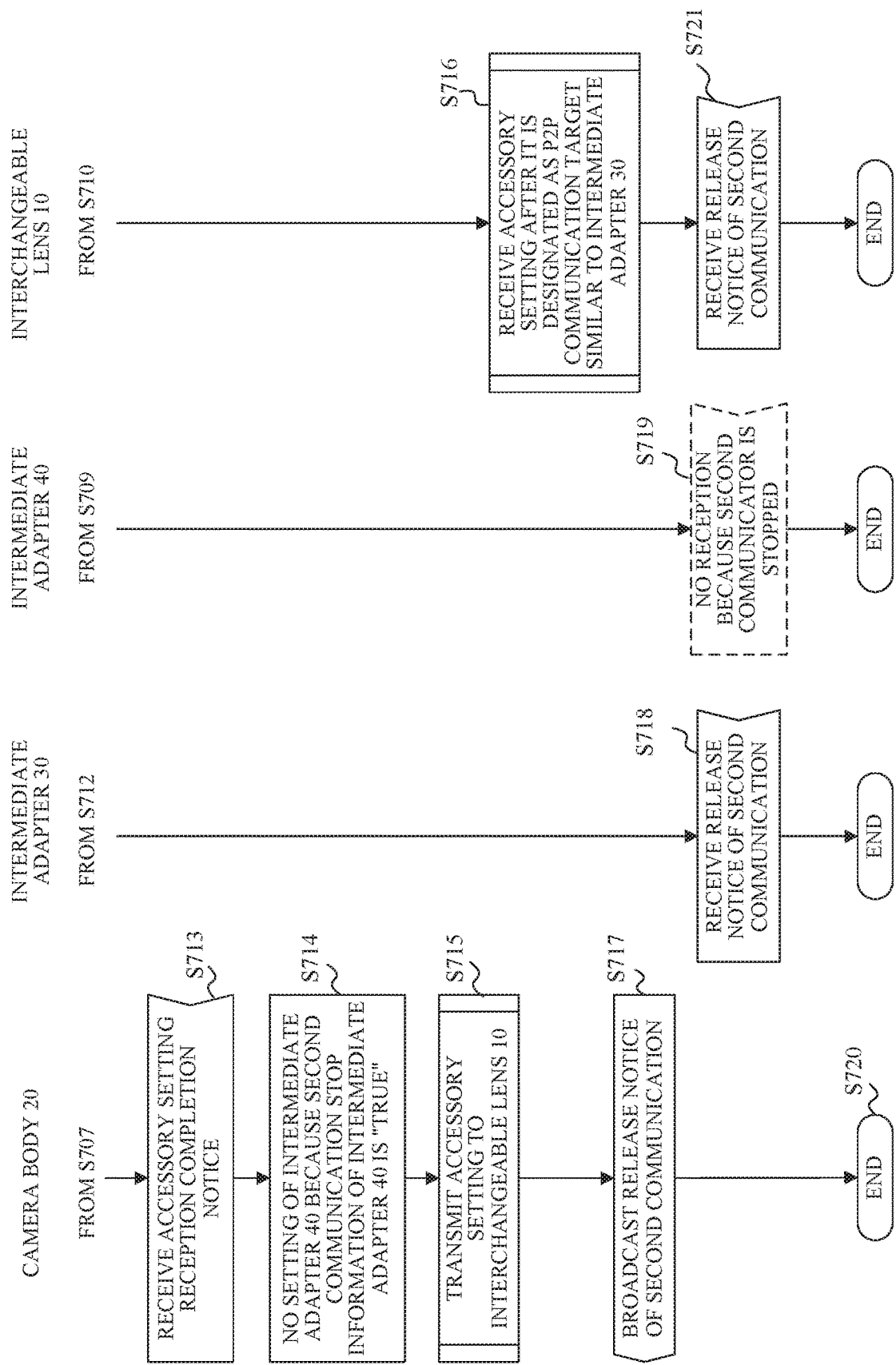

Referring now to a flowchart in FIGS. 7A and 79, a description will be given of processing of the camera controller 205 to set through the second communication the accessory that has not stopped the second communication in S406 in FIG. 4. Now assume that the second communication stop information of the intermediate adapter 30 and the interchangeable lens 10 is "false" and the second communication stop information of the intermediate adapter 40 is "true". This processing is performed not only after S405 in FIG. 4 but also when it is necessary to change the setting of the accessory, for example, when the setting of the camera body 20 is changed by the user operation or the like.

A basic flow of this processing is the same as the acquisition processing of the accessory detailed information in S405, and initially the camera controller 205 that starts this flow in S701 notifies each accessory of the accessory identification information of the intermediate adapter 30 through broadcast communication in S702. The intermediate adapter 30 (adapter controller 309) that has received its own accessory identification information in S703 transfers to the P2P communication in S706. In S704, the intermediate adapter 40 (adapter controller 409) whose second communication stop information is "true" does not receive the accessory identification information. In S705, the interchangeable lens 10 (lens controller 113) also receives the accessory identification information of the intermediate accessory 30.

Next, in S707, the camera controller 205 transmits information (accessory setting information) on the setting of the intermediate adapter 30 to the adapter controller 309. The adapter controller 309 that has received the accessory setting information in S708 makes settings, such as the operation of the intermediate adapter 30, according to the accessory setting information in S711, and sends the setting completion to the camera controller 205 in S712. In S713, the camera controller 205 receives the setting completion of the intermediate adapter 30. In S709, the adapter controller 409 does not receive the accessory setting information. In S710, the lens controller 113 does not receive the accessory setting information because the accessory identification information received in S705 is different from its own identification information. The camera controller 205 does not perform the above setting for the intermediate adapter 40 (S714). Then, the camera body 20 transmits the accessory setting to the interchangeable lens 20 in S715.

Next, in S716, the camera controller 205 sets the interchangeable lens 10 similar to the setting of the intermediate adapter 30 (S705, S710, and S716). Then, in S717, since the setting of all the accessories for which the second communication stop information is "false" is completed, the camera controller 205 transmits the release of the second communication band to each accessory through the broadcast communication so as to transfer to the normal operation state. The adapter controller 309 and the lens controller 113 that have received this communication in S718 and S721 determine that the communication request is permitted. This communication request permission state continues until the (normal) broadcast communication is again performed from the camera controller 205. In S719, the adapter controller 409 does not receive the release notice of the second communication band.

Referring now to a flowchart in FIGS. 8A and 8B, a description will be given of processing in which the camera controller 205 confirms the communication request factor for the accessory through the second communication and performs processing corresponding to the communication request factor in S409 in FIG. 4. Now assume that the second communication stop information of the intermediate adapter 30 and the interchangeable lens 10 is "false" and the second communication stop information of the intermediate adapter 40 is "true". A communication request is made from the intermediate adapter 30, and the communication request factor is that the adapter operation ring provided to the intermediate adapter 30 is operated.

A basic flow of this processing is also the same as the acquisition processing of the accessory detailed information in S405, and initially the camera controller 205 that has started this flow in S801 notifies each accessory of the accessory identification information of the intermediate adapter 30 through the broadcast communication in S802. The intermediate adapter 30 (adapter controller 309) that has received its own accessory identification information in S803 transfers to the P2P communication in S806. In S804, the intermediate adapter 40 (adapter controller 409) whose second communication stop information is "true" does not receive the accessory identification information. In S805, the interchangeable lens 10 (lens controller 113) also receives the accessory identification information of the intermediate accessory 30.

Next, in S807, the camera controller 205 transmits a communication request factor transmission request to the adapter controller 309. The adapter controller 309 that has received the communication request factor transmission request in S808 transmits the communication request factor to the camera controller 205 in S811. In S809, the adapter controller 409 does not receive the communication request factor transmission request. In S810, the lens controller 113 does not receive the communication request factor transmission request because the accessory identification information received in S805 is different from its own identification information.

The camera controller 205 that has received the communication request factor in S812 determines that the communication request factor is the operation of the adapter operation ring at S813, and transmits a transmission request for the operation amount to the adapter control section 309 in S814. The adapter controller 309 that has received the operation amount transmission request in S815 transmits the operation amount of the adapter operation ring to the camera controller 205 in S818. In S816, the adapter controller 409 does not receive the operation amount transmission request. In S817, the lens controller 113 does not receive the operation amount transmission request because the accessory identification information received in S805 is different from its own identification information.

The camera controller 205 that has received the operation amount in S819 reflects the operation amount on the setting of the camera body 20 in S820. More specifically, when the adapter operation ring serves to change the aperture value (F-number) (Av), the camera controller 205 changes the Av setting used to calculate the exposure value (Ev) and the shutter speed (Tv) in the camera body 20. If necessary, the Av control amount may be transmitted to the interchangeable lens 10 through the first communication, and the interchangeable lens 10 (lens controller 113) may be instructed to change the F-number. The camera controller 205 does not transmit a communication request factor transmission request to the intermediate adapter 40 (adapter controller 409) whose second communication stop information is "true" (S821).

Next, in S822, the camera controller 205 transmits a communication request factor transmission request to the lens controller 113. Although the camera controller 205 has already acquired the communication request factor from the intermediate adapter 30, the communication request factor may occur in the interchangeable lens 10 at the same time and the camera controller 205 inquire the lens controller 113 about the communication request factor. The lens controller 113 that has received the communication request factor transmission request in S823 transmits the communication request factor to the camera controller 205 if the communication request factor occurs in the interchangeable lens 10.

Thus, when the acquisition of the communication request factor from all the accessories that may cause the communication request factors is completed, the camera controller 205 proceeds to S824 and notifies each accessory of the second communication band release notice so as to transfer to the normal operation state through the broadcast communication. The adapter controller 309 and the lens controller 3 that have received this communication in S825 and S828 determine that the communication request is permitted. This communication request permission state continues until the (normal) broadcast communication is again performed from the camera controller 205. In S826, the adapter controller 409 does not receive the release notice of the second communication band.

If the communication request factor occurs after the adapter controller 309 and the lens controller 113 receive the communication request factor transmission request, the adapter controller 309 and the lens controller 113 make a communication request to the camera controller 205 after receiving the release notice of the second communication band. More specifically, this case occurs where the operation member of the intermediate adapter 30 is operated between S818 and S825, or the communication request factor other than the operation of the operation member is generated in the intermediate adapter 30 between S811 and S825. In these cases, after receiving the release notice of the second communication band, the adapter controller 309 sends a communication request to the camera controller 205.

This embodiment separately includes a first communication path that enables a communication between the camera body 20 and the interchangeable lens 10, and a second communication path that enables a communication between the camera body 20 and all the accessories (the interchangeable lens 10 and the intermediate adapters 30 and 40). The second communication is performed through the second communication path, which sets all accessories and responds to a communication request from each accessory. The communication amount can be reduced by specifying the communication target accessory based on the second communication stop information acquired in the authentication communication in setting the accessory and responding to the communication request.

On the other hand, the second communication can be stopped by the accessory that has transmitted "true" as the second communication stop information. An accessory having no communication means other than the second communication, such as the intermediate adapters 30 and 40 in this embodiment, can stop the operation of the adapter controller. Thus, the power consumption of the accessory can be reduced by providing the second communication stop information.

The camera body 20 does not request the accessory whose second communication stop information acquired in the authentication communication is "true", to transmit the accessory detailed information. Thus, this accessory does not need processing for determining the target of the P2P communication based on the accessory identification information transmitted through the broadcast communication or processing in response to the inquiry of the accessory detailed information, etc., and may respond to the authentication communication, thereby reducing the cost of the accessories.

Second Embodiment

Next follows a description of a second embodiment according to the present invention. The first embodiment explains a process of acquiring the second communication stop information of each accessory in the authentication communication just after each accessory is attached to the camera body 20, and of determining the accessory to be the target of the second communication based on it. On the other hand, this embodiment describes processing where the second communication stop information is set to "true" after the state is transferred to the normal operation state.

This processing is necessary where the product name, optical information, etc. of the accessory are notified to the camera body through the accessory detailed information and the accessory may stop the second communication when the state is transferred to the normal operation state because the accessory resetting or communication request does not occur. Another case is that the accessory transfers to a state that does not need the second communication due to the change of its setting.

One method of the accessory to notify the camera body that the accessory has stopped the second communication is that the accessory makes a communication request to the camera body and notifies that the second communication is stopped as a communication request factor. Another method is to previously associate the state transition of the accessory and the stop of the second communication of the accessory with each other, and to determine that the accessory stops the second communication when the camera body sets the accessory as the second communication stops. Still another method is to cause the camera body to restart with the authentication communication according to a communication error or a communication request factor.

A description will now be given of a method for notifying the second communication stop as the communication request factor. The processing described with reference to FIG. 4 in the first embodiment enables the communication request after S406 ends, the release notice of the second communication band is sent to each accessory through the broadcast communication, and the accessory receives the notice (S717). Thus, the accessory whose second communication stop information is "false" in the authentication communication needs to respond to the communication in the accessory detailed information acquisition processing (S405) and the communication for setting the accessory (S406). When the accessory stops the second communication after transmitting the accessory detailed information to the camera body, the accessory sends a communication request to the camera body just after the processing in S406 ends. Then, it notifies as the communication request factor that the second communication stop information has changed from "false" to "true", and then stops the second communication. The camera body that has received the communication request factor does not perform the second communication with the accessory thereafter.

Similar processing is performed when the accessory transfers to the state that does not need the second communication due to the setting change. More specifically, in response to the setting change or the like of the camera body, the setting of the accessory is changed in S406. Since each accessory is notified of the release of the second communication hand through the broadcast communication when S406 ends, the accessory whose second communication stop information has been turned into "true" by the subsequent communication request notifies the camera body of that fact.

Thus, the accessory whose second communication stop information is "false" in the authentication communication can notify the camera body of the fact when the second communication stop information becomes "true".

In other words, the accessory can stop the second communication in response to the state transition, and can further notify the camera body that the second communication has been stopped. This configuration can stop the second communication after the necessary communication is made such as the communication of the accessory detailed information and the communication for setting the accessory, reduce the communication amount and power consumption, and communicate the accessory detailed information through the second communication.

Third Embodiment

Next follows a third embodiment according to the present invention. The first embodiment has described the processing where the second communication stop information is "true" in the authentication communication, and the second embodiment has described that the second communication stop information becomes "true" after the state transfers to the normal operation state. This embodiment describes a method of notifying the camera body that the second communication stop information of the accessory stopping the second communication changes from "true" to "false".

Rarely, the second communication stop information changes from "true" to "false", for example, when an accessory is affected by the disturbance and unexpected reset processing occurs. If the unexpected reset processing occurs, the accessory returns to its initial state. The accessory in the initial state does not stop the second communication because it has not notified the camera body of the second communication stop information. In order for the accessory to stop the second communication, it is necessary to transmit the second communication stop information to the camera body. On the other hand, even if the accessory tries to send a communication request to the camera body to notify the second communication stop information, the camera body recognizes that the second communication of the accessory is stopped and thus does not inquire the accessory of the communication request factor. Thus, the normal communication request cannot notify the camera body that the second communication stop information of the accessory has been changed from "true" to "false".

Accordingly, this embodiment sets an arrangement in that the camera body retries the authentication communication when a communication error occurs in the broadcast communication. Thereby, when the accessory in which the reset processing has occurred intentionally invokes the communication error, the second communication stop information can be retransmitted to the camera proper 20 in the authentication communication to be performed again.

Figure 9:
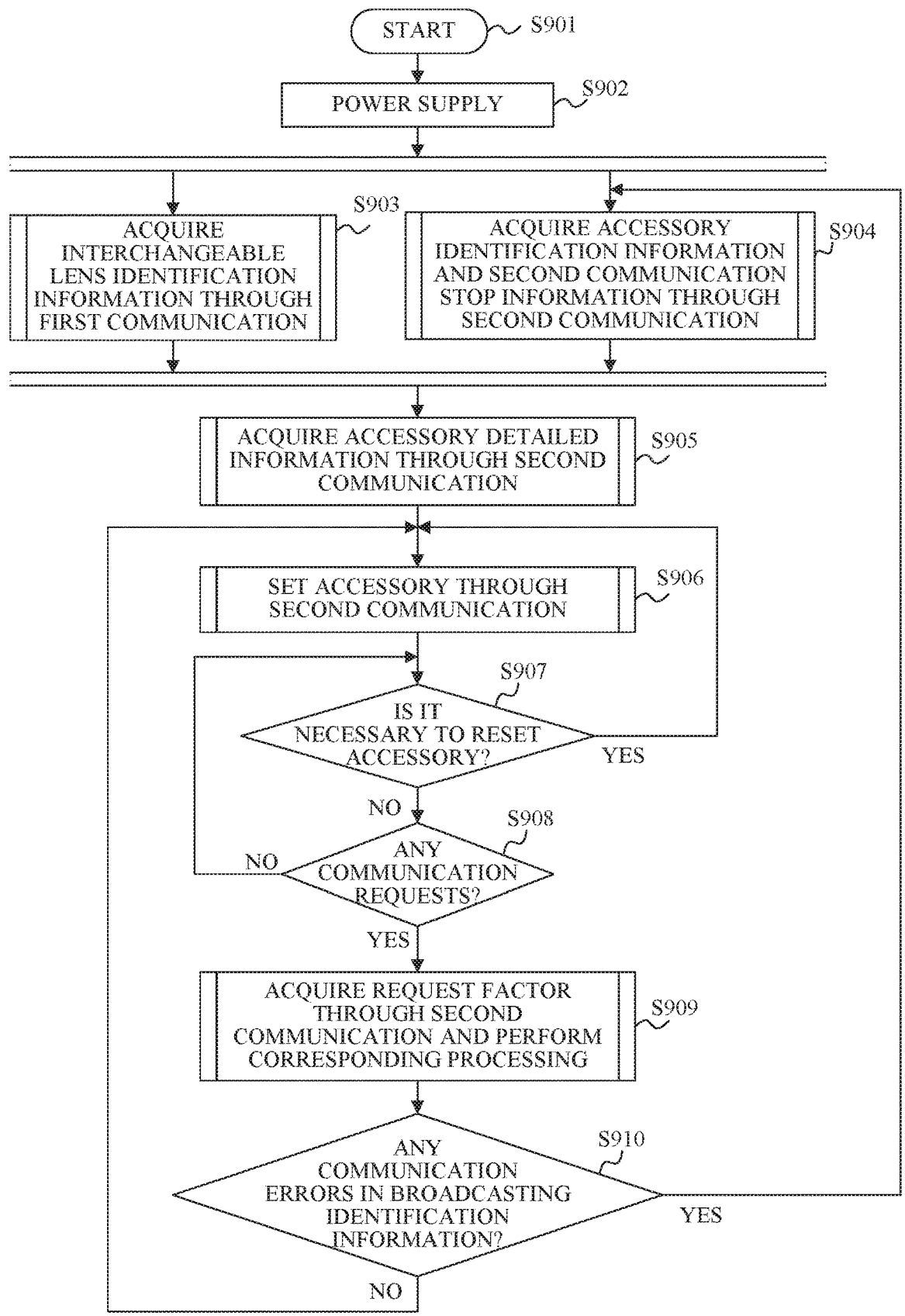
FIG. 9 is a flowchart showing processing for retrying an authentication communication due to a communication error according to a third embodiment of the present invention.

A flowchart in FIG. 9 describes retransmitting processing of the second communication stop information to the camera body 20 by invoking the communication error, when the unexpected reset processing occurs in the accessory that has stopped the second communication in the normal operation state. The processing of S901 to S908 in FIG. 9 are the same as the processing of S401 to S408 in FIG. 4.

In the normal operation state in which the flow proceeds from S907 to S908 and returns to S907, assume that the unexpected reset processing occurs in the intermediate adapter 40 which has stopped the second communication. The intermediate adapter 40 (adapter controller 409) where the reset processing has occurred turns on the ground switch 421 and makes low the CS signal line. The camera body 20 (camera controller 205) that has detected the low level of the CS signal line transfers from S908 to S909.

Figure 8A:
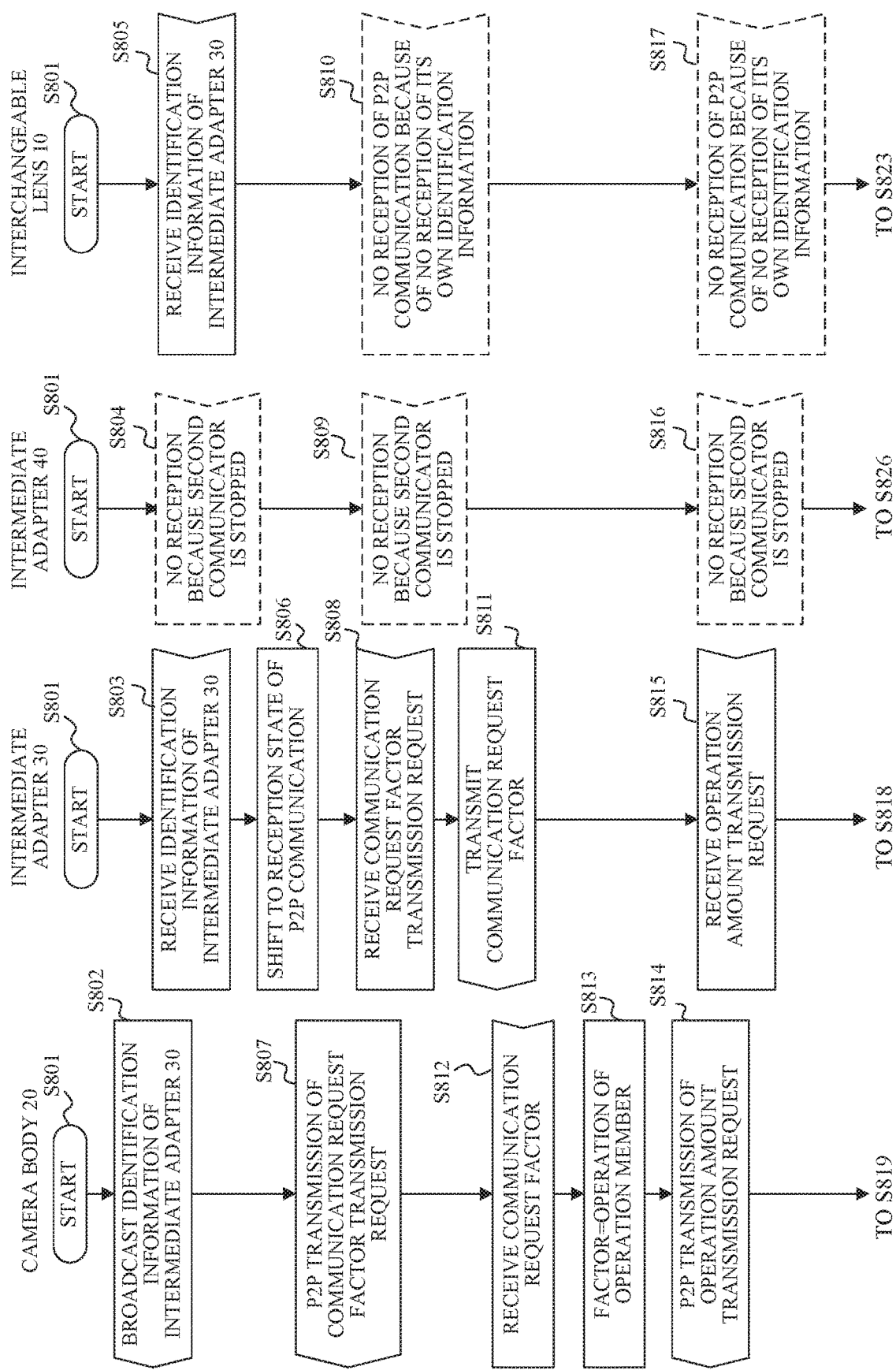
FIGS. 8A and 8B illustrate a flowchart of processing of the camera body to respond to a communication request from the accessory according to the first embodiment.
Figure 8B:
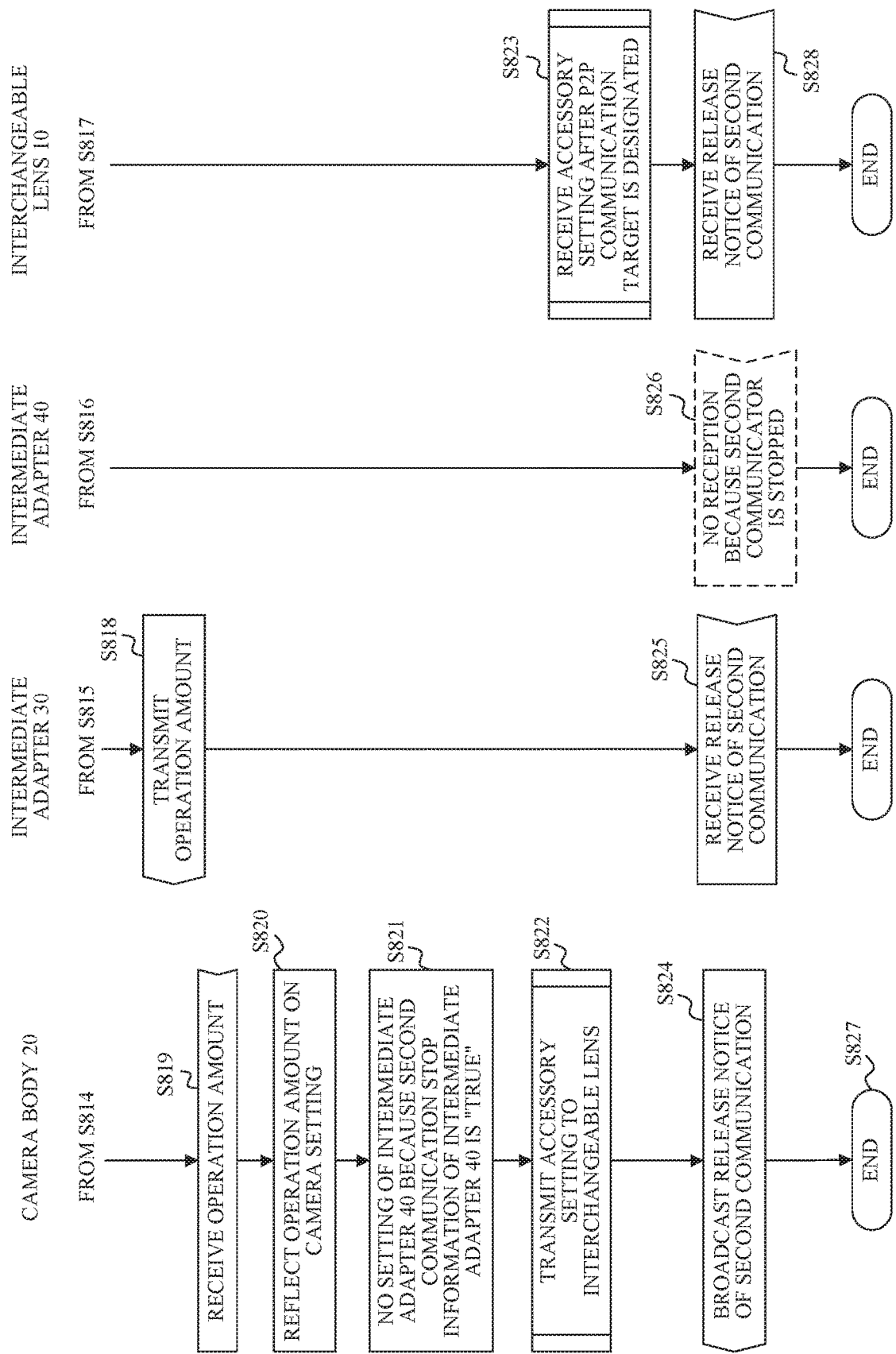

In S909, in order to acquire the communication request factor, the camera body 20 notifies each accessory of the accessory identification information of the intermediate adapter 30 whose second communication stop information is "false" (S802 in FIG. 8A). At this time, if the intermediate adapter 40 keeps the CS signal line low, the broadcast communication which is ended by the high level of the CS signal line does not end. Hence, when an permission time is provided for the state where the CS signal line is low and the low level state exceeds the permission time, the camera body 20 and the accessory can determine the communication error. When the communication error occurs in the broadcast communication of the first authentication communication of the communication request processing, the camera body 20 returns from S910 to S904 to perform the authentication communication. Thereby, the camera body 20 can again acquire (receive) the second communication stop information from the intermediate adapter 40 in which the unexpected reset processing has occurred. As described above, when the intermediate adapter 40 is restarted due to the unexpected reset, the state can transfer to the sleep state again by sending "true" as the second communication stop information. On the other hand, the "false" transmission as the second communication information may cause the camera body 20 to set the accessory and to acquire the communication request factor.

If there is no accessory whose second communication stop information is "false", the second communicators of all the accessories are stopped, so that the communication request is unlikely to occur. Hence, the camera body 20 may determine the communication error occurs when the communication request occurs, and return to S904 so as to perform the authentication communication.

This embodiment makes the arrangement that performs the authentication communication again when the signal control different from the normal communication protocol is made (or when the communication error occurs in the broadcast communication). Thereby, even when the unexpected reset processing occurs in the accessory that has stopped the second communication, and the second communication is resumed, the accessory can notify the camera body of the second communication stop information again and can stop the second communication again.

Where the accessory whose second communication is stopped would like to validate the second communication, the second communication stop information may be set to "false" and notified when the authentication communication is performed again. At this time, the accessory may transmit a request to discard the second communication stop information to the camera body, and the camera body may discard the received second communication stop information ("true") in response to the received discard request and again receive the new second communication stop information ("false") retransmitted from the accessory.

However, depending on the likelihood and frequency of using the second communication, the accessory can be recognized as the communication target accessory of the second communication without sending the "true" of the second communication stop information to the camera body 20.

Fourth Embodiment

Figure 10:
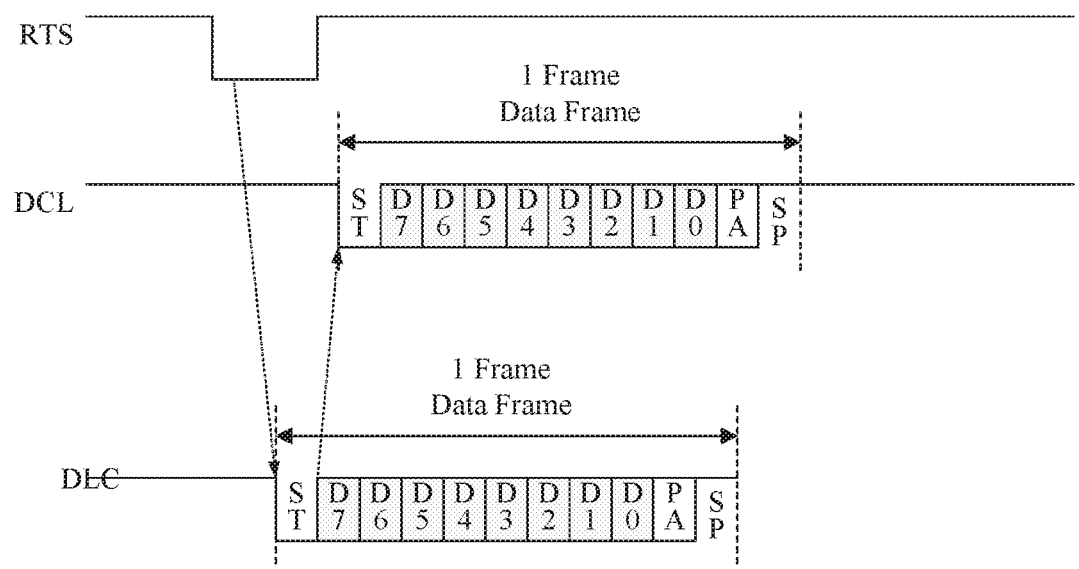
FIG. 10 illustrates a signal waveform in an asynchronous communication according to a fourth embodiment of the present invention.

Although FIGS. 2A and 2B describe the three-line clock synchronous communication using the first communication circuit, but may use the three-line asynchronous communication instead. FIG. 10 illustrates a signal waveform in the three-line asynchronous communication. The three-line asynchronous communication uses an RTS communication line (RTS) instead of the clock line (LCLK) illustrated in FIGS. 2A and 2B. The RTS communication line is a signal line used to transmit from the camera body (camera controller) to the interchangeable lens (lens controller signal for controlling timings of the communication by the camera-lens communication line (DCL) and the communication by the lens-camera communication line (DLC). For example, the RTS communication line is used for a notice of a transmission request (transmission instruction) of the lens data from the camera body to the interchangeable lens, a switching request of communication processing, or the like. A notice of the transmission request is performed by switching the signal level of the RTS communication line between the high level and the low level. In the following description, the signal supplied to the RTS communication line will be referred to as a transmission request signal RTS.

The transmission request signal RTS is sent from the camera body as the communication master to the interchangeable lens as the communication slave. When the interchangeable lens receives the transmission request signal RTS, as illustrated in FIG. 10, the signal level of the lens data signal DLC is low for one bit period in order to notify the camera body of the transmission start of one frame of the lens data signal DLC. This one bit period is called a start bit ST indicating the start of one frame. In other words, the data frame starts with this start bit ST. The start bit ST is provided to the first bit for each frame of the lens data signal DLC.

Next, the interchangeable lens transmits one-byte lens data in an 8-bit period from the next second bit to the ninth bit. The data bit arrangement starts with the most significant data D7 in the MSB first format, continues to data D6 and data D5 in this order, and ends with the least significant data D0. Then, the interchangeable lens adds one-bit parity information PA to the tenth bit, and makes high the signal level of the lens data signal DLC during the stop bit SP period indicating the end of one frame. Thereby, the data frame period starting with the start bit ST ends.

Each of the above embodiments enables the imaging apparatus to identify an accessory apparatus that does not need the communication, can reduce the unnecessary communication, and improve the urgency of the communication. In addition, after the accessory apparatus that does not require the communication is identified, that accessory apparatus transfers to the power saving state and thus the power consumption can be reduced.

Fifth Embodiment

Next follows a description of a fifth embodiment. A detailed description will be given of accessory identification information in each of the above embodiments.

Hereinafter, the accessory includes an interchangeable lens or an intermediate accessory.

In the following embodiments, each of the camera body, the interchangeable lens, and the intermediate accessory is generally referred to as a unit. In addition, each of the interchangeable lens and the intermediate accessory is generically referred to as an accessory.

Further, in the following embodiments, the accessory relating to a correction is an interchangeable lens or an intermediate accessory for which correction processing necessity information is "necessary".

In the following embodiments, the intermediate accessory relating to the correction is an intermediate accessory that requires the optical information of the interchangeable lens to be corrected.

In the following embodiments, a first accessory is an accessory that stores optical information of all other accessories.

In the following embodiments, the first intermediate accessory is an intermediate accessory having optical information of another intermediate accessory.

In the following embodiments, the first unit is a unit that stores optical information of all accessories.

The following embodiments considers whether each unit has optical information of another unit, but this does not necessarily relate to the sales date or manufacture date of the unit. For example, due to the firmware upgrade or the like, the optical information stored in each unit may change regardless of the release date or manufacture date of the unit.
<Configuration of Camera System (FIG. 11)>

The configuration of the camera system of this embodiment will be described with reference to FIG. 11.

The camera system has a first communication path serving as a communication path for transmitting a control command from the camera body 2000 to the interchangeable lens 1000 and for transmitting operation information and optical information from the interchangeable lens 1000 to the camera body 2000. It also has a second communication path serving as a communication path for transmitting operation information and optical information between the camera body 2000 and the plurality of intermediate accessories 3000 and 4000. Hereinafter, a communication performed through the first communication path will be referred to as a first communication, and a communication performed through the second communication path will be also referred to as a second communication.

Here, the first communication path communicates between a first communicator 20700 on the camera side and a first communicator 11400 on the lens side, via mounts 20200 and 30500, 30300 and 40500, 40300 and 10200, which will be described later. The first communicator 20700 on the camera side and the first communicator 11400 on the lens side are illustrative communication controllers.

Thus, a communication performed between a certain unit and one unit different from the certain unit will be referred to as a one-to-one communication in this embodiment.

Herein, the second communication path is a path through which the second communicator 20800 on the camera side communicates with the communicator of each accessory. At this time, the communication is performed from the second communicator 20800 on the camera side via the mounts 20300 and 30600 and at least part of the mounts 30400, 40600, 40400 and 10300. For example, the communicator 20800 on the camera side communicates with the second communicator 11500 on the lens side and the second communicators 30800 and 40800 on the intermediate accessory side through the second communication path. The communicator 20800 on the camera side, the second communicator 11500 on the lens side, the second communicator 30800 on the intermediate accessory side, and the second communicator 40800 on the intermediate communicator side are illustrative communication controllers.

Thus, the communication performed between a certain unit and a plurality of units different from the certain unit will be referred to as a one-to-many communication in this embodiment.

Figure 11:
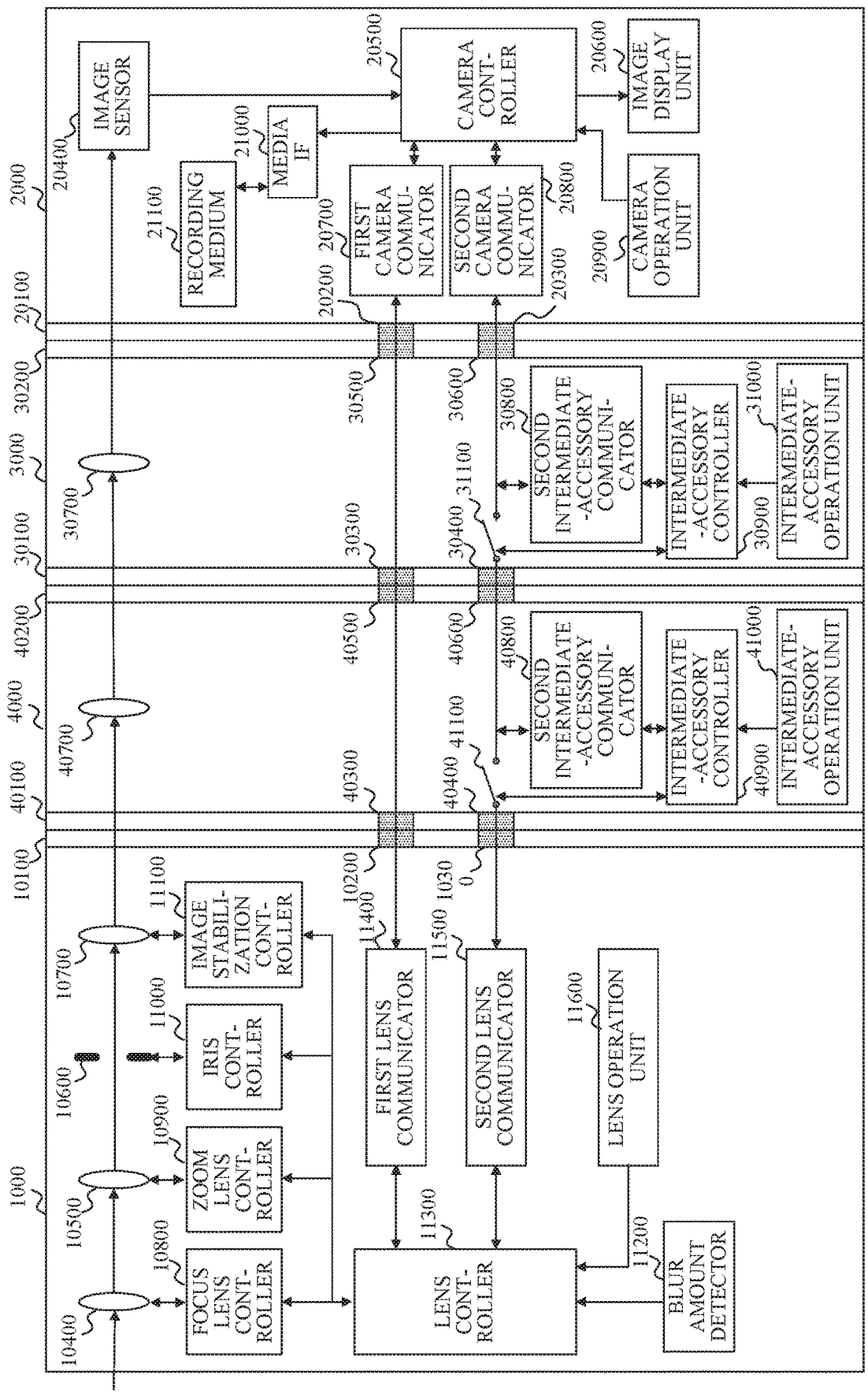
FIG. 11 is a block diagram for explaining a configuration of a camera system according to a fifth embodiment.

In FIG. 11, the interchangeable lens 1000 is an interchangeable lens that controls a movable optical member relating to imaging. The camera body 2000 is a camera body that captures an image. The intermediate accessories 3000 and 4000 are intermediate accessories such as an extender mounted between the interchangeable lens 1000 and the camera body 2000.

In the interchangeable lens 1000, the intermediate accessory 4000, the intermediate accessory 3000, and the camera body 2000, the mounts 10100 and 40100, 40200 and 30100, and 30200 and 20100 are detachably attached, respectively. Here, the mount 10100 is provided to the interchangeable lens 1000, the mount 40100 and the mount 40200 are provided to the intermediate accessory 4000, the mount 301 and the mount 30200 are provided to the intermediate accessory 3000, and the mount 20100 is provided to the camera body 2000.

First communication contacts 10200, 40300, 40500, 30300, 30500, and 20200, as contact terminals having one or more contacts for performing the first communication, are provided to the mounts 10100, 40100, 40200, 30100, 30200, and 20100. Herein, the first communication contacts 10200, 40300, 40500, 30300, 30500, and 20200 are electrically connected to one another when the interchangeable lens 1000, the intermediate accessories 3000 and 4000, and the camera body 2000 are connected to each other. In the fifth embodiment, the first communication is also used for the camera body 2000 to control the optical member of the interchangeable lens 1000.

The mounts 10100, 40100, 40200, 30100, 30200, and 20100 have second communication contacts 10300, 40400, 40600, 30400, 30600 and 20300 as contact terminals each having one or more contacts for performing the second communication. Herein, the second communication contacts 10300, 40400, 40600, 30400, 30600, and 20300 are configured to be conductive when the interchangeable lens 1000, the intermediate accessories 3000 and 4000, and the camera body 2000 are connected to each other. The fifth embodiment configures the second communication such that the camera body 2000 can perform the one-to-many communication with the intermediate accessories 3000 and 4000, and the interchangeable lens 1000.

Thus, the first communication path and the second communication path are different from each other and correspond to the first communication which is the one-to-one communication between the camera body 2000 and the interchangeable lens 1000 and the second communication which performs the one-to-many communications between the camera body and the plurality of accessories. Thereby, compared with these communications with a single communication path, for example, the interchangeable lens control instruction can be transmitted to the interchangeable lens at a more suitable timing in the first communication. Since the interchangeable lens control instruction can be quickly transmitted to the interchangeable lens at the timing intended by the camera body, a plurality of optical members mounted on the interchangeable lens can be quickly and accurately controlled.

The interchangeable lens 1000 includes a focus lens 10400, a zoom lens 10500, an iris 10600, an image stabilization lens 10700, which constitute an optical system, controllers (10800 to 11100) that control each optical member, a lens controller 11300 that controls the entire lens. The interchangeable lens 1000 further includes a first communicator 11400 on the lens side that performs the first communication, a second communicator 11500 on the lens side that performs the second communication, a blur amount detector 11200 that detects the blur amount, and a lens operation member 11600 which is an operation member provided to the interchangeable lens. Each configuration will be described.

The focus lens 10400 is configured to change the focus state of the captured image. The zoom lens 10500 is configured to zoom the captured image. The iris 10600 is configured to adjust the light amount of the captured image. The image stabilization lens 10700 corrects an image blur of an object image.

A focus lens controller 10800 detects a position and controls driving of the focus lens 10400. A zoom lens controller 10900 detects a position and controls driving of the zoom lens 10500. An iris controller 11000 detects a position and controls driving of the iris 10600. An image stabilization (IS) controller 11100 detects a position and controls driving of the image stabilization lens 10700. The focus lens controller 10800, the zoom lens controller 10900, the iris controller 11000, and the image stabilization controller 11100 each include, for example, a position sensor such as an absolute value encoder and a drive motor such as an ultrasonic motor or a stepping motor. A blur amount detector 11200 detects a vibration amount of the interchangeable lens 1000, and includes, for example, a gyro sensor.

A lens controller 11300 controls the lens, and has an unillustrated memory. The lens controller 11300 is an illustrative communication controller. A first lens communicator 11400 performs the first communication with the interchangeable lens 1000. A second lens communicator 11500 performs the second communication with the interchangeable lens 1000.

A memory included in the lens controller 11300 includes a rewritable nonvolatile memory, and stores control software (firmware) executed by the CPU and unique information and status information on the interchangeable lens 1000. The unique information is, for example, a model name (identification (ID) information), an optical characteristic, correction information, and the like. The state information includes, for example, the operating state (normal and safe modes), position information (or magnification) of the zoom lens 10500, the position information of the focus lens 10400, the F-number of the iris 10600, the position information of the image stabilization lens 10700, the firmware version and update status, etc. However, it is not limited to these examples. The memory also stores a program to be executed in operating the interchangeable lens 1000 in the safe mode described later.

The lens controller 11300 has a programmable processor, such as a CPU, and realizes various operations including the operation of the interchangeable lens 1000 described later by reading and executing the program from the memory. For example, the lens controller 11300 executes an operation according to the command received from the camera controller 20500 in the first communication described later. The operation according to the command includes, for example, a control of each of the focus lens controller 10800, the zoom lens controller 10900, the iris controller 11000, and the image stabilization controller 11100, and an update of the firmware stored in the memory.

The lens controller 11300 updates the firmware by overwriting the old firmware stored in the memory, for example, with the new firmware received from the camera body 2000 in the first communication. The lens controller 11300 manages update processing by recording data (update state data) representing the status of the update processing of the firmware in the memory. For example, the lens controller 11300 sets the update state data to a value indicating "not completed" before overwriting the firmware, and sets the update state data to a value indicating "completed" when the firmware overwrite is completed. The value indicating "completed" may be different between the value indicating "normally completed" and the value indicating "abnormally completed". The value indicating "abnormal completion" may be a different value depending on the cause of the abnormality.

For example, if the interchangeable lens 1000 is removed while the firmware is being updated, the power supply to the interchangeable lens 1000 is cut off and the update processing is interrupted with the update status data indicating the value "incomplete". For example, when the power is supplied again, the lens controller 11300 checks the update state data, and if the value indicates the incomplete state, it moves to an operation limited mode (safe mode) because the firmware update is interrupted. The operation state of the interchangeable lens 1000 stored in the memory is rewritten to the safe mode. In the safe mode, only limited functions are available, including the processing required to update the firmware. More specifically, the processing required to update the firmware is processing of transmitting the identification information of the interchangeable lens 1000 and the operation state information (or a firmware update request) to the camera body 2000. The processing of updating the firmware recorded in the memory with the firmware received from the camera body 2000 is processing necessary to update the firmware.

Other processing, such as a control of the focus lens controller 10800, is unavailable.

Usually, the memory capacity is not large enough to redundantly store the entire firmware. The available capacity for storing a program in the safe mode is limited. In the safe mode, only limited functions are provided, including the minimum necessary functions such as transmitting the operating state of the interchangeable lens 1000 and updating the firmware. When the lens controller 11300 receives a request for processing that cannot be performed in the safe mode, such as a request for driving the focus lens 10400, through the first communication in the safe mode, it ignores the request. The lens operating member 11600 is an operating member provided to the interchangeable lens 1000, such as a switch or an electronic ring. When the lens operation member 11600 is operated, an operation signal is output to the lens controller 11300.

Next follows a description of the configuration of the camera body 2000. The camera body 2000 includes an image sensor 20400, a camera controller 20500 that controls the camera body, an image display unit 20600 that displays an image captured by the camera body 2000, and a camera operation member 20900 that is an operation member provided to the camera body 2000. The camera body 2000 includes a first camera communicator 20700 that controls the first communication and the second communication, and a second camera communicator 20800. Each configuration will be described.

The image sensor 20400 is an image pickup element for capturing an image, such as a CMOS image sensor.

The camera controller 20500 is configured to control the camera body and has an unillustrated memory. The camera controller 20500 is an illustrative communication controller. The first camera communicator 20700 performs the first communication in the camera body 2000. The second camera communicator 20800 performs the second communication in the camera body 2000. The camera controller 20500, the first camera communicator 20700, and the second camera communicator 20800 are configured using, for example, a CPU in the camera body 2000.

The image display unit 20600, such as a liquid crystal monitor, is used to display an image captured by the camera body 2000, image data recorded in the recording medium 21100, a GUI, and the like. At this time, the image display unit 20600 is also used to display a menu for the user to instruct the firmware update of the interchangeable lens 1000 or the intermediate accessory 3000 or 4000. The camera controller 20500 can also notify the user that the firmware needs to be updated by displaying a message or the like when it is detected that the mounted interchangeable lens 1000 and intermediate accessories 3000 and 4000 are in the safe mode.

The camera operation member 20900 sets an imaging condition, such as a dial ring and a switch. When the camera operation member 20900 is operated, an operation signal is output to the camera controller 20500.

A media interface (IF) 21000 is an interface configured to record data in and read data on a storage medium 21100, such as a removable memory card.

The recording medium 21100 is used as a recording destination of image data and audio data obtained by imaging in the camera body 2000. The recording medium 21100 is also used as a new firmware supply source in updating the firmware of the camera body 2000, the interchangeable lens 1000, and the intermediate accessories 3000 and 4000.

The intermediate accessories 3000 and 4000 include intermediate-accessory optical members 30700 and 40700, second intermediate-accessory communicators 30800 and 40800 configured to performing the second communication, and intermediate-accessory controllers 30900 and 40900 configured to control the intermediate accessories. The intermediate accessories 3000 and 4000 includes an intermediate-accessory operating members 31000 and 41000 as operating members provided on the intermediate accessory. Each configuration will be described.

The intermediate-accessory optical members 30700 and 40700 in this embodiment are, for example, optical members that change optical characteristics of captured images, such as a magnification varying lens and an ND filter.

The second intermediate-accessory communicators 30800 and 40800 perform the second communication in the intermediate accessories 3000 and 4000.

The intermediate-accessory controllers 30900 and 40900 are controllers for controlling the intermediate accessories 3000 and 4000, respectively, and have unillustrated memories. Each of the intermediate-accessory controllers 30900 and 40900 is an illustrative communication controller. The intermediate-accessory controllers 30900 and 40900, and the second intermediate-accessory communicators 30800 and 40800 include the CPUs of the intermediate accessories.

Each of the memories included in the intermediate-accessory controllers 30900 and 40900 includes a rewritable nonvolatile memory, and stores control software (firmware) executed by the CPU and unique information and state information on the intermediate accessories 3000 and 4000. The unique information is, for example, a model name (identification information), an optical characteristic, correction information, and the like. The state information is, for example, an operation state (normal and safe modes), operation information (position and speed) of the intermediate-accessory operating members 31000 and 41000, a firmware version and update state. However, it is not limited to these examples. The memory also stores a program to be executed when the intermediate accessories 3000 and 4000 are operated in the safe mode described later.

The intermediate-accessory controllers 30900 and 40900 have a programmable processor, such as a CPU, and realize various operations including the operations of the intermediate accessories 3000 and 4000 described later by reading and executing the program from the memory. For example, the intermediate-accessory controllers 30900 and 40900 perform an operation according to an instruction received from the camera controller 20500 in the second communication described later, for example, a transmission of the operation information of the intermediate-accessory operation members 31000 and 41000, and an update of the firmware stored in the memory.

The intermediate-accessory controllers 30900 and 40900 update the firmware by overwriting the old firmware stored in the memory with, for example, the new firmware received from the camera body 2000 through the first communication. The intermediate-accessory controllers 30900 and 40900 control update processing by recording data (update state data) representing the status of the firmware update processing in the memory. For example, before overwriting the firmware, the intermediate-accessory controllers 30900 and 40900 set the update state data to a value indicating "incomplete", and when the firmware overwrite is completed, they set the update state data to a value indicating "completed". The value indicating "completed" may be different between the value indicating "normally completed" and the value indicating "abnormally completed". The value indicating "abnormal completion" may be a different value depending on the cause of the abnormality.

For example, if the intermediate accessories 3000 and 4000 are removed while updating the firmware, the power supply to the intermediate accessories 3000 and 4000 is cut off and the update processing is interrupted with the update status data having a value indicating "incomplete". For example, when the power is supplied again, the intermediate-accessory controllers 30900 and 40900 check the update state data, and when the value indicates the uncomplete state, they shift to the operated limited mode (safe mode). The operation state of each of the intermediate accessories 3000 and 4000 stored in the memory is rewritten to the safe mode.

In the safe mode, only limited functions can be performed, including the processing required to updating the firmware. More specifically, the processing required to update the firmware includes authentication information such as identification information of the intermediate accessories 3000 and 4000 and information indicating that it is in the safe mode (or a request for firmware update) to the camera body 2000. The processing of updating the firmware recorded in the memory with the firmware received from the camera body 2000 is also processing necessary to update the firmware. Other processing is unavailable, such as a transmission of operation information of the intermediate-accessory operation members 31000 and 41000.

Usually, the memory capacity is not large enough to redundantly store the entire firmware. The available capacity for storing a program in the safe mode is limited. In the safe mode, only limited functions are provided, including the minimum necessary functions such as transmitting the operating state of the intermediate accessories 3000 and 4000 and updating the firmware. The intermediate-accessory controllers 30900 and 40900 ignore a request for processing which cannot be executed in the safe mode, for example, when transmitting and receiving operation information of the intermediate accessory operating members 31000 and 41000 through the second communication in the safe mode.

The intermediate-accessory operation members 31000 and 41000 are operation members provided on the intermediate accessories 3000 and 4000, such as switches and electronic rings. When the intermediate-accessory operation members 31000 and 41000 are operated, an operation signal is output to the intermediate-accessory controllers 30900 and 40900.

The second communication connection switches 31100 and 41100 are switches provided on the second communication line of the intermediate accessories 3000 and 4000 and closer to the lens than the second intermediate-accessory communicator. The second communication connection switches 31100 and 41100 can control short-circuiting and opening by the intermediate-accessory controllers 30900 and 40900, respectively. Thereby, they can shut off the second communication on the lens side from itself. In other words, they can change the communication state of the second communication by controlling the short circuiting and opening of these switches.

In the fifth embodiment, the flow until the light incident on the interchangeable lens 10 is output as an image is as follows.

The light incident on the interchangeable lens 1000 passes through the focus lens 10400, the zoom lens 10500, the iris 10600, the image stabilization lens 10700, and the intermediate-accessory optical members 40700 and 30700, forms an image on the image sensor 20400, and is converted into an electrical signal. The electric signal output from the image sensor 20400, is converted into an image signal by the camera controller 20500, and is output to the image display unit 20600.

<First Communication (FIGS. 12A and 12B)>

Figure 12A:
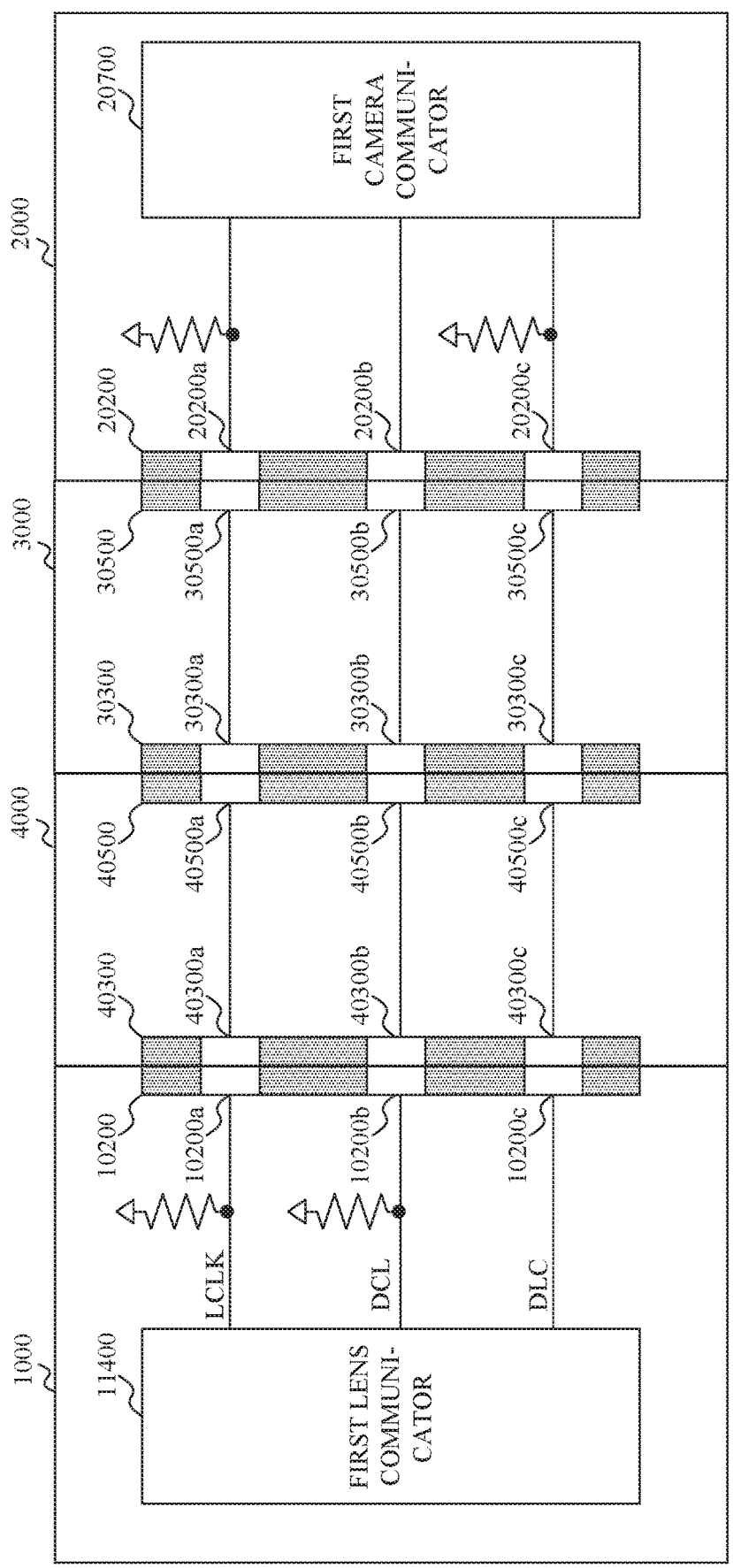
FIGS. 12A and 12B are diagrams for explaining a configuration for a first communication according to the fifth embodiment.
Figure 12B:
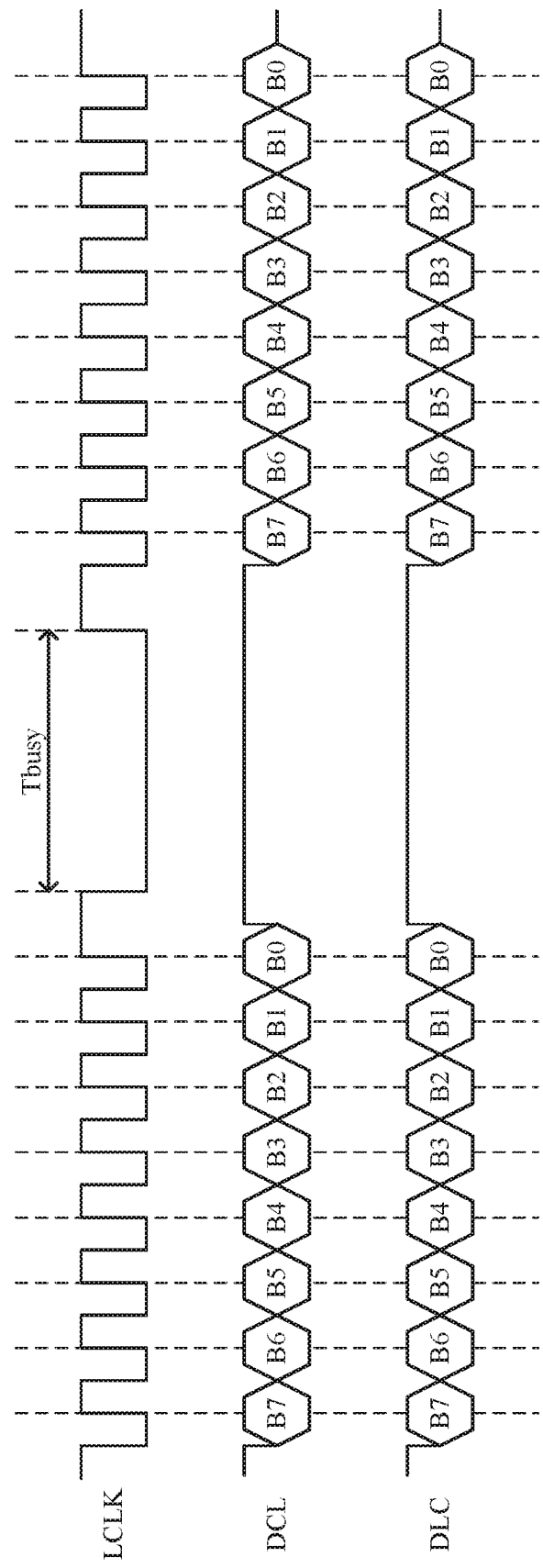

Referring now to FIGS. 124 and 12B, a description will be given of the first communication.

FIG. 12A illustrates a structure that provides the first communication. The first communication in this embodiment exemplifies a clock synchronous communication, but is applicable to an asynchronous communication. The asynchronous communication will be described later as a variation. First communication contacts 10200, 40300, 40500, 30300, 30500, and 20200 include first communication LCLK terminals 10200a, 40300a, 40500a, 30300a, 30500a, and 20200a as terminals of the clock line LCLK output from the first camera communicator 20700, respectively. This embodiment includes first communication DCL terminals 10200b, 40300b, 40500b, 30300b, 30500b, and 20200b as terminals of the data line DCL similarly output from the first camera communicator 20700 of the clock synchronous communication. Each of the first communication DCL terminals 10200b 4300b, 40500b, 30300b, 30500b, and 20200b is an illustrative first communication terminal. Similarly, first communication DLC terminals 10200c, 40300c, 40500c, 30300c, 30500c, and 20200c are terminals of the data line DLC output from the first lens communicator 11400 of the clock synchronous communication. Each of the first communication DLC terminals 10200c, 40300c, 40500c, 30300c, 30500c, and 20200c is an illustrative third communication terminal.

As illustrated in FIG. 12A, the clock line LCLK and the data line DCL are pulled up in the interchangeable lens 1000. The clock line LCLK and the data line DLC are pulled up in the camera body 2000.

The clock line LCLK, the data line DCL, and the data line DLC in the intermediate accessories 3000 and 4000 are short-circuited between first communication contacts 40300 and 40500 and between the first communication contacts 30300 and 30500, respectively.

FIG. 12B illustrates the waveforms of the clock line LCLK, the data line DCL, and the data line DLC in the first communication. The first camera communicator 20700 outputs a clock to the clock line LCLK, and 8-bit data from B7 to B0 to the data line DCL in accordance with a leading edge signal of the clock line LCLK. Similarly, the first lens communicator 11400 outputs the 8-bit data from B7 to B0 to the data line DLC in accordance with a leading edge signal of the clock line LCLK. The first camera communicator 20700 receives the 8-bit data from 37 to B0 of the data line DLC in accordance with the leading signal of the clock line LCLK. Similarly, the first lens communicator 11400 receives the 8-bit data from B7 to B0 of the data line DCL in accordance with the leading edge signal of the clock line LCLK. The first camera communicator 20700 and the first lens communicator 11400 can exchange communication data with each other. When the first lens communicator 11400 receives the 8-bit data from B7 to B0 of the data line DCL, the first lens communicator 11400 sends the low output to the clock line LCLK during Tbusy time and then releases the low output. Herein, the Tbusy time is a time during which the interchangeable lens 1000 is processing received data, and the first camera communicator 20700 does not transmit data until the clock line LCLK changes from low to high after the data transmission. The flow control of the first communication can be performed by this signal control. Repeating the above processing can transmit data between the first camera communicator 20700 and the first lens communicator 11400 through the first communication.

<Second Communication (FIG. 21)>

Referring now to a configuration diagram in FIG. 21, a description will be given of one of the communication circuits that can provide the "one-to-many" communication among the camera body 2000, the interchangeable lens 1000, the intermediate accessories 3000 and 4000. The communication circuit is not limited to this example as long as the "one-to-many" communication is available. Where there are a plurality of communication circuits, other communication circuits may use the "one-to-one" communication such as the clock synchronous serial communication and the UART communication.

The second camera communicator 20800, the second lens communicator 11500, and the second intermediate-accessory communicators 30800 and 40800 are connected to one another via the contact points as in the first communication. More specifically, they are connected via the second communication contacts 10300, 40400, 40600, 30400, 30600, and 20300. In this embodiment, the second communication contacts 10300, 40400, 40600, 30400, 30600, and 20300 include CS signal terminals 10300a, 40400a, 40600a, 30400a, 30600a, 20300a and DATA signal terminals 10300b, 40400b, 40600b, 30400b, 30600b, and 20300b respectively. The second camera communicator 20800, the second lens communicator 11500, and the second intermediate-accessory communicator 30800 communicate with one another through the CS signal line connected via the CS signal terminal and the DATA signal line connected via the DATA signal terminal.

The DATA signal terminal which each of the second communication contacts 10300, 40400, 40600, 30400, 30600, and 20300 has is an illustrative second communication terminal.

The camera communication circuit includes a ground switch 22100 and an input/output selector switch 22200. The lens communication circuit includes a ground switch 12100 and an input/output selector switch 12200. The intermediate accessory communication circuit includes ground switches 32100 and 42100 and input/output switches 32200 and 42200.

The signal lines include a CS signal line (first signal line) for propagating a signal for performing a communication flow control, and a DATA signal line (second signal line) for propagating data to be transmitted and received.

The CS signal line is connected to the second camera communicator 20800, the second intermediate-accessory communicator 30800, and the second lens communicator 115, and can detect the (high and low) states of the signal line. The CS signal line is pull up to an unillustrated power supply in the camera body. The CS signal line can be connected to GND via the ground switch 12100 of the interchangeable lens 1000, the ground switch 22100 of the camera body 2000, and the ground switches 32100 and 42100 of the intermediate adapters (open drain connection). This configuration can set the state of the CS signal line to a low state by turning on (connecting) the ground switches to the interchangeable lens 10, the camera body 2000, and the intermediate accessories 3000 and 4000. On the other hand, when all of the interchangeable lens 1000, the camera body 2000, and the intermediate accessories 3000 and 4000 turn off (cut off) their connection switches, the state of the CS signal line can be made high. The CS signal line is used to distinguish the broadcast communication from the P2P communication, or to switch the communication direction in the P2P communication.

The DATA signal line is a single-line bidirectional data transmission line that can be used by switching the data propagation direction. The DATA signal line can be connected to the second lens communicator 11500 via the input/output switch 12200 of the interchangeable lens 1000. The DATA signal line can be connected to the second camera communicator 20800 via the input/output switch 22200 of the camera body 2000. The DATA signal line can be connected to the second intermediate-accessory communicator 30800 or 40800 through the input/output switch 32200 or 42200 of the intermediate accessory 3000 or 4000, respectively. Each microcomputer includes a data output unit (CMOS system) for transmitting data and a data input unit (CMOS system) for receiving data. Operating the input/output switch can select whether the DATA signal line is connected to a data output unit or a data input unit. When the interchangeable lens 1000, the camera body 2000, and the intermediate accessories 3000 and 4000 each transmit data, this configuration enables them to operate the input/output switch so as to connect the DATA signal line to the data output unit. On the other hand, the interchangeable lens 1000, the camera body 2000, and the intermediate accessories 3000 and 4000 each receive data by operating each input/output switch so as to connect the DATA signal line to the data input unit.

A description will now be given of the broadcast communication and P2P communication performed by the CS signal and the data signal.

The CS signal line is used as a trigger for the broadcast communication because it turns into a low level when any units are connected to CND.

The broadcast communication starts when the camera body as the body of the communication pulls the CS signal line low. The data received by the accessory via the DATA line when the CS signal line is low is determined to be the broadcast data.

Each accessory can request the camera body for the broadcast communication by pulling the CS signal line low.

A unit that has detected a low level of the CS signal line can notify another unit that processing for the broadcast communication is continuing by turning on its own ground switch during the broadcast processing. By defining that the second communication starts with the broadcast communication and ends with the broadcast communication, the DATA signal line of the accessory may basically maintain the reception state. When the camera performs the P2P communication with the accessory, an accessory to be communicated is initially designated by the broadcast communication. The camera that has completed a transmission of the broadcast communication and the designated accessory perform the P2P communication.

In the P2P communication, the camera initially transmits the data, and the accessory that receives the data transmits the data to the camera. Thereafter, this operation is alternately performed. In the P2P communication, the CS signal in the communication is distinguished from the broadcast communication by maintaining high. The CS signal in the P2P communication is used as a busy signal. In other words, one of the camera and accessory sets the CS signal to be low to notify the counterpart that its data transmission has been completed, and set the CS signal to be high to notify that its data reception is ready.

When the P2P communication ends, the camera broadcasts the end of the P2P communication.

In this way, the camera can communicate the data to the plurality of accessories via two communication lines.

Figure 21:
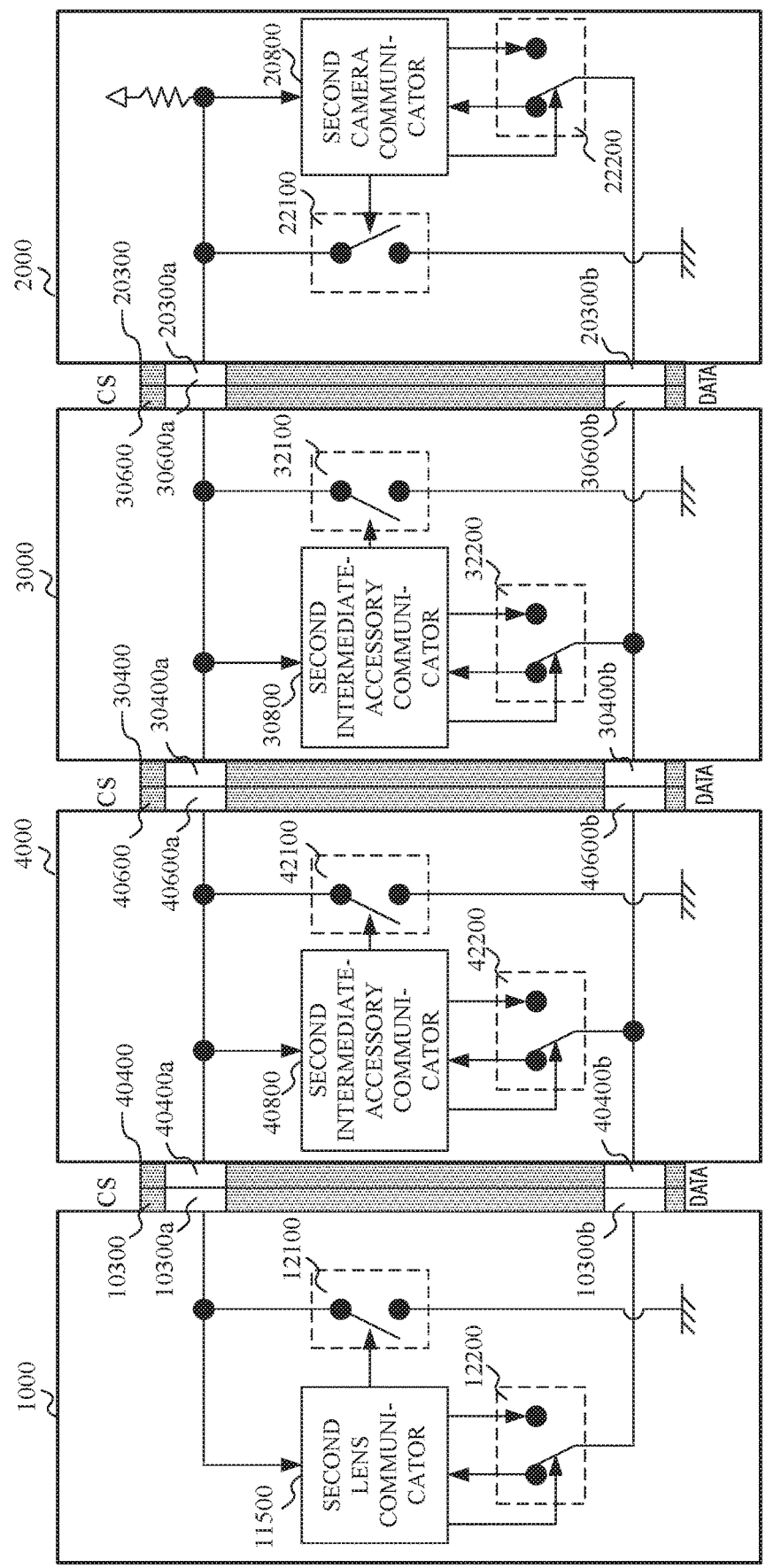
FIG. 21 is a diagram for explaining a configuration for a second communication according to the fifth embodiment.

Although FIG. 21 illustrates an illustrative communication circuit in the present invention, the present invention is not limited to this example. For example, the CS signal line is pulled down to GND in the camera body 2000, and can be connected with a power supply via the ground switch 12100 of the interchangeable lens 1000, the ground switch 22100 of the camera body 2000, and the ground switches 32100 and 42100 of the intermediate accessories 3000 and 4000. The DATA signal line may be always connected to each data input unit, and the connection/disconnection between the DATA signal line and each data output unit may be operated by a switch.

The second communication can be realized by the same communication method as the first communication, the bidirectional asynchronous communication, the master/slave method, the token passing method, or the like.

<Initial Communication with Accessory and Acquisition Processing of Corrected Optical Information (FIG. 13)>

Figure 13:
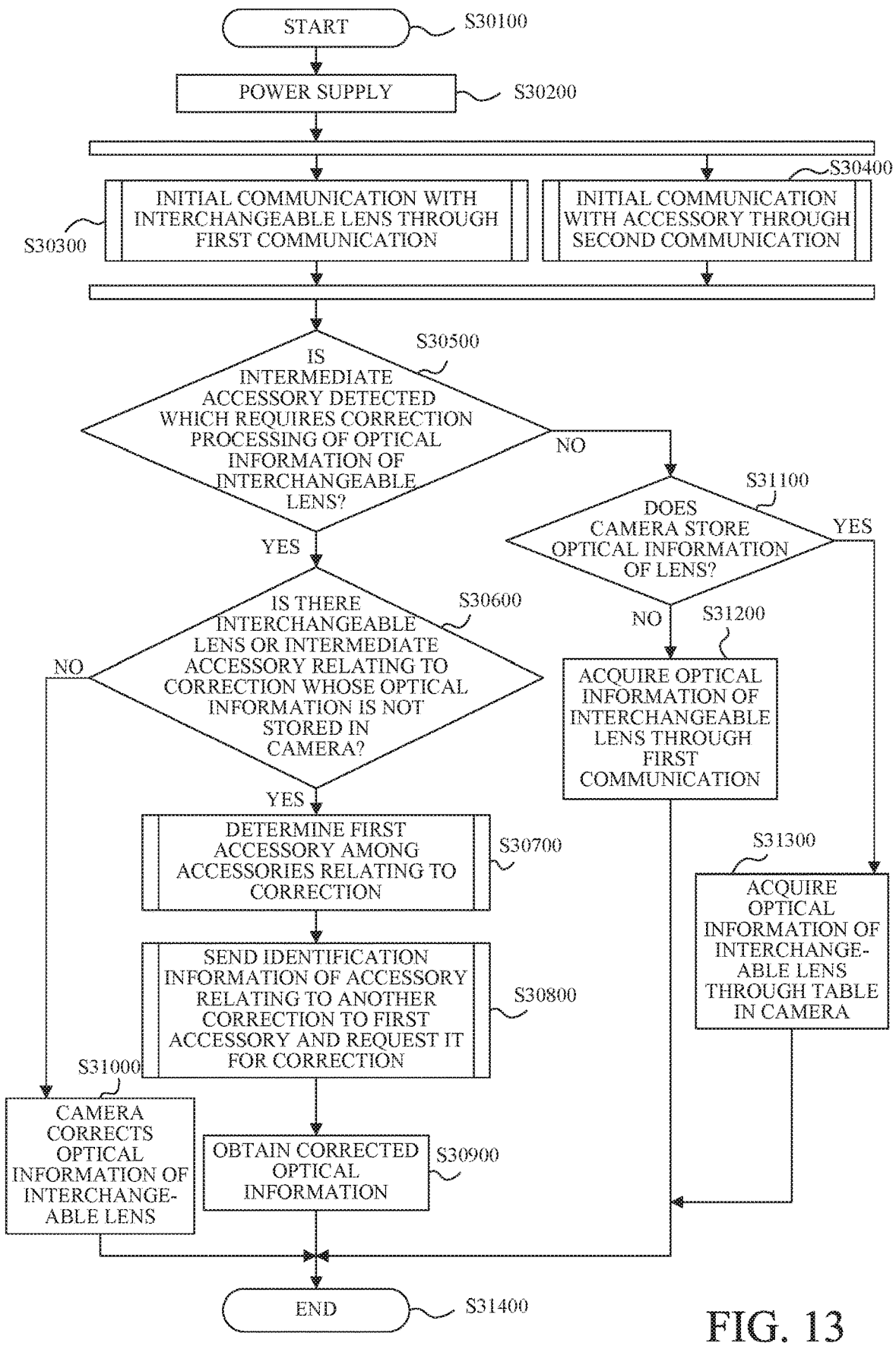
FIG. 13 is a flowchart showing an initial communication with an accessory according to the fifth embodiment and a processing flow for obtaining corrected optical information.

Referring now to FIG. 13, a description will be given of a flow of the camera body 2000 acquiring the authentication information of the accessory through the initial communication with the accessory and further acquiring the optical information of the interchangeable lens 1000 corrected based on the optical information of the intermediate accessories 3000 and 4000. The optical information of the intermediate accessory that includes a magnification varying lens is, for example, a magnification that changes by the insertion of the intermediate accessory. The optical information of the interchangeable lens 1000 includes information, such as a focal length, an F-number (aperture value), a focus sensitivity, and a focus correction amount.

FIG. 13 illustrates a processing flow for the camera body 2000 to acquire optical information of the interchangeable lens 1000 corrected based on optical information of the intermediate accessories 3000 and 4000 after the power is supplied for initially after the intermediate accessory and the interchangeable lens are mounted.

When the camera body 2000 starts in S30100, the flow proceeds to S30200.

After transferring to S30200, the camera body 2000 supplies the power to the interchangeable lens 1000 and the intermediate accessories 3000 and 4000 via the unillustrated power supplying mount contact, and transfers to S30300 and S30400.

After transferring to S30300, the camera controller 20500 performs the initial communication with the interchangeable lens 1000 in the first communication. In the initial communication, the authentication information of the interchangeable lens 1000 is acquired.

Herein, the authentication information of the interchangeable lens 1000 includes the ID information and the operation state information of the interchangeable lens 1000. The interchangeable lens ID information may be information such as a model number (ID) used to identify the type (model) of the interchangeable lens, or optical data identification information indicating optical data unique to the interchangeable lens. Information indicating the function of the interchangeable lens or information such as a production number (serial number) capable of identifying an individual in the same model may be included.

The operation state information is information that can identify whether the interchangeable lens 1000 is operating in the normal mode or in the safe mode. In other words, the information of whether the firmware update is interrupted (operation in the safe mode) or not (normal operation) can be identified.

Figure 14:
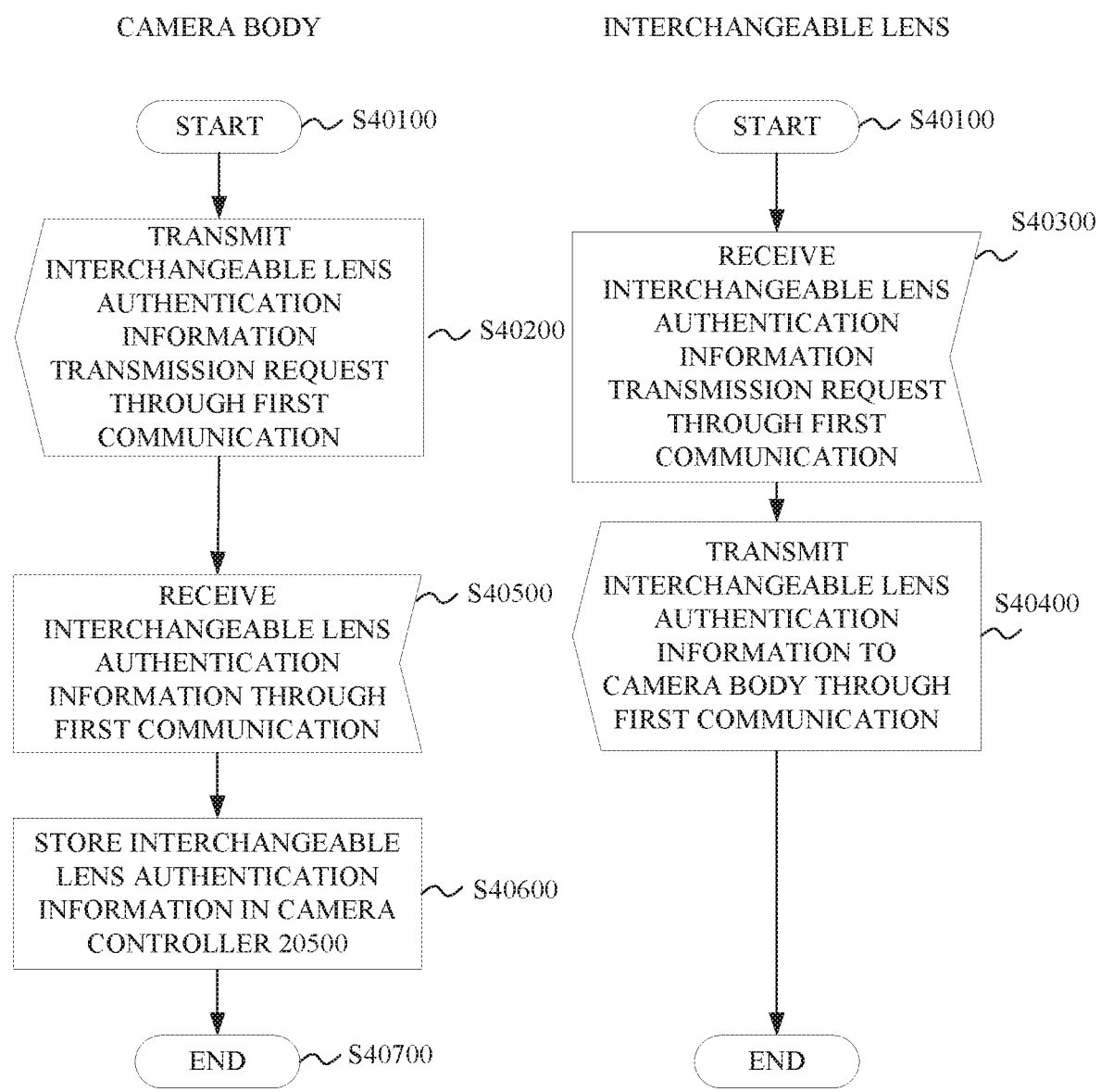
FIG. 14 is a flowchart showing initial communication processing between a camera and a lens according to the fifth embodiment.

Referring now to FIG. 14, a description will be given of a flow of a subprocess S30300 for acquiring the authentication information of the interchangeable lens 1000 through the first communication.

After transferring to S30400, the camera controller 20500 performs the initial communication with the accessory through the second communication, and acquires the authentication information of the accessory.

Herein, the authentication information of the accessory includes identification information of the accessory, correction processing necessity information, and operation state information.

The intermediate accessory identification information may be information such as a model number (ID) used to identify the type (model) of the intermediate accessory, or optical data identification information indicating optical data unique to the intermediate accessory. Information indicating the function of the intermediate accessory or information such as a production number (serial number) that can identify an individual in the same model may be included.

The correction processing necessity information is information indicating whether or not the optical information of the interchangeable lens 1000 needs to be corrected by the attachment of the accessory. If the accessory is an intermediate accessory and does not affect the optical system of the interchangeable lens 1000, the correction processing is unnecessary. When the camera controller 20500 previously recognizes that correction processing is unnecessary by mounting the intermediate accessory based on the intermediate-accessory correction processing necessity information, the camera ignores the intermediate accessory in the processing of acquiring optical information of the interchangeable lens 1000.

The intermediate accessory which requires no correction processing, for example, is an intermediate accessory equipped with an optical member optically designed so as to cancel the influence of its own width on the optical system, and mounted to increase the operation member. Another example is a mount converter that changes the flange back length suitable for a camera body by mounting it between an interchangeable lens and the camera body with a short flange back mount.

The operation state information is information that can identify whether the intermediate accessories 3000 and 4000 are operating in the normal mode or in the safe mode. In other words, it is information that can identify whether updating of the firmware is interrupted (operation in the safe mode) or whether it is normal (normal operation).

The flow of the subprocess S30400 for acquiring the authentication information of the intermediate accessory through the second communication will be described later with reference to FIGS. 15A and 15B. S30300 and S30400 use different communication paths and thus perform parallel or sequential processing.

When the authentication information of the interchangeable lens and the authentication information of the attached accessory are acquired in S30300 and S30400, the flow proceeds to S30500.

After transferring to S30500, the camera controller 20500 determines whether there is an intermediate accessory that requires a correction of the optical information of the interchangeable lens based on the correction processing necessity information acquired in S30400. If an intermediate accessory (also referred to as an intermediate accessory relating to the correction) whose correction processing necessity information is "necessary" is attached, the flow proceeds to S30600.

After transferring to S30600, the camera controller 20500 determines whether there is an accessory whose optical information is not stored in the camera controller 20500 among an interchangeable lens and an intermediate accessory for which the correction processing necessity information is "necessary" in S30500. The interchangeable lens and the intermediate accessory whose correction processing necessity information is "necessary" in S30500 will be referred to as an accessory relating to correction. The camera controller 20500 cannot perform the correction processing of the optical information of the interchangeable lens when there is the accessory whose optical information is not stored in the camera controller 20500 among the accessories relating to the correction. In this case, in order to search for the correction processing requester, the flow proceeds to S30700.

After transferring to S30700, the camera controller 20500 determines an accessory (also referred to as a first accessory) that stores optical information of all other accessories among the accessories relating to the correction. A method of determining the first accessory may make, for example, a determination based on the identification information acquired from the accessory, or the accessory may be inquired through a communication. Details will be described later with reference to FIGS. 16A and 16B.

When the first accessory is determined in S30700, the flow proceeds to S30800.

After transferring to S30800, the camera controller 20500 transmits the identification information of the accessory relating to another correction to the first accessory determined in S30700, and requests it for correction processing of the optical information of the interchangeable lens 1000. As an example, when the first accessory is an interchangeable lens, this embodiment performs the communication through the first communication. If the first accessory is the intermediate accessory, the communication is performed through the second communication.

The controller of the first accessory that has received the correction request in S30800 performs the correction processing of the optical information of the interchangeable lens 1000 using the optical information of the accessory relating to the other correction that has been stored.

In S30900, the camera controller 20500 acquires optical information corrected by the first accessory.

On the other hand, in S30600, when the camera controller 20500 determines that there is no accessory for which the camera controller 20500 has no optical information among the interchangeable lens and the intermediate accessories for which the correction processing necessity information is "necessary" in S30500, the flow transfers to S31000. In this case, the camera controller 20500 stores the optical information of all the accessories.

When the flow proceeds to S31000, the camera controller 20500 corrects the optical information of the interchangeable lens using the optical information of the interchangeable lens and the optical information of the intermediate accessory stored in it.

If the camera controller 20500 determines in S30500 that there is no intermediate accessory that requires the correction of the optical information of the interchangeable lens, the intermediate accessory is not attached or correction processing necessity information is "unnecessary" for all intermediate accessories that have been attached. The flow proceeds to S31100 as processing when it is unnecessary to correct the optical information of the interchangeable lens.

When the flow proceeds to S31100, the camera controller 20500 determines whether the camera body 2000 stores the optical information of the interchangeable lens 1000, based on the identification information of the interchangeable lens 1000 included in the interchangeable lens authentication information acquired in S30300. If the camera controller 20500 does not store the optical information of the interchangeable lens, the flow proceeds to S31200.

After transferring to S31200, the camera controller 20500 acquires the optical information of the interchangeable lens 1000 from the lens controller 11300 through the first communication.

On the other hand, when it is determined in S31100 that the optical information of the interchangeable lens 1000 is stored, the camera controller 20500 acquires the optical information from a data table in the camera in S31300.

After the optical information is acquired in S30900, S31000, S31200, or S31300, the flow proceeds to S31400, and the optical information acquisition sequence ends.

After the optical information is acquired, the first communication path is used for the communication for the camera body 2000 to control the interchangeable lens 1000, and the second communication path is used for the communication for the camera body 2000 to regularly acquire the operation information of the intermediate accessory operating members 31000 and 41000. Any of the first communication path and second communication path may be used for the communication for regularly acquiring the operation information of the operation member 11600 in the interchangeable lens, based on the occupancy rate of each communication path and the immediacy required for communication and contro.

<Initial Communication Processing through First Communication of Camera and Interchangeable Lens (FIG. 14)>

FIG. 14 illustrates a flow of the subprocess S30300 as the initial communication between the camera body 2000 and the interchangeable lens 1000 in the camera system according to the fifth embodiment. In the initial communication, the camera controller 20500 acquires the authentication information of the interchangeable lens 1000 from the lens controller 11300.

When the subprocess starts in S40100, the flow proceeds to S40200.

After transferring to S40200, the camera controller 205 transmits an interchangeable lens authentication information transmission request (corresponding to the first transmission request) to the lens controller 11300 through the first communication.

Referring now to FIG. 19A, a description will be given of the interchangeable lens authentication information request according to this embodiment. The interchangeable lens authentication information request according to this embodiment is information for requesting the camera controller 20500 to transmit two pieces of information as the authentication information. The authentication information request includes an identification information request for the interchangeable lens and an operation state information request.

The lens controller 11300 when receiving the interchangeable lens authentication information transmission request in S40300 proceeds to S40400. Then, the lens controller 11300 transmits the interchangeable lens authentication information (corresponding to the first information) to the camera controller 20500 through the first communication.

Referring now to FIG. 19B, a description will be given of the authentication information that the interchangeable lens 1000 transmits to the camera controller 20500. The authentication information includes identification information and operation state information.

The camera controller 20500 when receiving the interchangeable lens authentication information in S40500 proceeds to S40600, and stores the received interchangeable lens authentication information.

The subprocess S30300 ends with S40700.

<Initial Communication Processing between Camera and Intermediate Accessory through Second Communication (FIGS. 15A and 15B)>

Figure 15A:
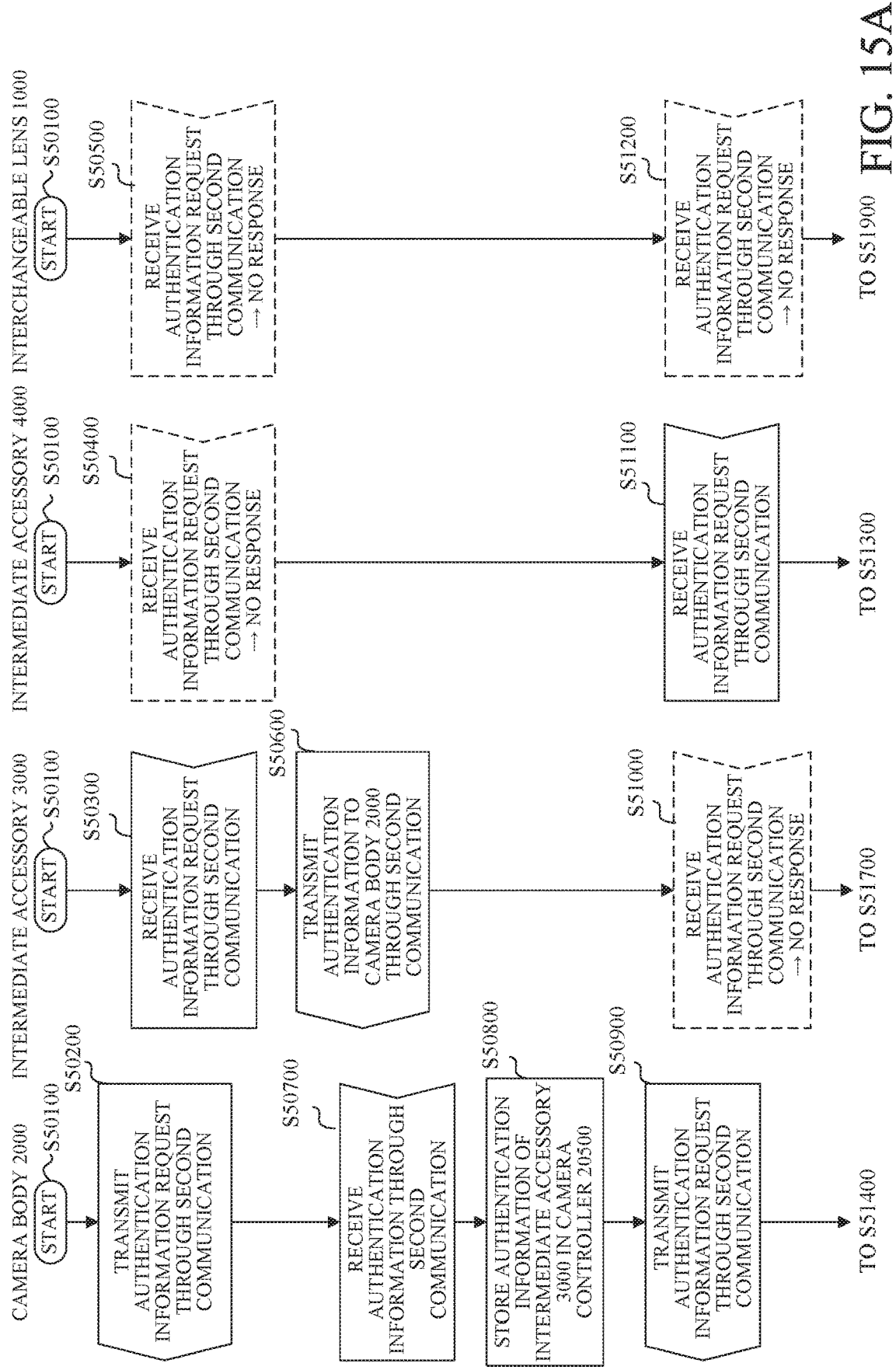
FIGS. 15A and 15B illustrate a flowchart of initial communication processing between the camera and an accessory according to the fifth embodiment.
Figure 15B:
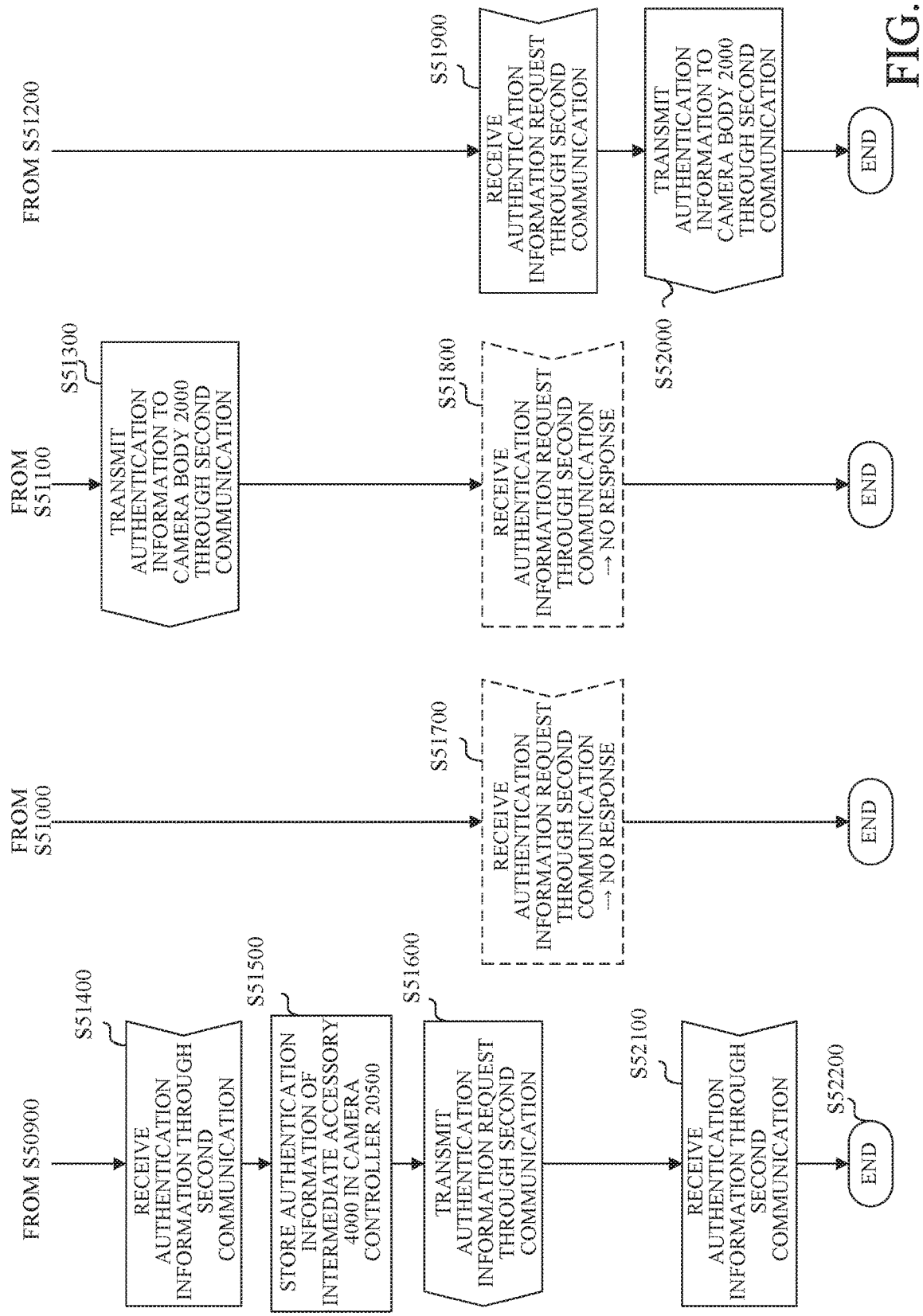

FIGS. 15A and 15B explain the flow of the subprocess S30400 as the initial communication processing between the camera body 2000 and the accessory in the camera system according to the fifth embodiment. In the initial communication, the camera controller 20500 acquires the authentication information of the accessory. The authentication information of the accessory will be described later.

When the subprocess is started in S50100, the flow proceeds to S50200.

After transferring to S50200, the camera controller 20500 transmits an authentication information request for the accessory (corresponding to the second transmission request) to the intermediate-accessory controller 30900 through the second communication.

Referring now to FIG. 19C, a description will be given of the authentication information request of the accessory according to this embodiment. The authentication information request of the accessory is information for requesting the camera controller 20500 to transmit the accessory authentication information. In this embodiment, the accessory authentication information includes the identification information of the accessory, the operation state information, the correction processing necessity information, and the terminal information.

The intermediate-accessory controller 30900 when receiving the accessory authentication information request in S50300 proceeds to S50600.

In S50600, the intermediate-accessory controller 30900 transmits the authentication information of the intermediate accessory 3000 to the camera controller 20500 through the second communication.

Referring now to FIG. 19D, a description will be given of the authentication information which the intermediate accessory transmits to the camera controller 20500. The authentication information includes identification information (as illustrative third information), operation state information, correction processing necessity information, and terminal information.

The correction processing necessity information is information indicating "necessary" if the instant intermediate accessory changes the optical characteristic. If the optical characteristic is not to be changed, it is information indicating "unnecessary".

In this embodiment, the terminal information is information indicating whether or not the intermediate adapter is the termination of the second communication viewed from the camera body 2000. If the intermediate adapter is the end of the second communication when viewed from the camera body 2000, the terminal information is information indicating the "terminal". If the intermediate adapter is not the terminal of the second communication viewed from the camera body 2000, the terminal information is information indicating the "nonterminal".

The one-to-many communication, like the second communication, can designate the transmission destination, for example, by adding the identification information of the accessory to the head of communication data. However, the camera controller 20500 has no accessory information at the stage of S50200, the transmission destination cannot be designated by communication data.

Thus, one an illustrative means by which the camera body 2000 sequentially communicates with a plurality of accessories in this subprocess can be the following method using the second communication connection switches 31100 and 41100. Assume that the second communication connection switches 31100 and 41100 are short-circuited in the steady state.

In S50100, the camera controller 20500 transmits this subprocess start information through the second communication. Since the second communication connection switches 31100 and 41100 are short-circuited, each accessory receives the subprocess start information. Each intermediate accessory that has received the subprocess start information opens its own second communication connection switch. Thereby, only the intermediate-accessory controller 30900 is connected to the camera controller 20500, and the camera controller 20500 can receive the data to be transmitted. The intermediate-accessory controller 40900 can receive the data transmitted by the camera controller 20500 when the intermediate-accessory controller 30900 that has completed processing the received data short-circuits the second communication connection switch 31100. The intermediate accessory 3000 having short-circuited the second communication connection switch does not respond to the transmission information of the camera controller 20500 until this subprocess end information transmitted by the camera controller 20500 is received in S52200 when this subprocess ends.

In this embodiment, even when the intermediate accessory 3000 operates in the safe mode, the camera body 2000 and the intermediate accessory 3000 do not end this subprocess, and perform the initial communication with accessories connected via the intermediate accessory 3000. However, when an accessory operating in the safe mode is attached, the initial communication with the attached accessory may not be performed via that accessory. For example, when the operation state of the intermediate accessory 3000 is the safe mode, the intermediate-accessory controller 30900 does not short-circuit the second communication connection switch 31100 even if the processing on the received data is completed. Then, the subprocess may be ended immediately by transmitting the authentication information to the camera controller 20500 by setting the terminal information to the "terminal".

The camera controller 20500 can sequentially communicate with a plurality of accessories since the intermediate accessory 4000 acts similarly.

In S50400 and S50500, since the second communication connection switch 31100 is open, the intermediate accessory 4000 and the lens controller 11300 do not receive the information transmission request transmitted from the camera controller 20500 in S50200.

In S50600, the intermediate-accessory controller 30900 transmits the authentication information of the intermediate accessory 3000 to the camera controller 20500 through the second communication. Then, it short-circuits the second communication connection switch 31100. Thereby, the intermediate-accessory controller 40900 can receive data transmitted by the camera controller 20500.

The camera controller 20500 when receiving the authentication information of the intermediate accessory 3000 in S50700 proceeds to S50300 and then stores the received authentication information.

As described above, when the authentication information of the intermediate accessory 3000 is acquired in S50200 to S50800, the flow proceeds to S50900. In S50900, S51100, and S51300 to S51500, the camera controller 20500 acquires the authentication information of the intermediate accessory 4000, as in S50200, S50300, and S50600 to S50800.

In S51000, the intermediate-accessory controller 30900 receives the authentication information request transmitted by the camera controller 20500, but does not respond because it has not yet received the subprocess end information.

In S51200, as in S50400 and S50500, since the second communication connection switch 41100 is open, the lens controller 11300 does not receive the information transmission request transmitted from the camera controller 20500 in S50900.

While the fifth embodiment is an example in which totally three accessories or one interchangeable lens and two intermediate accessories are connected, only one intermediate accessory may be connected or three or more intermediate accessories may be connected. Since any number of intermediate accessories may be attached, the accessory information acquisition processing may be terminated by acquiring the accessory end information.

The terminal information of the accessory may be obtained by another method. For example, similar to S50200 and S50900, when the camera controller 20500 transmits an authentication information request on the assumption that the intermediate accessory is attached, the terminal information returned from the second lens communicator 11500 may notify it of the interchangeable lens. Alternatively, the intermediate accessory 4000 may detect that it is the terminal based on the connection state of the unillustrated terminals or the like and notify the camera body 2000 of the fact in S51300. This embodiment describes that the terminal information is notified by the lens controller 11300 returning the authentication information including the terminal information in response to the authentication information request from the camera controller 20500.

In S51600, as in S50200 and S50900, the camera body 2000 transmits an authentication information request (corresponding to the second transmission request) in the second communication. In S51700 and S51800, the intermediate accessory 3000 and the intermediate accessory 4000 do not respond because they do not receive the subprocess end information, similar to S51000.

The lens controller 113 when receiving the authentication information request in S51900 proceeds to S52000 and transmits the authentication information to the camera controller 20500 through the second communication.

Referring now to FIG. 19E, a description will be given of the authentication information that the lens controller 11300 transmits to the camera controller 20500. The authentication information includes the identification information (as illustrative second information), the operation state information, the correction processing necessity information, and the terminal information.

Since the interchangeable lens 1000 is not an intermediate accessory, the correction of the optical information of the interchangeable lens 1000 does not become necessary by its attachment. Thus, the correction processing necessity information is information indicating that the correction processing is unnecessary.

Since the interchangeable lens 1000 according to this embodiment is the terminal of the second communication when viewed from the camera body 2000, the terminal information is information indicating that the interchangeable lens 1000 is the terminal of the second communication.

When the camera controller 20500 acquires the authentication information in S52100, the flow proceeds to S52200 and the series of initial communication processing end.

While the correction processing necessity information may be acquired as in this embodiment for shortening the communication processing, it is determined that correction processing is necessary for all intermediate accessories when the correction information necessity information is not communicated.

The subprocess S30400 ends with S52200.

This embodiment describes processing using means for sequentially communicating with a plurality of accessories using the second communication connection switch. However, other means may be used as long as it can communicate with a plurality of accessories. For example, detecting the voltage level of the unillustrated terminal connected to the accessory itself can provide information of what number it is attached from the camera body side. In that case, the number of information transmission requests transmitted from the camera is counted, and the information is transmitted to the camera body only when it matches its mounting order.

<Subprocess S30700 (FIGS. 16A and 16B) for Determining the First Accessory>

Figure 16A:
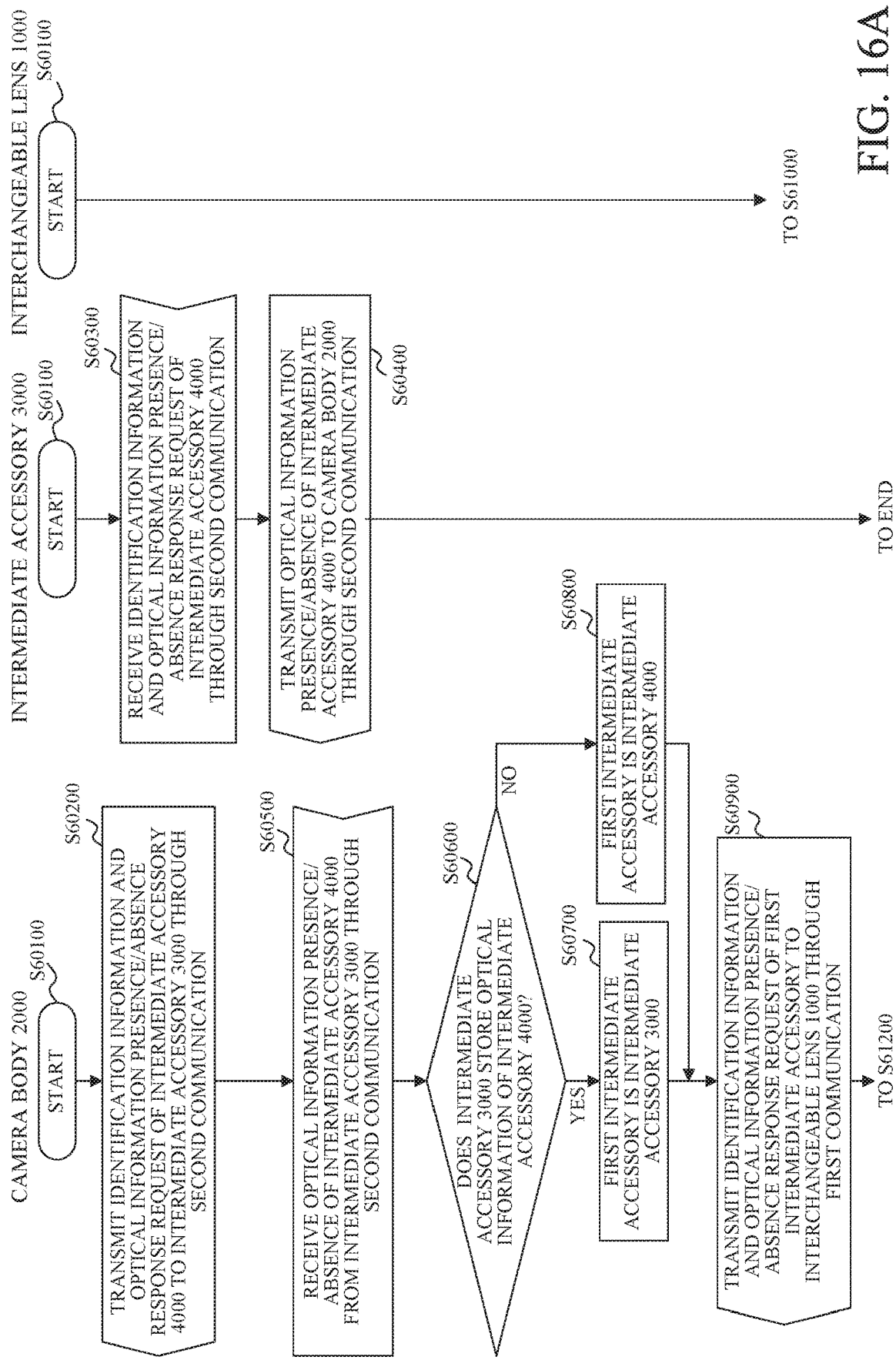
FIGS. 16A and 16B illustrate a flowchart of a processing flow of determining a first accessory according to the fifth embodiment.
Figure 16B:
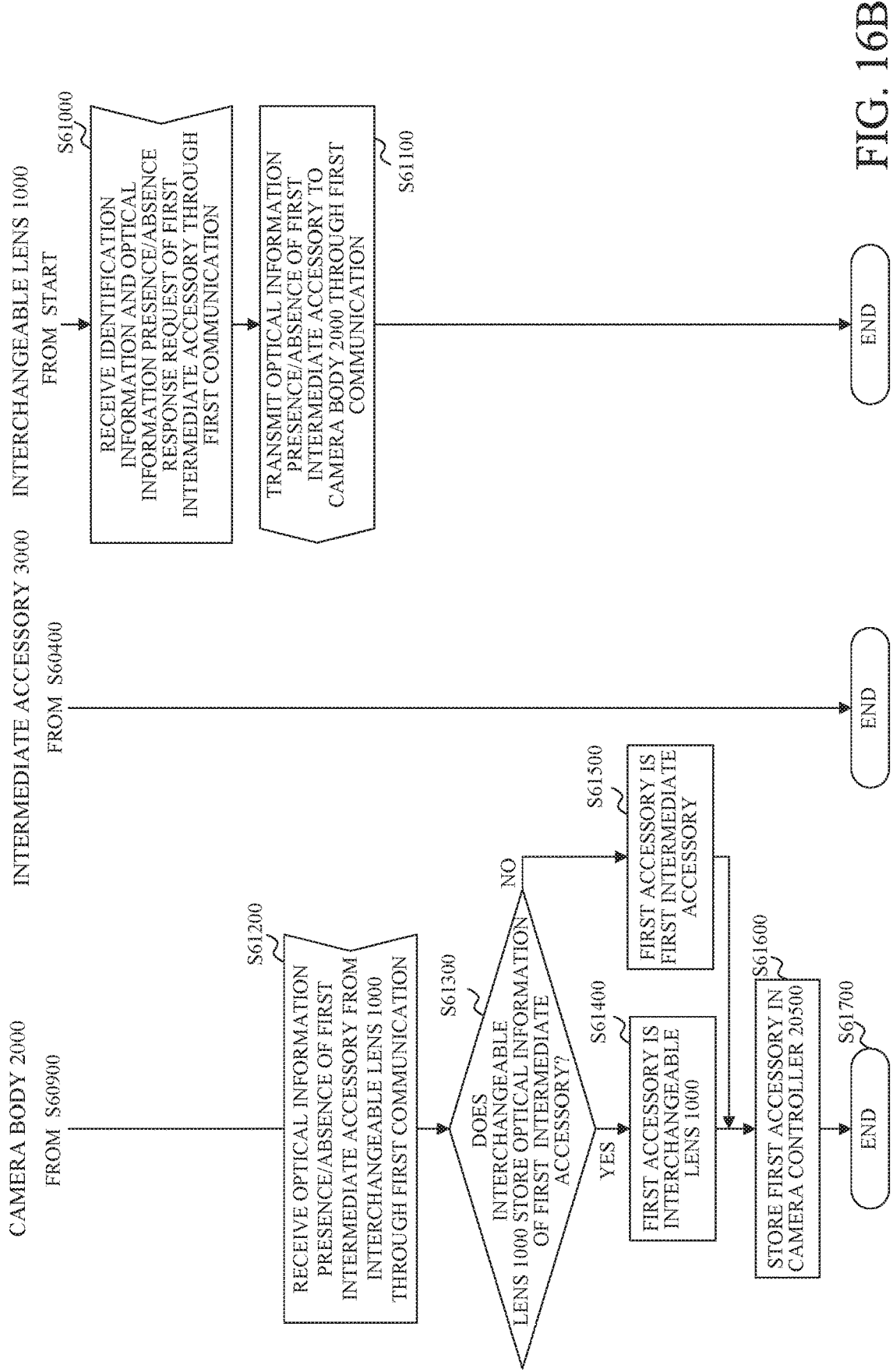

Referring now to FIGS. 16A and 16B, a description will be given of the flow of the subprocess S30700 in which the camera body 2000 searches for the first accessory among the accessories relating to the correction through the communication according to the fifth embodiment.

FIGS. 16A and 16B illustrate the flow of the subprocess S30700 in which the camera controller 20500 determines the first accessory among the accessories relating to the optical correction in the camera system according to the fifth embodiment. Now assume that the camera controller 20500 stores none of optical information of the interchangeable lens 1000, the intermediate accessory 3000, and the intermediate accessory 4000. Also assume that the correction processing necessity information of the intermediate accessory 3000 and that of the intermediate accessory 4000 are both "necessary".

When the subprocess starts in S60100, the flow proceeds to S60200.

After transferring to S60200, the camera controller 20500 transmits the identification information and an optical information presence/absence response request of the intermediate accessory 4000 to the intermediate-accessory controller 30900 through the second communication, and inquiries it about whether or not it stores the optical information of the intermediate accessory 4000. For example, when the identification information of the intermediate accessory is added to the top communication data and the accessory refers to the value of the top transmission data, the accessory may determine whether it is a communication addressed to it.

When the intermediate-accessory controller 30900 receives the identification information and the optical information presence/absence response request of the intermediate accessory 4000 in S60300, the flow proceeds to S60400.

In S60400, the intermediate-accessory controller 30900 transmits, to the camera controller 20500 through the second communication, information on whether or not the optical information of the intermediate accessory 4000 is stored.

When the camera controller 20500 receives the presence or absence of the optical information of the intermediate accessory 4000 from the intermediate accessory 3000 in S60500, the flow proceeds to S60600.

In S60600, the camera controller 20500 determines an intermediate accessory (also referred to as a first intermediate accessory) having the optical information of another intermediate accessory.

If the intermediate-accessory controller 30900 stores the optical information of the intermediate accessory 4000, the flow proceeds to S60700 and the camera controller 20500 determines that the intermediate accessory 3000 is the first intermediate accessory.

If the intermediate-accessory controller 30900 does not store the optical information of the intermediate accessory 4000, the flow proceeds to S60800 and the unit 20500 determines that the intermediate accessory 4000 is the first intermediate accessory and stores the optical information of the intermediate accessory 3000.

Even if three or more intermediate accessories are attached, the first intermediate accessory can be determined as well. For example, when three accessories are attached, processing similar to S60200 to S60500 is performed between the two accessories. If the first intermediate accessory is found, the flow proceeds to S60900.

After transferring to S60900, the camera controller 20500 sends the identification information and the presence/absence response request (third instruction information) of optical information (fourth information) of the first intermediate accessory determined in S60700 or S60800 to the lens controller 11300 through the first communication. In other words, it inquires about whether the optical information of the first intermediate accessory is stored.

When the lens controller 11300 receives the identification information and the optical information presence/absence response request of the first intermediate accessory in S61000, the flow proceeds to S61100 and information about whether the optical information of the first intermediate accessory is stored is sent to the camera controller 20500 through the first communication.

When the camera controller 20500 receives the presence or absence of optical information of the first intermediate accessory from the interchangeable lens 1000 in S61200, the flow proceeds to S61300, and the lens controller 11300 determines whether the optical information of the first intermediate accessory is stored. Thereby, the first accessory is determined.

If the camera controller 20500 determines that the lens controller 11300 stores the optical information of the first intermediate accessory, the flow proceeds to S61400. In S61400, it is determined that the interchangeable lens 1000 is the first accessory, and stores the optical information of the intermediate accessory 3000 and the intermediate accessory 4000. If the camera controller 20500 determines that the lens controller 11300 does not stores the optical information of the first intermediate accessory, the flow proceeds to S61500.

In S61500, the camera controller 20500 determines that the first intermediate accessory is the first accessory.

When the first accessory is determined in S61400 or S61500, the flow proceeds to S61600 and the camera controller 20500 stores the identification information and the accessory type of the first accessory. When the first accessory is stored, the flow transfers to S61700 and the subprocess S30700 ends.

<Effect of Fifth Embodiment>

As described above, the fifth embodiment independently includes the first communication path through which the camera and the interchangeable lens can communicate with each other and the second communication path through which the camera and the accessories can communicate with each other. Then, a unit for correcting the optical information of the interchangeable lens is determined based on the identification information and the intermediate accessory correction processing necessity information of each unit acquired by the communications using the respective communication paths. Thereby, this embodiment can perform the communication at intended timings among the units of the imaging apparatus, the interchangeable lens, and the intermediate accessory while appropriately correcting the optical information of the interchangeable lens.

Sixth Embodiment

The fifth embodiment describes the method of correcting the optical information of the interchangeable lens based on the optical information of the intermediate accessory in the startup sequence just after the interchangeable lens is mounted. The sixth embodiment describes a method of correcting optical information of the interchangeable lens when the optical system in the accessory dynamically changes by operating the operation member provided in the accessory.

An example in which the optical system of the accessory is dynamically changed by operating the operation member provided in the intermediate accessory includes a magnification varying lens having a variable magnification, an ND filter having a variable transmittance, and the like.

When the interchangeable lens is attached and the current optical system is determined, the sixth embodiment performs the processing described in the first embodiment. Thereby, the camera controller 20500 recognizes a unit for storing the optical information of all accessories among the interchangeable lens 1000, the camera body 2000, and the intermediate accessories 3000 and 4000.

Assume that the camera controller 20500 recognizes an accessory whose optical system is dynamically changeable through the identification information of the accessory acquired by the operation as in the fifth embodiment.

Hereinafter, an accessory whose correction processing necessity information is "necessary", in which the optical information dynamically changes, will be expressed as a dynamic intermediate accessory. An intermediate accessory whose optical information does not dynamically change and whose correction processing necessity information is "unnecessary" will be referred to as a static intermediate accessory. An interchangeable lens in which optical information dynamically changes will be referred to as a dynamic lens, and an interchangeable lens in which optical information does not dynamically change will be referred to as a static lens.

This embodiment describes the intermediate accessories 3000 and 4000 mounted between the camera body 2000 and the interchangeable lens 1000, but is applicable even if only one of the intermediate accessories is mounted.

<Searching Processing of Dynamic Accessory (FIG. 17)>

Figure 17:
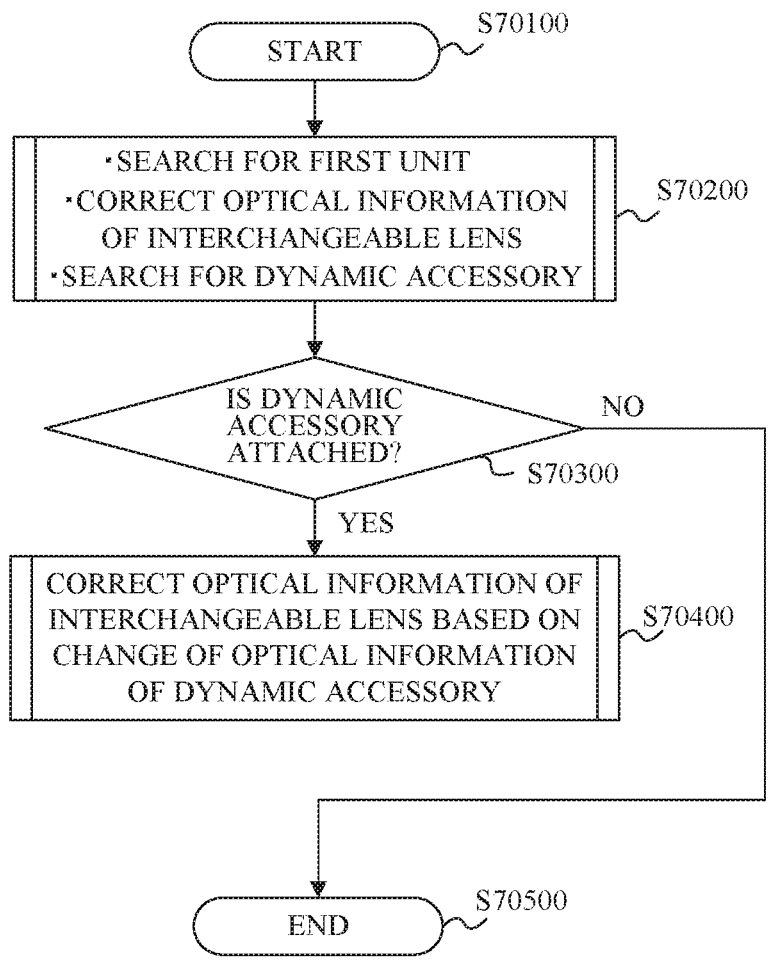
FIG. 17 is a flowchart showing a processing flow for searching for a dynamic accessory according to a sixth embodiment.

FIG. 17 illustrates the relationship between the fifth embodiment and this embodiment. When the camera system starts in S70100, the flow transfers to S70200.

In S70200, the camera controller 20500 executes the processing illustrated in FIG. 13 or such as the initial communication, the determination of the first unit, and the correction of the optical information of the interchangeable lens. The initial communication acquires, from the interchangeable lens 1000 and the intermediate accessories 3000 and 4000, information (also referred to as dynamic accessory information) corresponding to whether or not the optical system dynamically changes. For example, the camera controller 20500 transmits a transmission request to the accessory at the timing when the identification information is acquired in S40200 in FIG. 14 and S50200 and S50900 in FIGS. 15A and 15B for the information of whether or not the optical system dynamically changes, and the accessory transmits the dynamic accessory information in response to the transmission request. The authentication information may be included in the dynamic accessory information, and the camera controller 20500 may acquire the authentication information including the moving body accessory information in response to the transmission request of the authentication information transmitted to the accessory. The camera controller 20500 may determine whether the accessory is a dynamic accessory or not from the identification information of the accessory acquired in S70200 without separately acquiring the dynamic accessory information. In this case, the memory (not shown) of the camera controller 20500 may be configured to store information (such as a table) indicating the correspondence relationship between the identification information of the accessory and whether or not the optical system dynamically changes. Thereby, the camera controller 20500 can determine whether the accessory is a dynamic accessory based on the identification information of the accessory.

When the subprocess S70200 ends, the flow proceeds to S70300.

In S70300, the camera controller 20500 determines whether the dynamic accessory is attached based on the above dynamic accessory information. More specifically, when the camera controller 20500 acquires the information indicating that the optical system dynamically changes as dynamic accessory information from any of the accessories, the camera controller 20500 determines that the dynamic accessory is attached. When the camera controller 20500 does not acquire the information indicating that the optical system dynamically changes as the dynamic accessory information, the camera controller 20500 determines that the dynamic accessory is not attached. If the dynamic accessory is attached, the flow proceeds to S70400.

In S70400, the camera controller 20500 executes the subprocess for correcting the optical information of the interchangeable lens based on the change in the optical information of the dynamic accessory. When the dynamic accessory is not attached or when the dynamic accessory is not operated, it is unnecessary to correct the optical information of the interchangeable lens and thus the flow proceeds to S70500 to complete the optical correction processing of the interchangeable lens.

<Correction Processing of Optical Information according to Operation of Dynamic Accessory (FIGS. 18A and 18)>

Figure 18A:
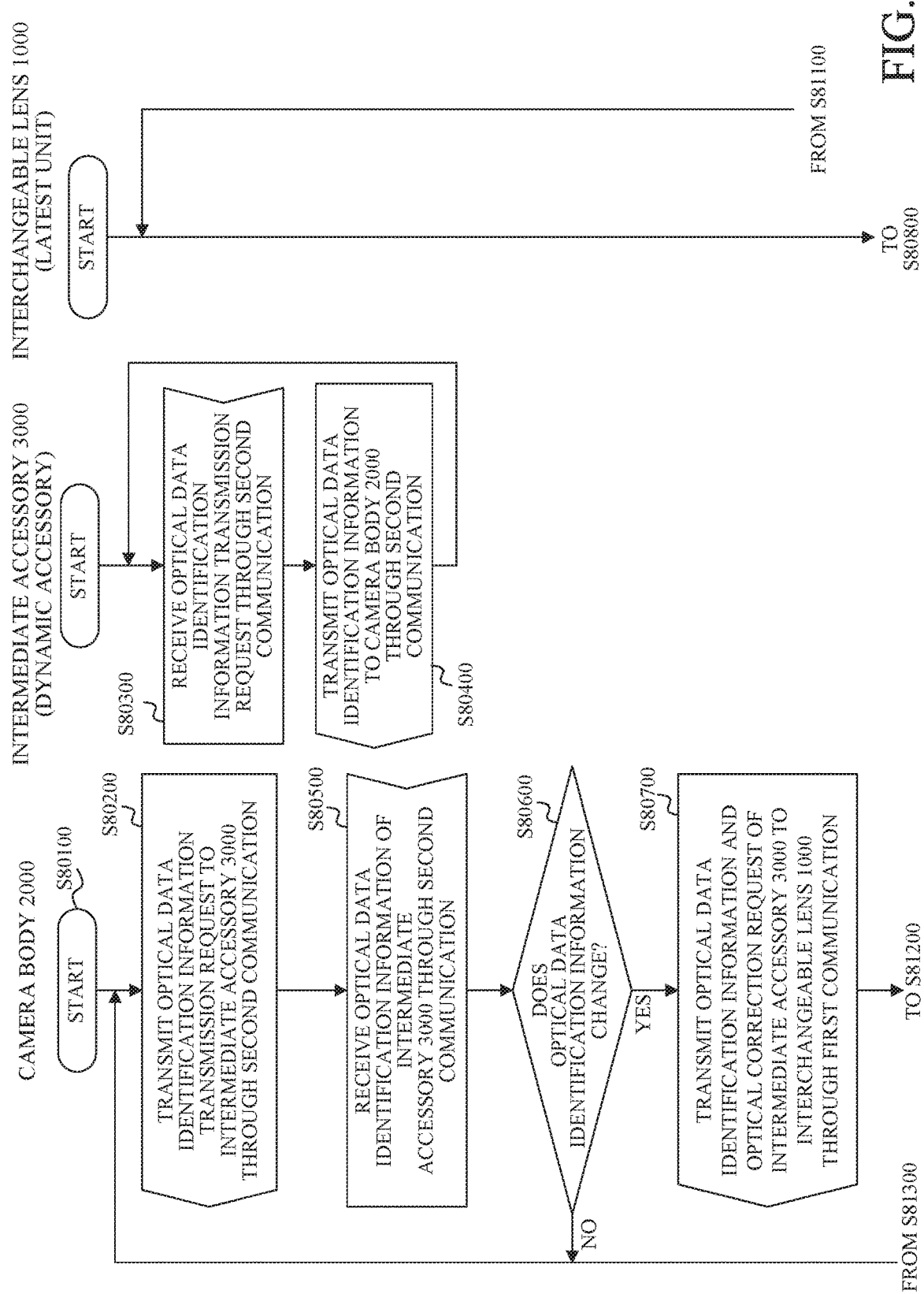
FIGS. 18A and 18B illustrate a flowchart of a flow of optical information correction processing in accordance with an operation of the dynamic accessory according to the sixth embodiment.
Figure 18B:
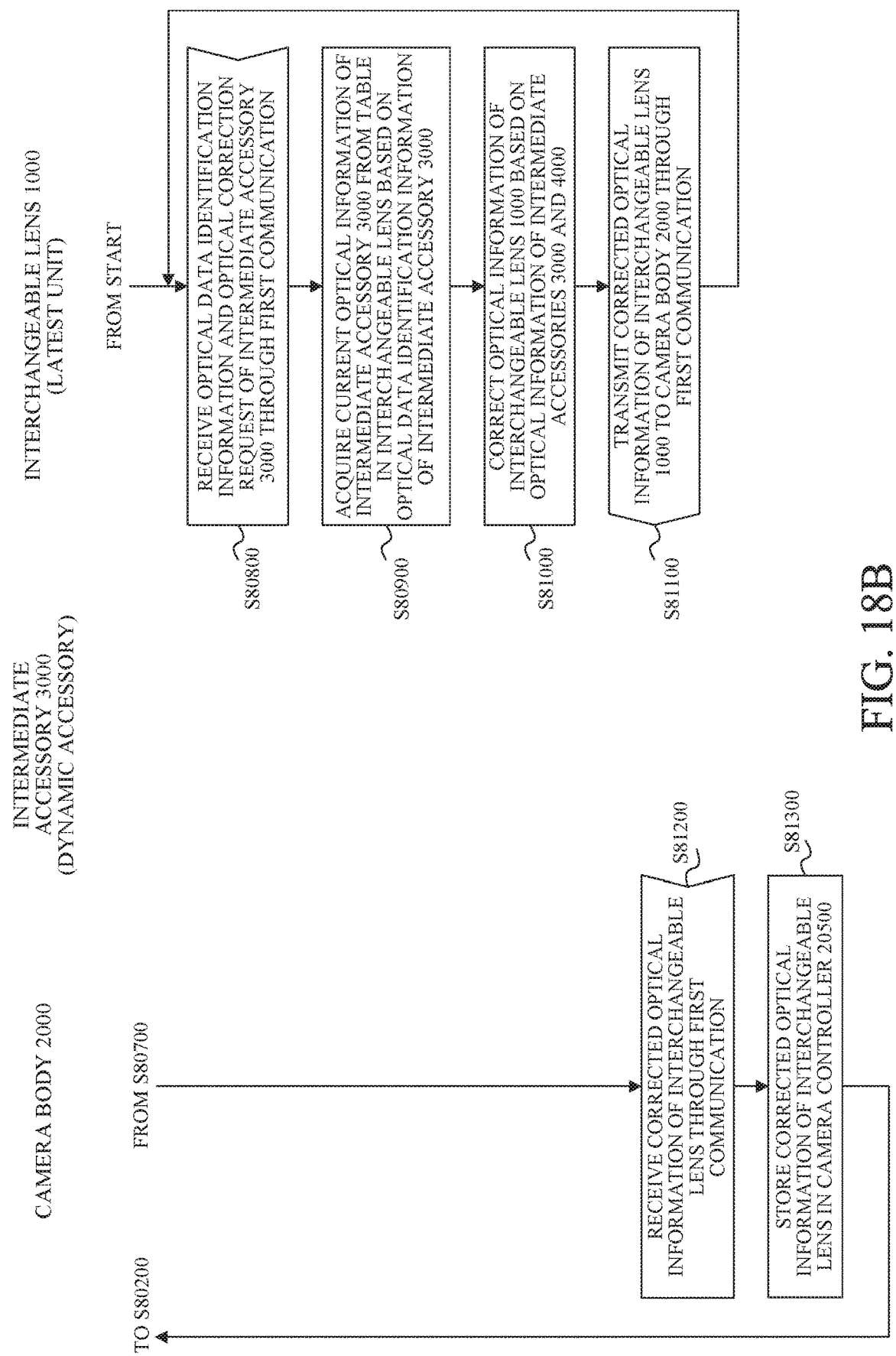

Referring now to FIGS. 18A and 18B, a description will be given of the subprocess S70400 for correcting the optical information of the interchangeable lens based on the change of the optical information according to the operation of the dynamic accessory according to the sixth embodiment of the present invention.

In the subprocess illustrated in FIGS. 18A and 18B, the intermediate accessory 3000 is a dynamic accessory, the interchangeable lens 1000 is a first unit and a static lens, and the intermediate accessory 4000 is a static intermediate accessory. In other words, assume that the camera controller 20500 and the lens controller 11300 have recognized as such in S70200 of FIG. 17.

When the sequence starts in S80100, the flow proceeds to S80200.

In S80200, the camera controller 20500 transmits an optical data identification information transmission request to the intermediate-accessory controller 30900 of the intermediate accessory 3000 as the dynamic accessory through the second communication.

The intermediate-accessory controller 30900 when receiving the optical data identification information transmission request in S80300 proceeds to S80400 and transmits the optical data identification information to the camera controller 20500 through the second communication.

The optical data identification information of the dynamic accessory is information relating to the correction parameter of the optical information of the interchangeable lens 1000, such as the current optical information in this embodiment. For example, if the intermediate accessory has a magnification varying lens, it is the information on the current magnification. For example, when the intermediate accessory has an ND filter, it is the information for correcting the current optical path length. The optical data identification information may be other information as long as the first unit can recognize the optical state of the dynamic accessory. It may be information of a plurality of available states added to information such as a model number (ID) used for the type (model) identification, or optical data identification information indicating dynamically changing optical data. It may be information indicating the function of the accessory or information such as a production number (serial number) that can identify an individual in the same model.

When the camera controller 20500 receives the optical data identification information in S80500, the flow proceeds to S80600.

In S80600, the camera controller 20500 determines whether the optical information of the intermediate accessory 3000 has changed based on the optical data identification information. For example, the optical information of the intermediate accessory 3000 received in the initial communication in S70200 is compared with the optical data identification information received in S80500. If the optical information has not changed, the flow returns to S80200, and the camera controller 20500 retransmits an optical data identification information transmission request after a predetermined time has elapsed.

If the camera controller 20500 determines that the optical information of the intermediate accessory 3000 has changed in S80600, the flow proceeds to S80700 as a process for correcting the optical information of the optical lens.

A means for the camera controller 20500 to recognize a change in the optical information of the dynamic accessory, as in S80200, 80300, 80400, 80500, and S80600, may receive the presence or absence of change in optical information by performing a communication with the dynamic accessory at a constant period by polling.

An interrupt signal may be received from the dynamic accessory when the optical information of the dynamic accessory changes. For example, assume that the intermediate accessory 3000 as a dynamic accessory has an operation member that changes the optical information of the intermediate accessory 3000. Then, an interrupt signal may be transmitted from the intermediate-accessory controller 30900 described later to the camera controller 20500 upon detection of the operation of the operation member. After the camera controller 20500 receives an interrupt signal from the intermediate-accessory controller 30900 and determines that the optical data identification information has changed in S80600, the above S80200, 80300, 80400, 80500 may be executed.

The optical data identification information in which a change is reflected may be communicated as in S80200, S80300, S80400, and S80500. Alternatively, only the change of the optical data identification information may be notified to the camera controller 20500, and the camera controller 20500 may calculate the current optical data identification information and start the communication.

After transferring to S80700, the camera controller 20500 transmits to the lens controller 11300 of the interchangeable lens 1000 as the first unit, the optical data identification information of the intermediate accessory 3000 and the correction request of the optical information (also referred to as an optical correction request) of the interchangeable lens 1000 through the first communication.

When the lens controller 11300 receives the optical data identification information of the intermediate accessory 3000 and the optical correction request in S80800, the flow proceeds to S80900.

In S80900, the lens controller 11300 acquires the current optical information of the intermediate accessory 3000 from the table in the lens controller 11300 based on the optical data identification information of the intermediate accessory 3000, and proceeds to S80900.

In S81000, the optical information of the interchangeable lens 1000 is corrected based on the optical information of the intermediate accessory 4000 as the static intermediate accessory and the optical information of the intermediate accessory 3000, which are acquired in the subprocess S70200.

When the correction is completed, the lens controller 11300 transmits the corrected optical information of the interchangeable lens 1000 to the camera controller 20500 through the first communication in S81100.

When the optical information of the interchangeable lens corrected by the camera controller 20500 is received in S81200, the flow proceeds to S81300 and the optical information is stored in the camera controller 20500.

When S81300 ends, the flow returns to S80200 to again monitor the change in the optical information of the dynamic accessory.

This embodiment describes one of the intermediate accessories as a dynamic accessory and the interchangeable lens 1000 as a first unit. Even when there are a plurality of dynamic accessories or when the first unit is a unit other than the interchangeable lens, the correction processing can be performed similarly.

If the recognizes that only the first unit s the dynamic accessory, the optical correction may be performed when it recognizes that its own optical information has changed, and the optical data of the interchangeable lens 1000 that has undergone the optical correction may be transmitted to the camera body 2000.

The correction processing of the optical information of the interchangeable lens 1000 is performed not only based on the optical information of the dynamic accessory acquired in S80500 but also based on the optical information of the static intermediate accessory like the optical information of the intermediate accessory 4000 of S81000. When the static intermediate accessory is attached, it is pre-corrected by the optical information of the static intermediate accessory, and when the optical information dynamically changes, the final correction processing may be performed by the optical information of the dynamic accessory.

<Effect of Sixth Embodiment>

As described above, in the sixth embodiment, the camera controller 20500 detects a change in optical information of the intermediate accessory 3000. Then, the camera body 2000 transmits, to the lens controller 11300, the information on the change of the optical information and a correction request of the optical information of the interchangeable lens 1000. Then, the lens controller 11300 corrects the optical information of the interchangeable lens 1000 and transmits the optical information to the camera controller 20500.

Thereby, even when the optical information of the accessory dynamically changes, the optical information of the interchangeable lens can be properly corrected.

Seventh Embodiment

This embodiment will focus on the optical data identification information indicating optical data unique to an accessory used as the intermediate accessory identification information.

A new model number is assigned to product-specific information such as model number (ID) as intermediate accessory identification information, if the new product accessory has the same optical system as the known accessory or is an accessory that can be corrected by the same correction method as the known accessory. Thus, when the optical information correction necessity of the interchangeable lens is determined based on the model number (ID) etc. and the model number (ID) is unknown, the lens optical information cannot be corrected based on the optical characteristic of the accessory.

Accordingly, this embodiment uses the optical data identification information as the intermediate accessory identification information. This embodiment tags the intermediate accessory identification information with the correction method. More specifically, a combination of the information on the correction method and the information on the correction parameter is set to optical data identification information. Such optical data identification information will be hereinafter referred to as correction identification information. The information on the correction method according to this embodiment is information corresponding to the optical member of the intermediate accessory, and the information on the correction parameter is information corresponding to the optical information of the intermediate accessory according to the optical characteristics of the optical member. For example, when the intermediate accessory is a magnification varying adapter having a magnification varying lens, the information on the correction method is information indicating a magnification varying lens, and information on the correction parameter is magnification information on the magnification varying lens.

The lens controller 11300 may store the information on the correction method and the information on the correction parameter while tagging them with each other. If other information is necessary to correct the optical information, the other information may also be stored while it is tagged with the information on the correction method and the information on the correction parameter.

The information on the correction method and the information on the correction parameters are transmitted to the lens controller 11300 via the camera controller 20500. Thereby, even if it is newly necessary to make a correction for an intermediate accessory in which information having a different correction parameter, the existing unit (the interchangeable lens 1000 in this embodiment) can make the correction by resetting the magnification information as the correction parameter.

Thus, the optical information of the interchangeable lens can be corrected with the optical data identification information based on the optical characteristics of the accessory. For example, if there is an optical system similar to that of an existing product or an accessory that can be corrected by the same method as the existing product and the model number (ID) is unknown, the optical information of the interchangeable lens can be corrected.

When the correction identification information is used, it is inefficient to store a correction algorithm in each unit, so the correcting unit may be previously determined. This embodiment describes that the correcting unit is previously determined as the interchangeable lens. The correction method of the interchangeable lens using the correction identification information will be described. Where the first unit makes the correction as in the fifth and sixth embodiments, the correction identification information can be similarly used.

<Acquisition Processing of Corrected Optical Information according to Seventh Embodiment (FIG. 20)>

Figure 20:
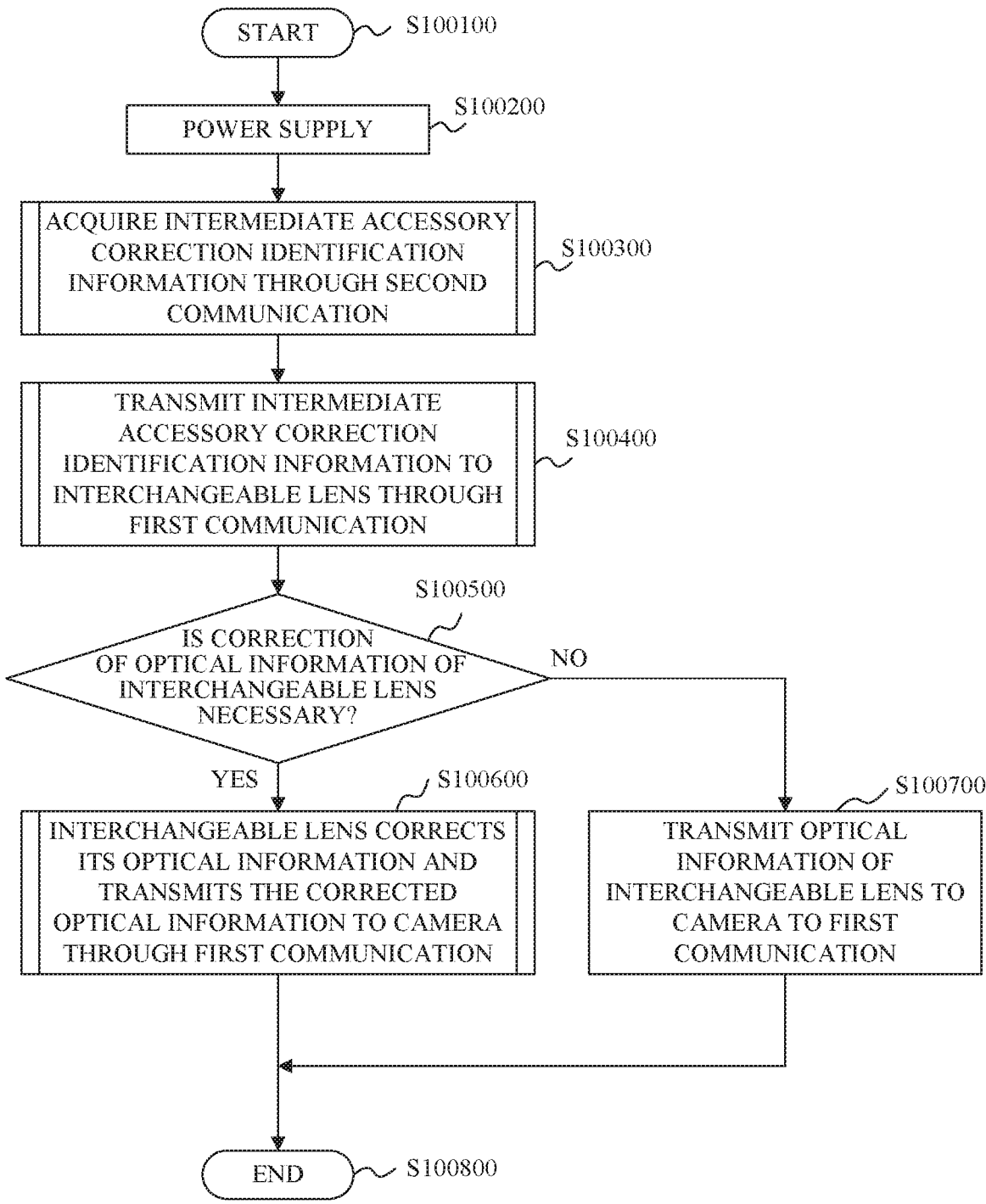
FIG. 20 is a flowchart showing a processing flow for acquiring correction identification information according to a seventh embodiment and correction processing using the correction identification information.

FIG. 20 illustrates a processing flow when the power is initially supplied after each accessory is mounted, in which the camera body 2000 acquires correction information from each accessory, transmits it to the interchangeable lens 1000 to request it for the correction, and acquires the corrected optical information of the interchangeable lens 1000.

When the camera body 2000 starts in S100100, the flow proceeds to S100200.

When the flow proceeds to S100200, the camera body 2000 supplies the power to the interchangeable lens 1000 and the intermediate accessories 3000 and 4000 via an unillustrated power supplying mount contact, and the flow proceeds to S100300.

The subprocess S100300 as the initial communication processing with the accessory through the second communication is substantially the same as the subprocess S30400 in the first embodiment. In S100300, the above corrected identification information is acquired as identification information of the intermediate accessory.

When the correction authentication information of the accessory is acquired in S100300, the flow transfers to S100400.

After transferring to S100400, the camera controller 20500 transmits the intermediate accessory correction identification information acquired in S100300 to the interchangeable lens 1000, and requests it to correct the optical information. When the interchangeable lens acquires the correction identification information of the intermediate accessory, the flow proceeds to S100500.

After transferring to S100500, the interchangeable lens controller 11300 determines whether it is necessary to correct its own optical information based on the intermediate accessory correction identification information. If the intermediate accessory whose optical information is to be corrected is attached, the flow proceeds to S100600.

In S100600, the interchangeable lens controller 11300 corrects its own optical information based on the intermediate accessory correction identification information, and transmits the corrected optical information to the camera.

In S100500, if the intermediate accessory is not attached, or if all attached intermediate accessories are intermediate accessories that do not require correction of the optical information of the interchangeable lens, the correction processing is unnecessary, so the flow proceeds to S100700.

In S100700, the interchangeable lens controller 11300 transmits its own optical information to the camera.

The transmission timing of the optical information in S100600 and S100700 may be just after the correction is completed, or may be a timing requested from the camera.

After the optical information is acquired in S100600 or S100700, the flow transfers to S100300 and the optical information acquisition sequence ends.

Thus, the camera system independently having the first communication path in which the camera and the interchangeable lens can communicate with each other and the second communication path in which the camera and the intermediate accessories can communicate with one another can properly correct the optical information of the interchangeable lens based on the optical information of the intermediate accessory.

The fifth embodiment illustrates an example in which the identification information of the accessory and the correction processing necessity information are included in the authentication information of the accessory. On the other hand, even if only the correction processing necessity information is added to the authentication information of the accessory and the correction processing necessity information indicates the correction "necessity", the correction processing necessity information may be separately acquired. Thereby, the communication amount can be reduced when the correction processing necessity information indicates the correction "unnecessary" as compared with the case where the correction identification information is acquired regardless of the correction processing necessity information. In this case, both the intermediate accessory identification information and the correction processing necessity information are acquired similar to the above embodiment. In other words, when the correction processing necessity information is the correction "necessary" and the correction identification information is separately acquired, both the intermediate accessory identification information and the correction identification information are acquired as the information for identifying the accessory. Thereby, the communication amount can be reduced where the correction processing necessity information indicates the correction "unnecessary", and the intermediate accessory identification information can be used for other applications irrespective of whether the correction processing necessity information is the correction "necessity" or "unnecessary".

When it is determined that the lens controller 11300 does not store information corresponding to the information relating to the correction method based on the information relating to the correction method included in the correction identification information, a control may be made so as not to correct the optical information of the interchangeable lens 1000.

<Effect of Seventh Embodiment>

As described above, the camera controller 20500 acquires the information on the correction method and the information on the correction parameter from the intermediate-accessory controller 30900, and transmits the information to the lens controller 11300. Thereby, the lens controller 11300 can correct the optical information based on the accessory if the correction method is known even for a new accessory.

Eighth Embodiment

The above embodiments describe the camera body 2000 that acquires the identification information (also referred to as first lens identification information) of the interchangeable lens 1000 as the authentication information of the interchangeable lens 1000 in the initial communication performed with the interchangeable lens 1000 through the first communication. The above embodiments describe the camera body 2000 that acquires that identification information (also referred to as second lens identification information) of the interchangeable lens 1000 as the authentication information of the interchangeable lens 1000 in the initial communication performed with the accessory through the second communication. This embodiment focuses on the relationship between the first lens identification information and the second lens identification information.

As described above, the identification information of the interchangeable lens 1000 and the accessory may be information such as a model number (ID) used to identify the type (model) of the corresponding unit. It may include information indicating the function of the interchangeable lens or information such as a production number (serial number) that can identify an individual in the same model.

In the camera system according to this embodiment, the interchangeable lens 1000 can communicate with the camera body 2000 through both the first communication and the second communication, and as described in the fifth embodiment, performs the initial communication with the camera body 2000 through the first communication and the second communication. The interchangeable lens 1000 transmits the identification information (the first lens identification information and the second lens identification information described above) of the interchangeable lens 1000 to the camera body 2000 in the initial communication through any of the first communication and the second communication.

At this time, the lens controller 11300 may send the same information as the first lens identification information and the second lens identification information, but this embodiment intentionally sends information as the second lens identification information different from the first lens identification to the camera controller 205. Thereby, the lens controller 11300 effectively uses the second lens identification information transmitted to the camera controller 20500 through the second communication.

The first lens identification information and the second lens identification information of this embodiment will be more specifically described. The first lens identification information is information that enables the type (model) of the interchangeable lens 1000 to be identified, such as a model number (ID).

On the other hand, the second lens identification information is information different from the first lens identification information, such as information indicating that the interchangeable lens 1000 is a lens. In this case, the second lens identification information is information that indicates that the interchangeable lens 1000 is a lens but does not correspond to the type (model) of the interchangeable lens 1000. Thus, for example, the second lens identification information can be made unique information regardless of the type (model) of the interchangeable lens 1000.

Thus, in this embodiment, the lens controller 11300 does not transmit the first identification information, which is to be transmitted in the initial communication through the first communication as the one-to-one communication between the camera body 2000 and the interchangeable lens 1000, through the second communication as the one-to-many communication between the camera body 2000 and the accessories. The second communication transmits the information indicating the lens or information indicating the non-intermediate accessory to the camera controller 10500 as the second identification information.

Selectively using the first lens identification information and the second lens identification information in this embodiment as described above, for example, can realize the following effects.

For example, the identification information acquired by the camera controller 20500 from the lens controller 11300 through the first communication is set to a system for the interchangeable lens, and the identification information acquired by the camera controller 20500 from the controller of each accessory through the second communication can be set to a system for the intermediate accessories. This configuration can provide a camera system that has extensibility to the prospective intermediate accessories.

For example, it can also be used to grasp the number of intermediate accessory connections. This is because an accessory that transmits the identification information other than the second identification information to the camera controller 10500 is not the interchangeable lens 1000 and therefore it can be determined as an intermediate accessory.

When the number of intermediate accessory connections is known, for example, when a predetermined number or more of intermediate accessories are attached, a warning operation may be performed to the user, or the function of one of the intermediate accessories may be limited. This configuration can reduce the power consumption and maintain the communication quality. When a large amount of data such as the firmware upgrade is transmitted to the intermediate accessory, a transfer to the intermediate accessory firmware upgrade mode may be permitted only when it is determined that only one intermediate accessory is connected.

Determining that the interchangeable lens 1000 is not the intermediate accessory but the lens can reduce the information to be transmitted from the lens controller 11300 to the camera controller 10500 in the initial communication through the second communication. For example, the lens controller 11300 may not return the correction processing necessity information to the camera controller 10500. This is because the correction of the optical information of the interchangeable lens 1000 is not required by mounting of the interchangeable lens 1000 that is not an intermediate accessory.

Alternatively, for example, whether the terminal accessory is an interchangeable lens or an intermediate accessory may be electrically determined and the determination result may be used for a comparison with the second identification information. A detailed description will be given below. The communication error can be determined by verifying the matching property with the hardware processing as described.

This embodiment describes an illustrative method of electrically discriminating whether the terminal accessory is an interchangeable lens or an intermediate accessory in the initial communication with the interchangeable lens or the intermediate accessory according to the fifth to seventh embodiments. Moreover, this embodiment describes the error processing where there is an unconformity to the terminal accessory through the second communication whose determination result is determined by the identification information acquired through the second communication.

<Configuration of Camera System according to Eighth Embodiment (FIGS. 23 and 24)>

A description will now be given of an illustrative method of electrically determining whether the terminal accessory is an interchangeable lens or an intermediate accessory. The determination is made in the initial communication through the second communication.

Figure 23:
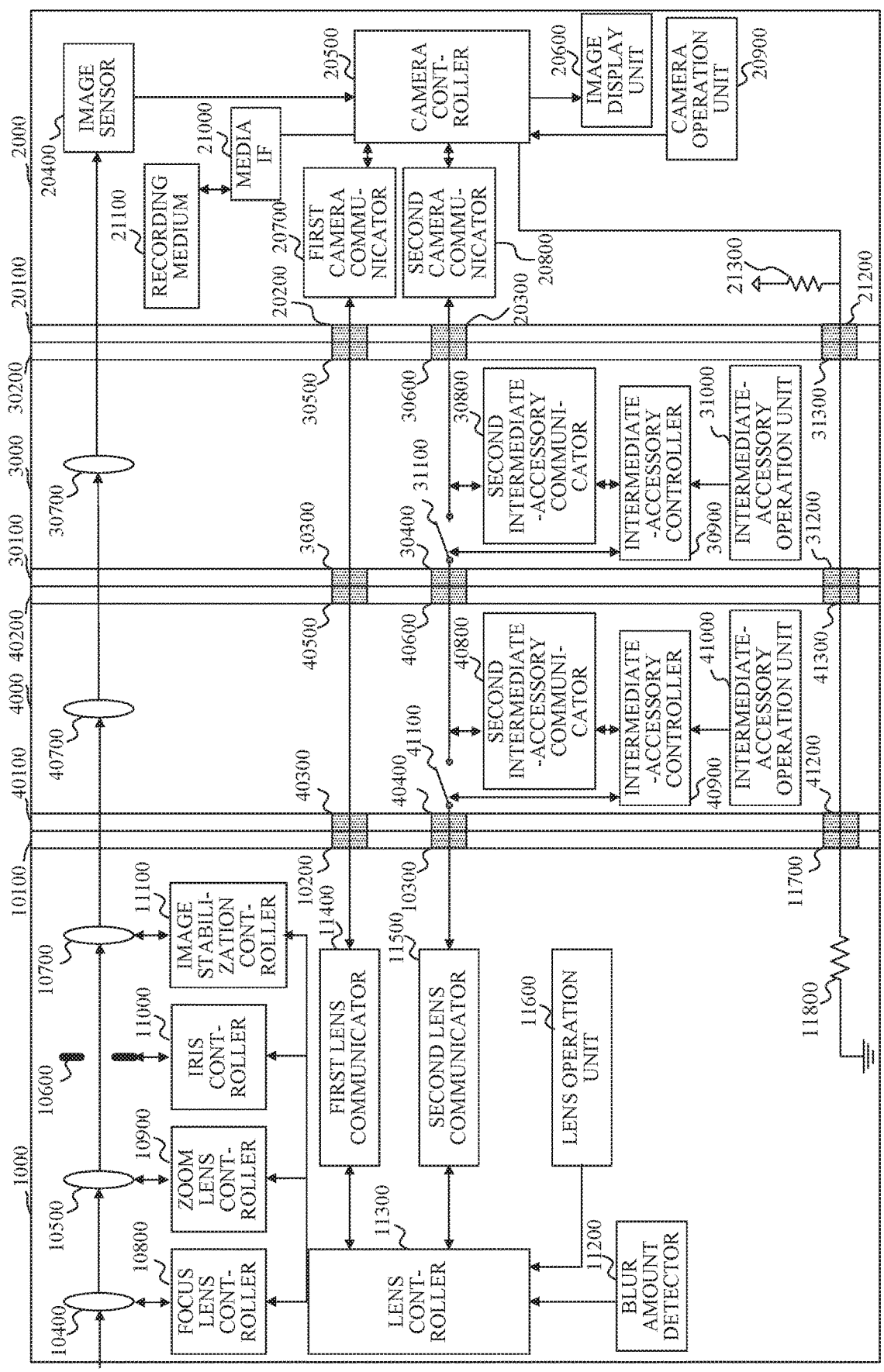
FIG. 23 is a block diagram for explaining a configuration of a camera system in which a terminal according to an eighth embodiment is an interchangeable lens.

A description will now be given of the configuration where the interchangeable lens 1000 is attached to the terminal of the second communication. As illustrated in FIG. 23, the mount 20100 of the camera body 2000 includes an identification terminal 21200. The mount 30200 of the intermediate accessory 3000 includes an identification terminal 31300. The mount 40200 of the intermediate accessory 4000 includes an identification terminal 41300, and the mount 40100 includes an identification terminal 41200. The mount 10100 of the interchangeable lens 1000 includes an identification terminal. A line (also referred to as an identification line) connected via these identification terminals is connected to a resistor 11800 provided in the interchangeable lens 1000. This line is pulled up through a resistor 21300 provided in the camera body 2000. A value obtained by dividing the voltage level of the pull-up power supply by the resistance values of the resistors 11800 and 21300 is input to the camera controller 20500.

Figure 24:
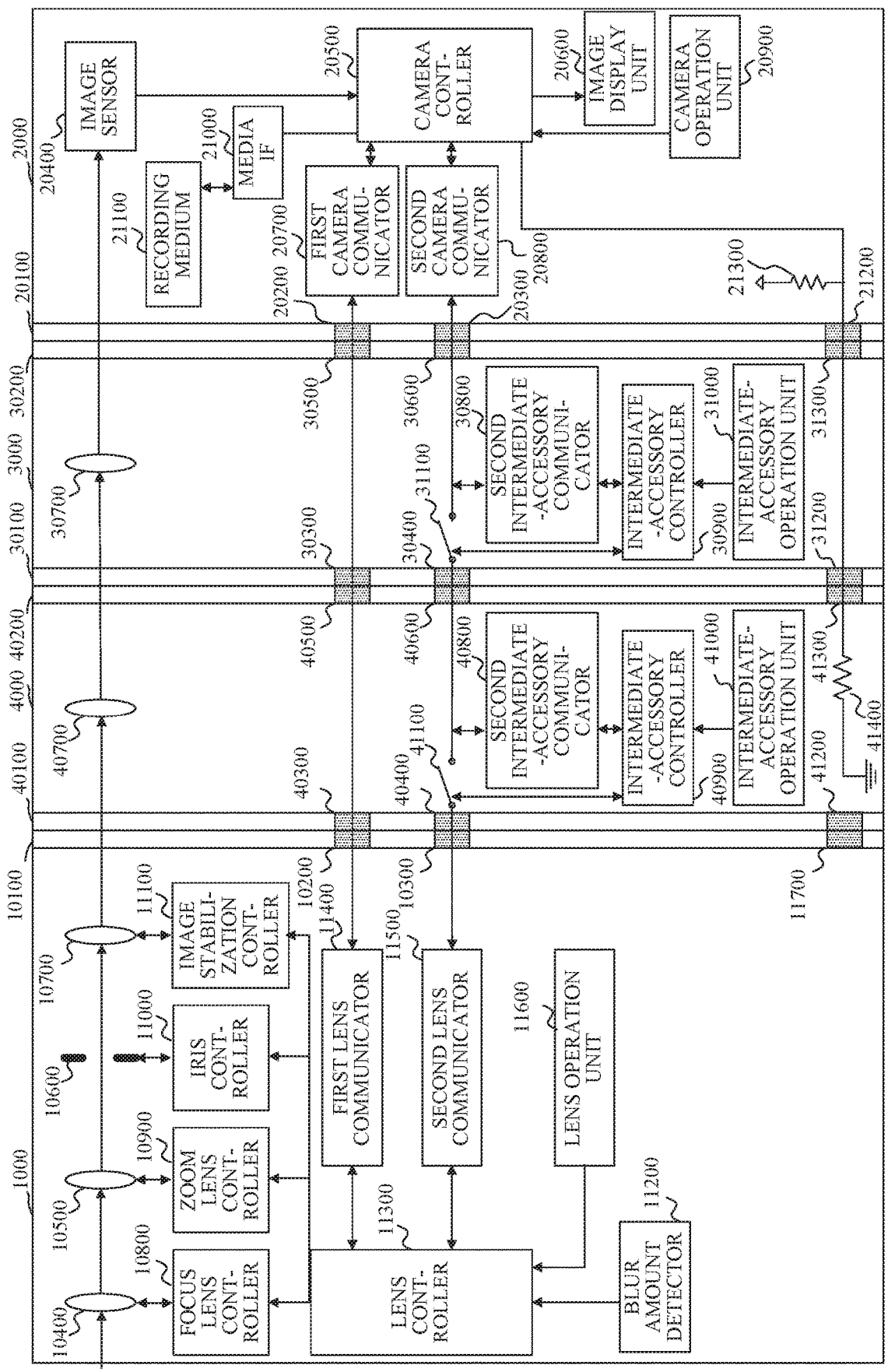
FIG. 24 is a block diagram for explaining a configuration of a camera system in which a terminal according to the eighth embodiment is an intermediate accessory.

Next follows a description of the configuration where the terminal of the second communication is the intermediate accessory 4000. As illustrated in FIG. 24, as in the case where the terminal of the second communication is an interchangeable lens, the identification lines via the identification terminals 21200, 31300, 31200, and 41300 are connected to the resistor 41400 provided to the intermediate accessory 4000. The input to the camera controller 20500 has a value obtained by dividing the voltage level of the pull-up power supply of the camera body 2000 by the resistance values of the resistors 41400 and 21300.

Figure 25:
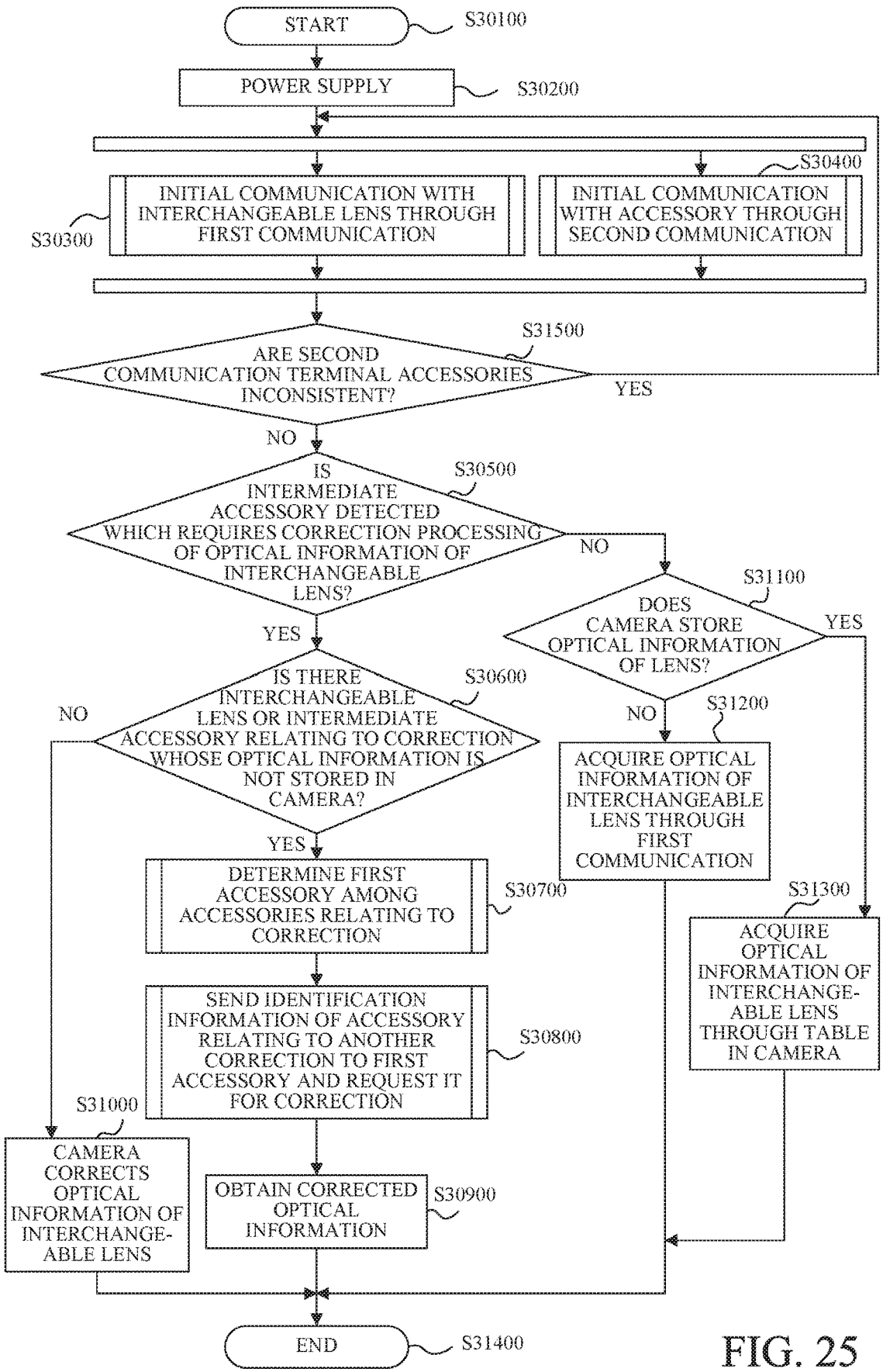
FIG. 25 is a flowchart showing a processing flow of detecting a communication error in the second communication according to the eighth embodiment.

<Second Communication Error Determination Method according to Eighth Embodiment (FIG. 25)>

Now assume that the resistor used for the interchangeable lens 1000 and the resistor used for the intermediate accessory at the terminal have different resistance values in advance. Thereby, whether or not the terminal accessory is an interchangeable lens can be electrically determined, based on the level of the input signal via the identification terminal.

If the electrically identified terminal accessory is the interchangeable lens 1000, the second identification information should be obtained as the identification information of the terminal accessory acquired by the initial communication through the second communication. On the other hand, when the electrically determined terminal accessory is the intermediate accessory, the identification information of the terminal accessory acquired in the initial communication through the second communication should be information different from the second identification information, and more specifically should be intermediate accessory identification information.

However, if there is any problems in the second communication, the above correspondence relationship may have a contradiction. Accordingly, if there is an inconsistency between the electrically determined terminal accessory and the identification information acquired through the second communication, it is determined that a communication error has occurred and the retry is performed from the initial communication for a more accurate communication.

Thus, whether the communication has been correctly performed through the second communication can be determined by comparing the electrical identification information with the identification information acquired through the second communication. Whether the acquired identification information is correct can be determined. Thereby, the communication error through the second communication can be detected.

<Effect of Eighth Embodiment>

As described above, in this embodiment, the second lens identification information is information different from the first lens identification information corresponding to the type (model) of the interchangeable lens 1000 and information indicating that it is a lens. This configuration can improve, for example, the identification performance of the accessory that makes a communication through the second communication.

Variation

The above embodiment describes the first accessory as an accessory that stores the optical information of all other accessories among the accessories relating to the correction. However, it may be an accessory having the largest amount of optical information of each other among the accessories relating to the correction. Some accessories may not have the optical information. In that case, the missing optical information may be acquired from another unit.

In the initial communication of the above embodiment, the lens controller 11300 transmits the identification information of the interchangeable lens 1000 in S40400 and S52000. For example, the identification information transmitted in S52000 may be the identification information indicating that the accessory is not an intermediate accessory.

In the initial communication in FIGS. 15A and 15B of the above embodiment, each accessory transmits a plurality of pieces of information as the authentication information the camera controller 20500, but may transmit only necessary information. In this case, the camera identifies the necessary information and sends an information request to each accessory.

Although the above embodiment describes two intermediate accessories, if three or more intermediate accessories provided, the first intermediate accessory may be set to one that stores all or more optical information of the other intermediate accessories among the plurality of intermediate accessories.

In the sixth embodiment, the dynamic accessory may correct the optical information of the interchangeable lens 1000. In this case, the dynamic accessory may previously acquire the optical information of another accessory. When the dynamic accessory corrects the optical information of the interchangeable lens 1000, the corrected optical information is transmitted to the camera body 2000.

In the sixth embodiment, when there are a plurality of first accessories, the dynamic accessory may correct the optical information of the interchangeable lens 1000.

The seventh embodiment describes that the camera body 2000 corrects the optical information of the interchangeable lens 1000. On the other hand, the optical information may be corrected in the interchangeable lens 1000. In this case, the camera controller 20500 transmits, to the lens controller 11300, a request to correct the optical information of the interchangeable lens 1000. At this time, the interchangeable lens 1000 may acquire the optical information of the intermediate accessory from the camera body 2000 or the intermediate accessory as necessary when the optical information of the intermediate accessory which needs the correction is insufficient.

The eighth embodiment describes an example in which the camera controller 205 acquires the information on the correction method and the information on the correction parameter from the intermediate-accessory controller 30900 and transmits the two pieces of information to the lens controller 11300. Where the intermediate accessory 3000 is a dynamic intermediate accessory as described in the sixth embodiment and the information on the correction parameter is variable, the information on the correction parameter may be reacquired when the variation is detected. In other words, when the operation of the operation member of the intermediate accessory 3000 is detected, the camera controller 20500 acquires the information on the correction parameter from the intermediate-accessory controller 30900 and transmits the information to the lens controller 11300.

The fifth embodiment describes the clock synchronous communication as the first communication method, but may perform the asynchronous communication. The asynchronous communication will be described with reference to FIG. 22.

Figure 22:
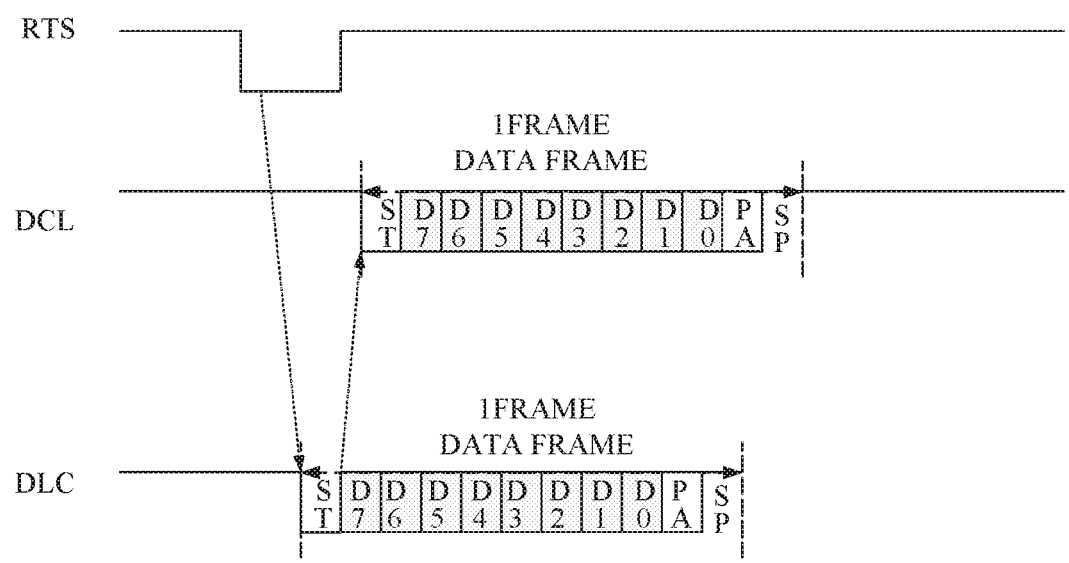
FIG. 22 is a diagram for explaining a variation of the first communication according to the fifth embodiment.

FIG. 12 illustrates the three-line clock synchronous communication. Instead, similar effects are available with the three-line asynchronous communication including three lines of the communication channel 1. FIG. 22 illustrates a signal waveform in the three-line asynchronous communication. The three-line asynchronous communication provides an RTS communication line (RTS) instead of the above clock communication line (LCLK). The RTS communication line is a signal line for transmitting a signal for controlling the communication timing by the camera-lens communication line (DCL) and the communication timing by the first lens-camera communication line (DLC) from the camera microcomputer 20500 to the lens microcomputer 11100. For example, it is used for a notice, such as a transmission request (transmission instruction) of the lens data from the camera microcomputer 20500 to the lens microcomputer 11100 and a switching request (switching instruction) of the communication processing described later. The notice on the transmission request channel is performed by switching the signal level (voltage level) on the transmission request channel between high (first level) and low (second level). The following description refers to the signal supplied to the RTS communication line as a transmission request signal RTS. The transmission request signal RTS is sent from the camera microcomputer 20500 as the communication master to the lens microcomputer 11100 as the communication slave. When the lens microcomputer 11100 receives the transmission request RTS, the signal level of the lens data signal DLC is set low during a one-bit period to notify the camera microcomputer 20500 of the transmission start of one frame of the lens data signal DLC, as illustrated in FIG. 22. This one-bit period will be called a start bit ST indicating the start of one frame. In other words, the data frame starts with the start bit ST. The start bit ST is provided at the top bit of each frame of the lens data signal DLC. Next, the lens microcomputer 11100 transmits the one-byte lens data during an 8-bit period from the next second bit to the ninth bit. The data bit arrangement starts with the most significant data D7 in the MSB first format, continues to data DC and data D5 in this order, and ends with the least significant data D0. The lens microcomputer 11100 adds one-bit parity information PA to the 10th bit, and sets high the signal level of the lens data signal DLC during the period of the stop bit SP indicating the end of one frame. Thereby, the data frame period started with the start bit ST ends.

Other Embodiments

Embodiment(s) of the present invention can also be realized by a computer of a system or apparatus that reads out and executes computer executable instructions e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2018-124017, filed on Jun. 29, 2018, 2019-111049, filed on Jun. 14, 2019, 2018-143940, filed on Jul. 31, 2018 and 2019-111474, filed on Jun. 14, 2019, each of which is hereby incorporated by reference herein in its entirety.

What is claimed is:

1. An imaging apparatus to which an accessory apparatus is attachable, the imaging apparatus comprising:
    a camera communicator configured to provide a communication path with the accessory apparatus; and
    a camera controller configured to communicate with the accessory apparatus via the camera communicator,
    wherein the camera controller performs an initial communication in response to a power supply from the imaging apparatus to the accessory apparatus,
    wherein the camera controller, in the initial communication, transmits a first request to the accessory apparatus, receives first information indicating whether or not to stop a communication between the imaging apparatus and the accessory apparatus, and controls a communication with the accessory apparatus according to the first information,
    wherein the camera controller performs communication via a first communication line and a second communication line,
    wherein in a first communication mode, the camera controller transmits data via the first communication line while maintaining a signal level of the second communication line at a predetermined signal level after change of the signal level to the predetermined signal level,
    wherein in a second communication mode, the camera controller transmits data via the first communication line before change of the signal level of the second communication line to the predetermined signal level.

2. The imaging apparatus according to claim 1, wherein a plurality of accessory apparatuses are attachable to the imaging apparatus, and
    wherein the camera controller determines the accessory apparatus as a communication target among the plurality of accessory apparatuses based on received first information, and communicates with the accessory apparatus determined to be the communication target.

3. The imaging apparatus according to claim 1, wherein the camera controller receives authentication information including the first information and identification information of the accessory apparatus from the accessory apparatus that has received the first request.

4. The imaging apparatus according to claim 3, wherein the camera controller receives the authentication information from the accessory apparatus in the initial communication.

5. The imaging apparatus according to claim 3, wherein the authentication information transmitted from the accessory apparatus that is a terminal of a communication viewed from the imaging apparatus includes terminal information indicating the terminal.

6. The imaging apparatus according to claim 3, wherein the camera controller performs a first communication and a second communication with the accessory apparatus, and receives the authentication information through the second communication.

7. The imaging apparatus according to claim 1, wherein the camera controller receives from the accessory apparatus a communication request and second information corresponding to a factor of the communication request, and control the imaging apparatus or the accessory apparatus according to the second information.

8. The imaging apparatus according to claim 7, wherein when the factor is a change of the first information, the camera controller transmits the first request to the accessory apparatus as a control according to the second information, and again receives the first information from the accessory apparatus that has transmitted the second information.

9. The imaging apparatus according to claim 1, wherein the camera controller discards received first information in response to a request to discard the first information received from the accessory apparatus, and again receives the first information from the accessory apparatus.

10. The imaging apparatus according to claim 1,
wherein in a case where the first information indicates not to stop the communication between the imaging apparatus and the accessory apparatus, the communication between the imaging apparatus and the accessory apparatus is performed after the initial communication until supplying power to the accessory apparatus is stopped.

11. The imaging apparatus according to claim 10, wherein in a case where the first information indicates to stop the communication between the imaging apparatus and the accessory apparatus, the camera controller stops a transmission of data after the initial communication until supplying power to the accessory apparatus is stopped.

12. An accessory apparatus attachable to an imaging apparatus, the accessory apparatus comprising:
an accessory communicator configured to provide a communication path with the imaging apparatus; and
an accessory controller configured to communicate with the imaging apparatus via the accessory communicator,
wherein the accessory controller performs an initial communication in response to a power supply from the imaging apparatus to the accessory apparatus,
wherein the accessory controller, in the initial communication, transmits to the imaging apparatus first information indicating whether or not to stop a communication between the imaging apparatus and the accessory apparatus, in response to a reception of a first request,
wherein the accessory controller performs communication by a first communication mode or a second communication mode via a first communication line and a second communication line,
wherein in the first communication mode, the accessory controller receives data via the first communication line while maintaining a signal level of the second communication line at a predetermined signal level after change of the signal level to the predetermined signal level,
wherein in the second communication mode, the accessory controller receives data via the first communication line before change of the signal level of the second communication line to the predetermined signal level.

13. The accessory apparatus according to claim 12, wherein the accessory controller communicates with the imaging apparatus when the imaging apparatus determines the accessory apparatus as a communication target based on the first information.

14. The accessory apparatus according to claim 12, wherein the accessory controller transmits authentication information including the first information and identification information of the accessory apparatus to the imaging apparatus in response to the first request.

15. The accessory apparatus according to claim 14, wherein the accessory controller transmits the authentication information to the imaging apparatus in the initial communication performed.

16. The accessory apparatus according to claim 14, wherein where the accessory apparatus is a terminal of a communication viewed from the imaging apparatus, the authentication information includes termination information indicating the terminal.

17. The accessory apparatus according to claim 14, wherein the imaging apparatus can perform a first communication and a second communication with the accessory apparatus, and
wherein the accessory controller transmits the authentication information to the imaging apparatus through the second communication.

18. The accessory apparatus according to claim 12, wherein the accessory controller transmits to the imaging apparatus a communication request and second information corresponding to a factor of the communication request.

19. The accessory apparatus according to claim 18, wherein when the factor is a change in the first information, the accessory controller again transmits the first information to the imaging apparatus in response to the first request corresponding to the second information from the imaging apparatus.

20. The accessory apparatus according to claim 12, wherein the accessory controller transmits a request to discard the first information to the imaging apparatus, and again transmits new first information to the imaging apparatus.

21. The accessory apparatus according to claim 12, wherein the accessory controller transfers to a sleep state when stopping the communication with the imaging apparatus.

22. The accessory apparatus according to claim 12,
wherein a plurality of accessory apparatuses are attachable to the imaging apparatus,
wherein the accessory apparatus includes a switch configured to switch between a connection state that connects a communication between the imaging apparatus and another accessory apparatus among the plurality of accessory apparatuses and a disconnection state that disconnects the communication between the imaging apparatus and the other accessory apparatus, and
wherein the accessory controller sets the switch to the connection state to receive the first request and then sets the switch to the disconnection state to transmit the first information to the imaging apparatus.

23. The accessory apparatus according to claim 22, wherein the accessory controller sets the switch to the connection state after the accessory controller transmits the first information.

24. The accessory apparatus according to claim 12, wherein
  wherein in a case where the first information indicates not to stop the communication between the imaging apparatus and the accessory apparatus, the communication between the imaging apparatus and the accessory apparatus is performed after the initial communication until supplying power to the accessory apparatus is stopped.

25. The accessory apparatus according to claim 24, wherein in a case where the first information indicates to stop the communication between the imaging apparatus and the accessory apparatus, the accessory controller stops a reception of data after the initial communication until supplying power to the accessory apparatus is stopped.

26. The accessory apparatus according to claim 12, wherein the accessory apparatus is a lens apparatus.

27. The accessory apparatus according to claim 12, wherein the accessory apparatus is an adapter to be attached between the imaging apparatus and an accessory apparatus.

28. An imaging system comprising:
  an imaging apparatus; and
  an accessory apparatus attached to the imaging apparatus,
  wherein the imaging apparatus includes:
    a camera communicator configured to provide a communication path with the accessory apparatus; and
    a camera controller configured to communicate with the accessory apparatus via the camera communicator,
  wherein the camera controller performs an initial communication in response to a power supply from the imaging apparatus to the accessory apparatus,
  wherein the camera controller, in the initial communication, transmits a first request to the accessory apparatus,
  wherein the accessory apparatus, in the initial communication, transmits first information indicating whether or not to stop a communication between the imaging apparatus and the accessory apparatus in response to a reception of the first request, and
  wherein the camera controller controls a communication with the accessory apparatus according to the first information,
  wherein the camera controller performs communication via a first communication line and a second communication line,
  wherein in a first communication mode, the camera controller transmits data via the first communication line while maintaining a signal level of the second communication line at a predetermined signal level after change of the signal level to the predetermined signal level,
  wherein in a second communication mode, the camera controller transmits data via the first communication line before change of the signal level of the second communication line to the predetermined signal level.

29. A communication control method of an imaging apparatus to which an accessory apparatus is attachable, the communication control method comprising the steps of:
  performing an initial communication in response to a power supply from the imaging apparatus to the accessory apparatus,
  transmitting, in the initial communication, a first request to the accessory apparatus;
  receiving, in the initial communication, first information indicating whether or not to stop a communication between the imaging apparatus and the accessory apparatus; and
  controlling a communication with the accessory apparatus according to the first information,
  wherein communication is performed via a first communication line and a second communication line,
  wherein in a first communication mode, data is transmitted via the first communication line while maintaining a signal level of the second communication line at a predetermined signal level after change of the signal level to the predetermined signal level,
  wherein in a second communication mode, data is transmitted via the first communication line before change of the signal level of the second communication line to the predetermined signal level.

30. A communication control method of an accessory apparatus attachable to an imaging apparatus, the communication control method comprising the steps of:
  performing an initial communication in response to a power supply from the imaging apparatus to the accessory apparatus,
  receiving, in the initial communication, a first request from the imaging apparatus; and
  transmitting, in the initial communication, to the imaging apparatus, first information indicating whether or not to stop a communication between the imaging apparatus and the accessory apparatus, in response to a reception of the first request,
  wherein communication is performed by a first communication mode or a second communication mode via a first communication line and a second communication line,
  wherein in the first communication mode, data is received via the first communication line while maintaining a signal level of the second communication line at a predetermined signal level after change of the signal level to the predetermined signal level,
  wherein in the second communication mode, data is received via the first communication line before change of the signal level of the second communication line to the predetermined signal level.

31. A non-transitory computer-readable storage medium storing a computer program for causing a computer of an imaging apparatus to which an accessory apparatus is attachable, to execute a communication control method,
  wherein the communication control method includes the steps of:
  performing an initial communication in response to a power supply from the imaging apparatus to the accessory apparatus,
  transmitting, in the initial communication, a first request to the accessory apparatus;
  receiving, in the initial communication, first information indicating whether or not to stop a communication between the imaging apparatus and the accessory apparatus; and
  controlling a communication with the accessory apparatus according to the first information,
  wherein communication is performed via a first communication line and a second communication line,
  wherein in a first communication mode, data is transmitted via the first communication line while maintaining a signal level of the second communication line at a predetermined signal level after change of the signal level to the predetermined signal level,
  wherein in a second communication mode, data is transmitted via the first communication line before change of the signal level of the second communication line to the predetermined signal level.

32. A non-transitory computer-readable storage medium storing a computer program for causing a computer of an accessory apparatus attachable to an imaging apparatus, to execute a communication control method,
    wherein the communication control method includes the steps of:
    performing an initial communication in response to a power supply from the imaging apparatus to the accessory apparatus,
    receiving, in the initial communication, a first request from the imaging apparatus; and
    transmitting, in the initial communication, to the imaging apparatus, first information indicating whether or not to stop a communication between the imaging apparatus and the accessory apparatus, in response to a reception of the first request,
    wherein communication is performed by a first communication mode or a second communication mode via a first communication line and a second communication line,
    wherein in the first communication mode, data is received via the first communication line while maintaining a signal level of the second communication line at a predetermined signal level after change of the signal level to the predetermined signal level,
    wherein in the second communication mode, data is received via the first communication line before change of the signal level of the second communication line to the predetermined signal level.

\* \* \* \* \*